United States Patent [19]
Chadra

[11] 4,370,730
[45] Jan. 25, 1983

[54] RAM BUFFER MEMORY CIRCUIT SYSTEM FOR TRAIN PRINTER-DATA LINK PROCESSOR

[75] Inventor: David P. Chadra, Anaheim, Calif.

[73] Assignee: Burroughs Corporation, Detroit, Mich.

[21] Appl. No.: 147,509

[22] Filed: May 7, 1980

[51] Int. Cl.³ .............................................. G06F 3/12
[52] U.S. Cl. .................................................. 364/900
[58] Field of Search ... 364/200 MS File, 900 MS File

[56] References Cited
U.S. PATENT DOCUMENTS

| | | | |
|---|---|---|---|
| 3,629,848 | 12/1971 | Gibson et al. | 364/200 |
| 3,760,366 | 9/1973 | Gregor et al. | 364/900 |
| 4,162,520 | 7/1979 | Cook et al. | 364/200 |
| 4,218,754 | 8/1980 | Schaeffer | 364/900 |

Primary Examiner—Harvey E. Springborn
Attorney, Agent, or Firm—Alfred W. Kozak; Nathan Cass; Kevin R. Peterson

[57] ABSTRACT

A specialized RAM buffer memory is provided to work in conjunction with a peripheral-controller designated as a train printer-data link processor. The RAM buffer memory has addressable locations holding two 8-bit bytes at each addressable location. Thus, each addressable location has a top byte and a bottom byte, each of which represents a graphic character. A first dedicated portion of the buffer storage memory is called the print image buffer (PIB). This buffer is loaded with character data according to the number of print columns used in the train printer. When the print image buffer is loaded with character information, it constitutes one full line of print across the 132 columns. A second dedicated area of the memory buffer is called the train image buffer (TIB). This buffer is loaded with codes for the character set that matches the current print train module used in the train printer. Typically, the train image buffer will have 288 addressable bytes corresponding to the 288 characters on the train module. Other areas of the memory buffer storage are provided to control various printing and non-printing and paper format functions.

10 Claims, 30 Drawing Figures

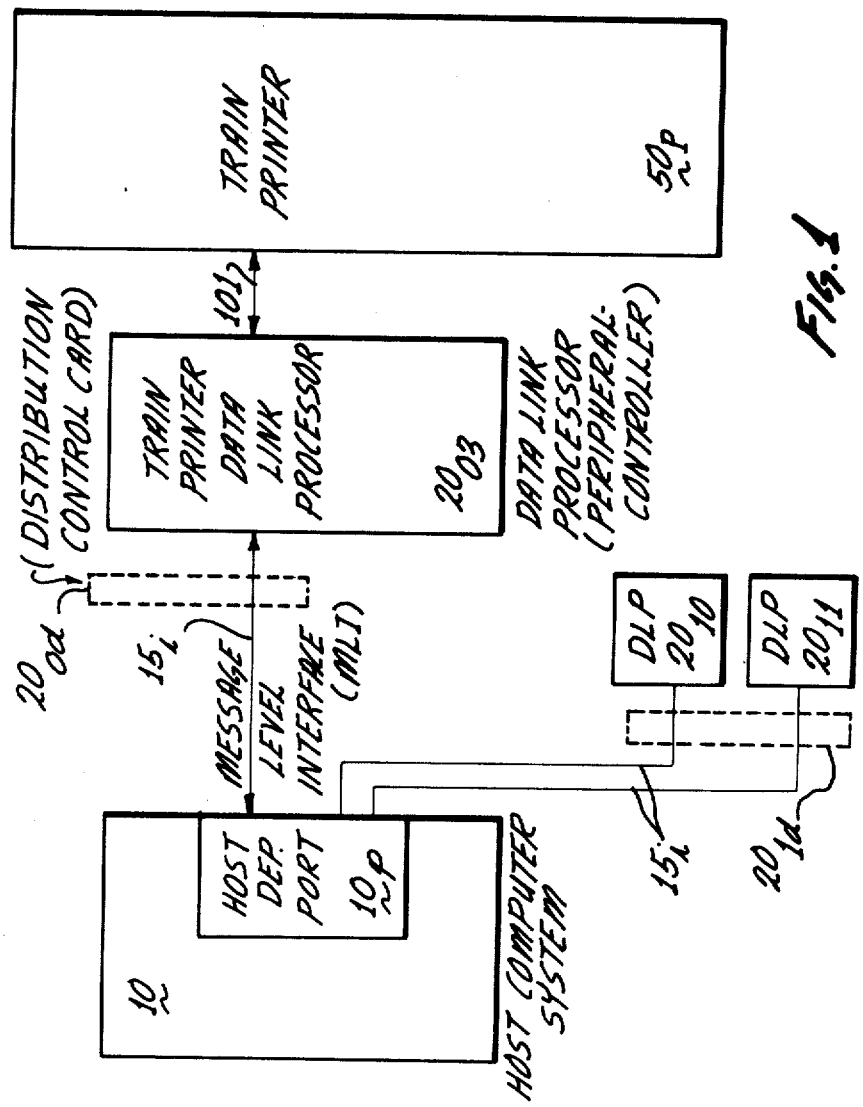

DLP MODULE ASSEMBLY

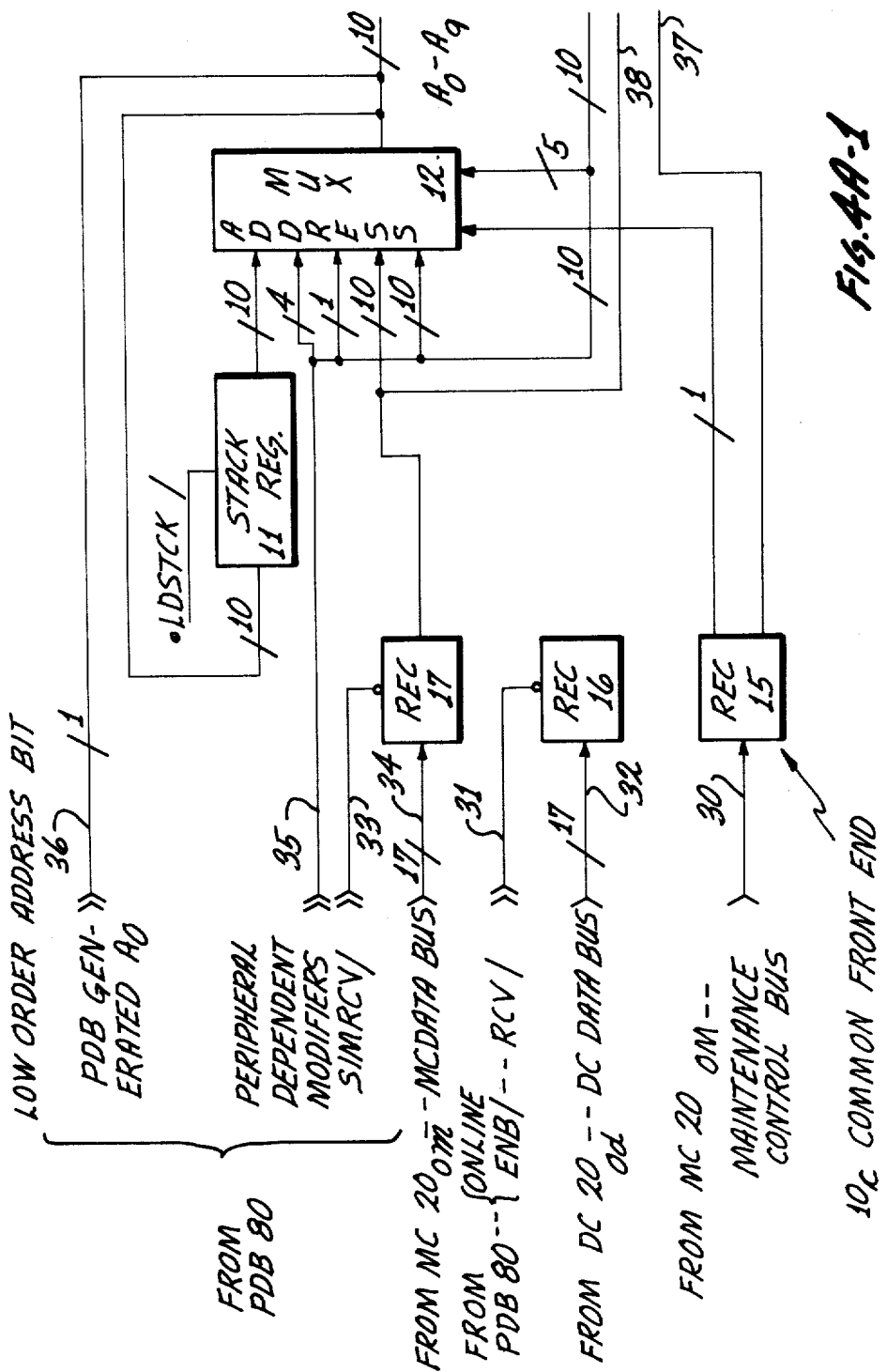

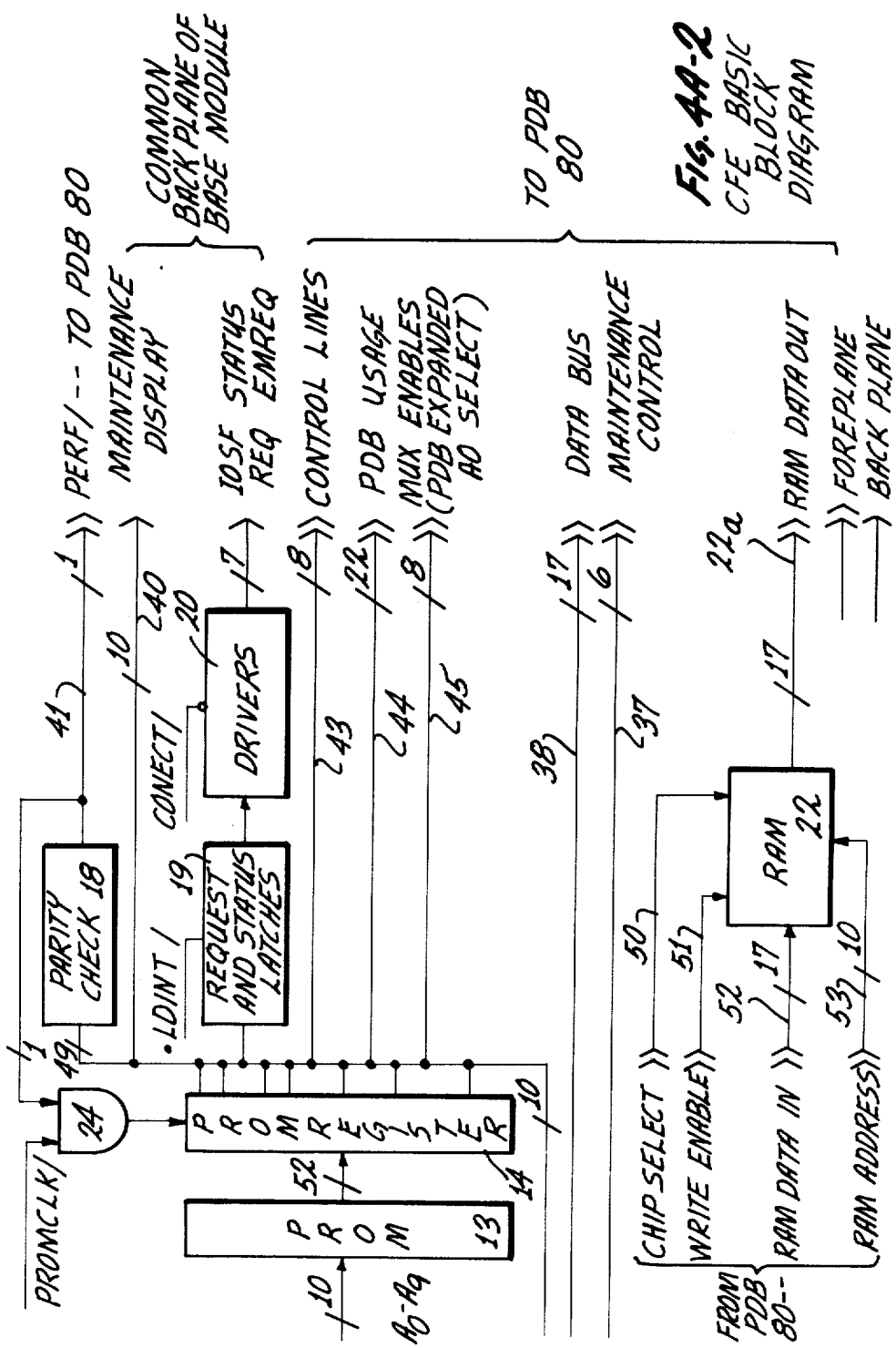
Fig. 44-2 CFE BASIC BLOCK DIAGRAM

CFE CLEAR CIRCUITRY

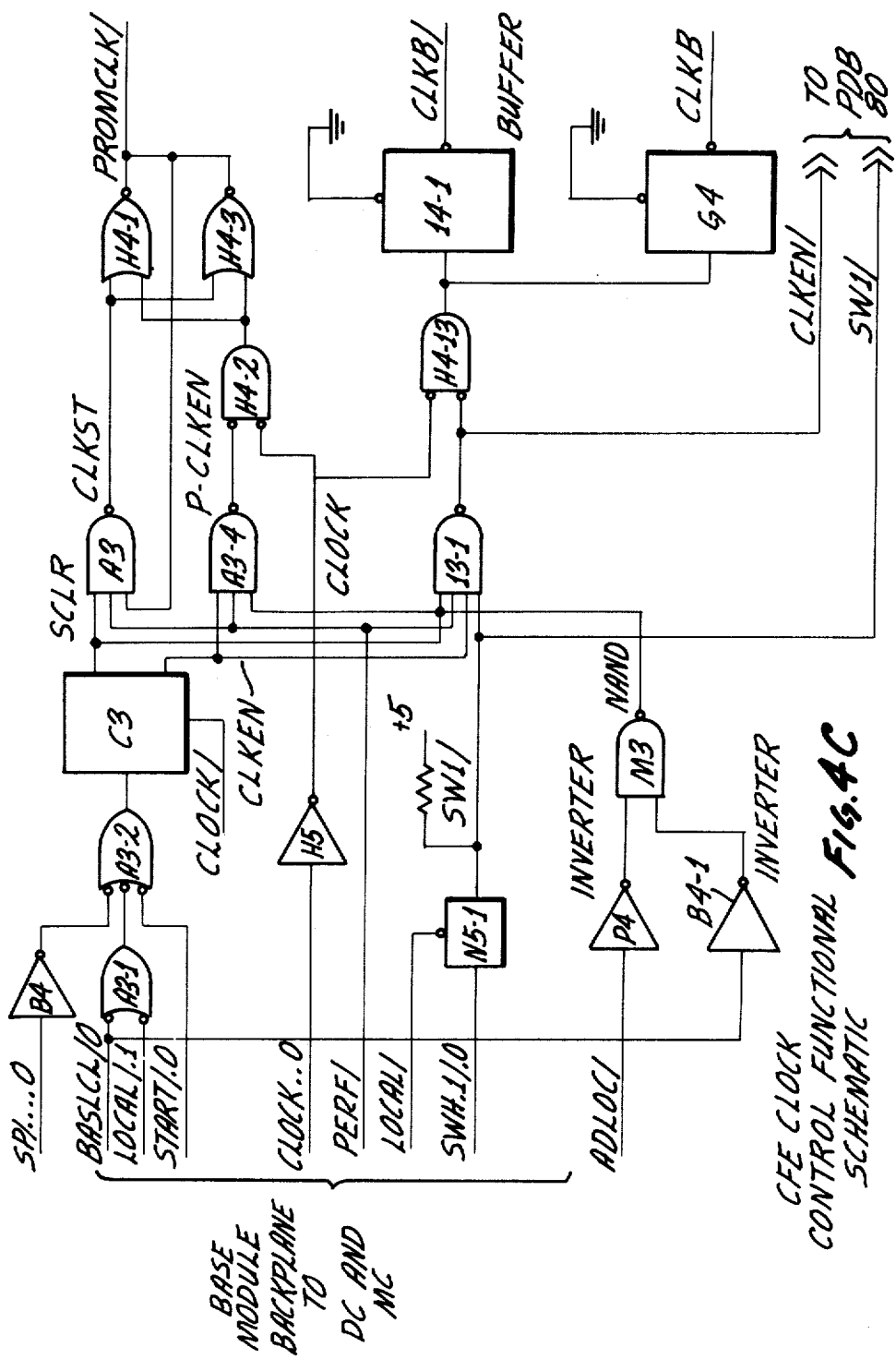

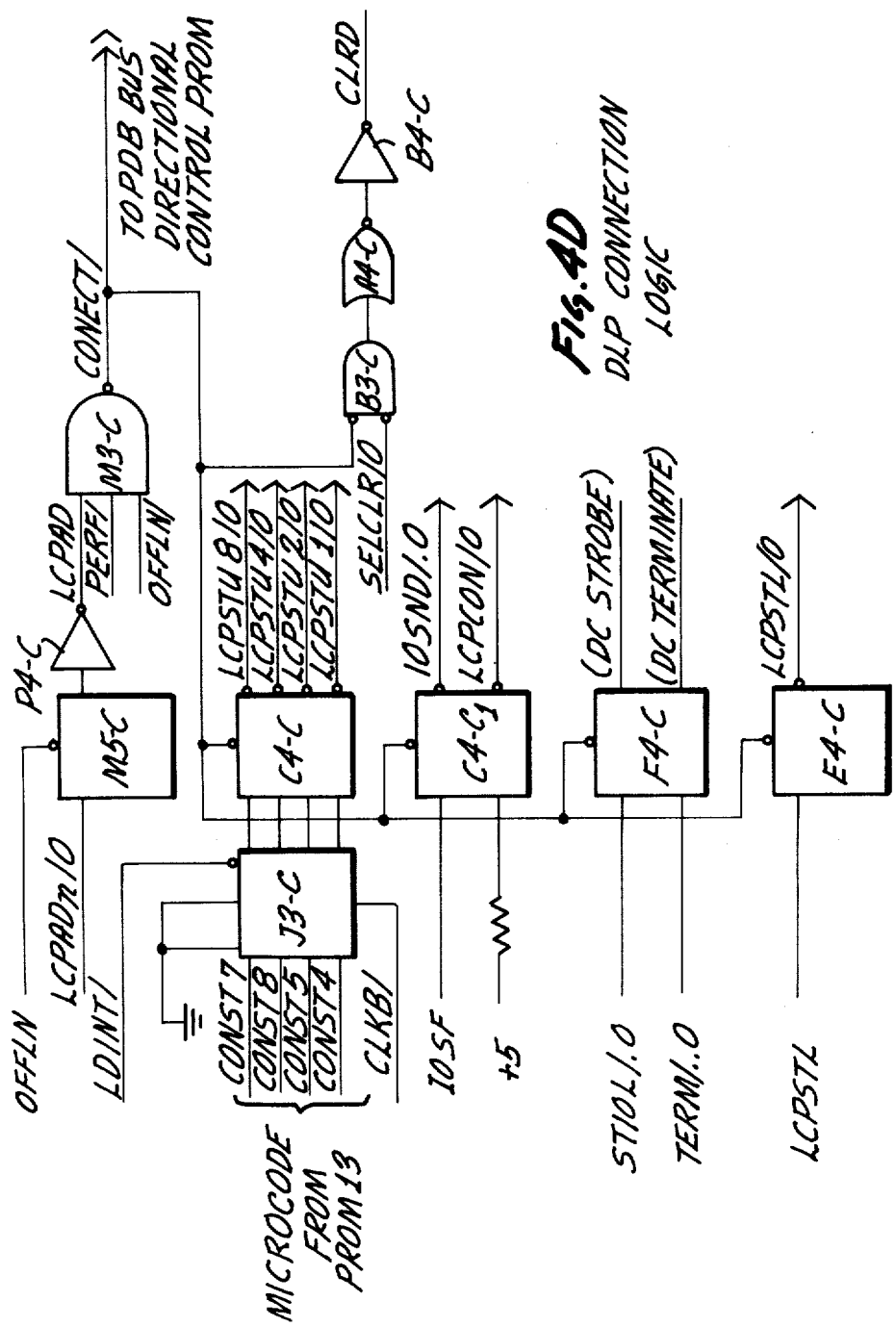
FIG. 4D DLP CONNECTION LOGIC

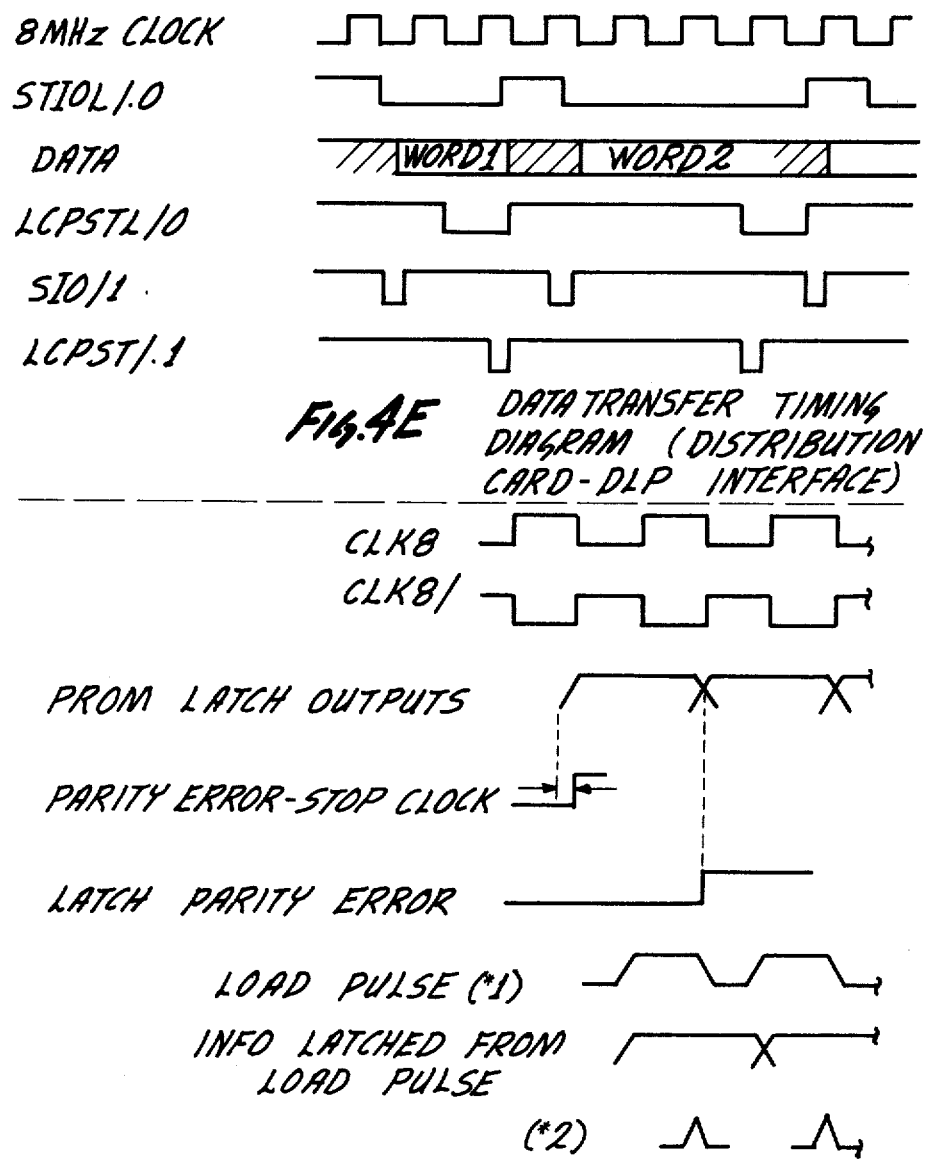

Fig. 4E DATA TRANSFER TIMING DIAGRAM (DISTRIBUTION CARD-DLP INTERFACE)

NOTES (NOT ALL INCLUSIVE - ONLY EXAMPLES GIVEN)
1) ENABLE ACCUMULATORS, LOAD AD REGISTER, WRITE ENABLE TO COLUMN DONE AND INVALID RAM, RESET PCSL, RESET TIB LOAD, SET CSLF
2) LATCH LINE CONTROL LOGIC, LATCH REGISTER, LOAD RAM ADB, OPDECSEL, DC1L, DC2L, DTILCTRL, MOST CTR CLOCK PCTP COUNTER LATCH DATA INTO COMPARE REGISTER

Fig. 5E: TP-DLP BASIC TIMING

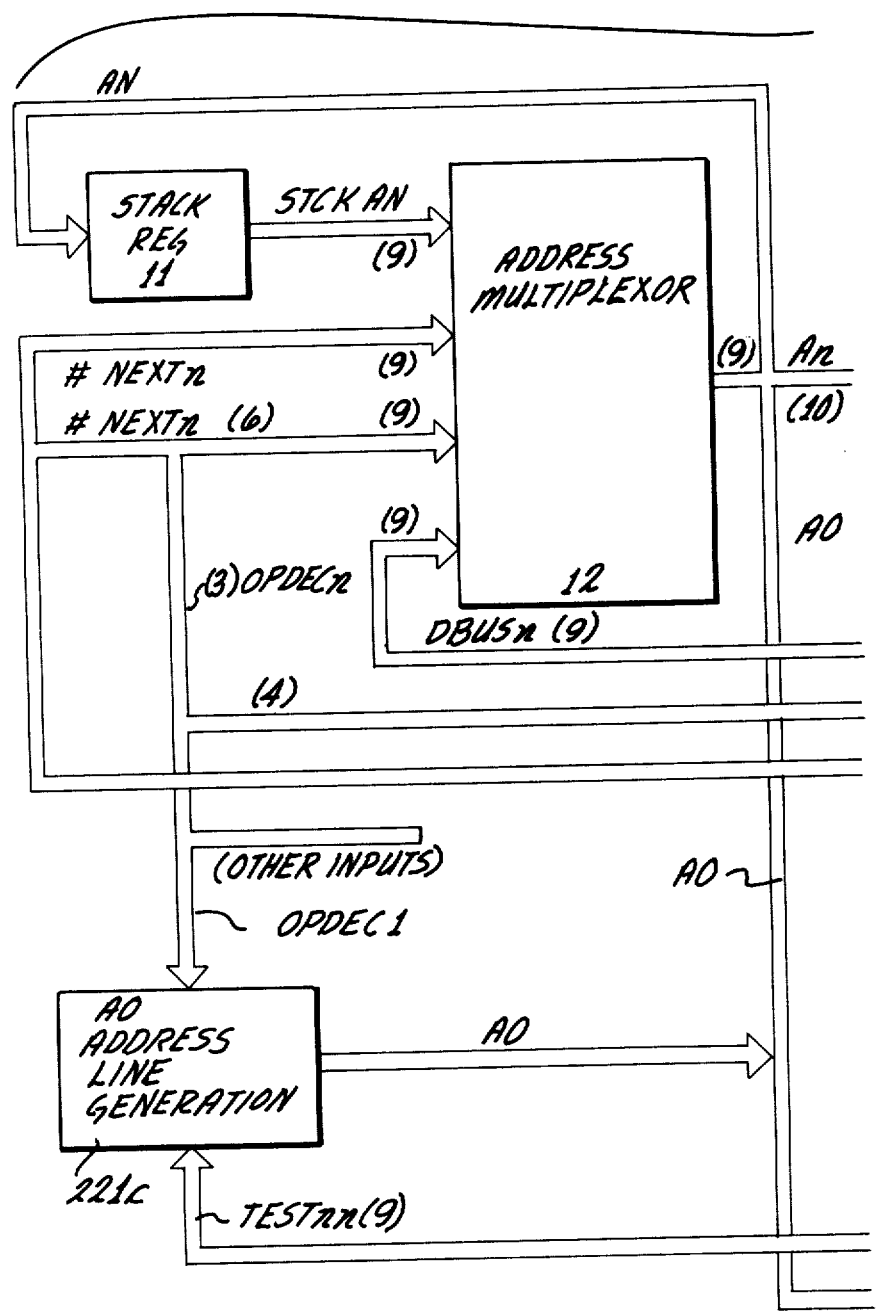
Fig. 5A-1: BLOCK DIAGRAM FOR ON-LINE OPERATION
KEY → | 5A-1 | 5A-2 | 5A-3 | 5A-4 | 5A-5 |

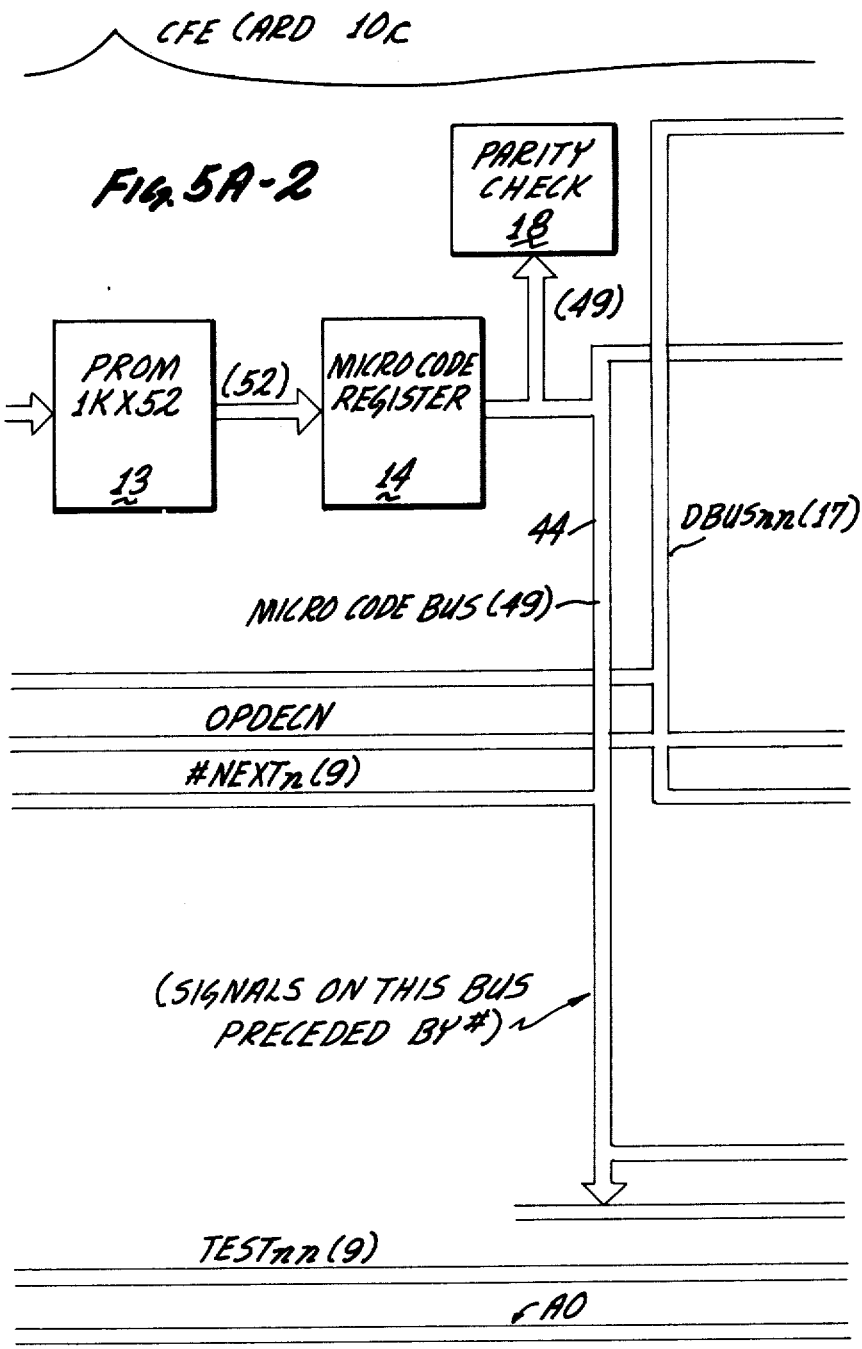

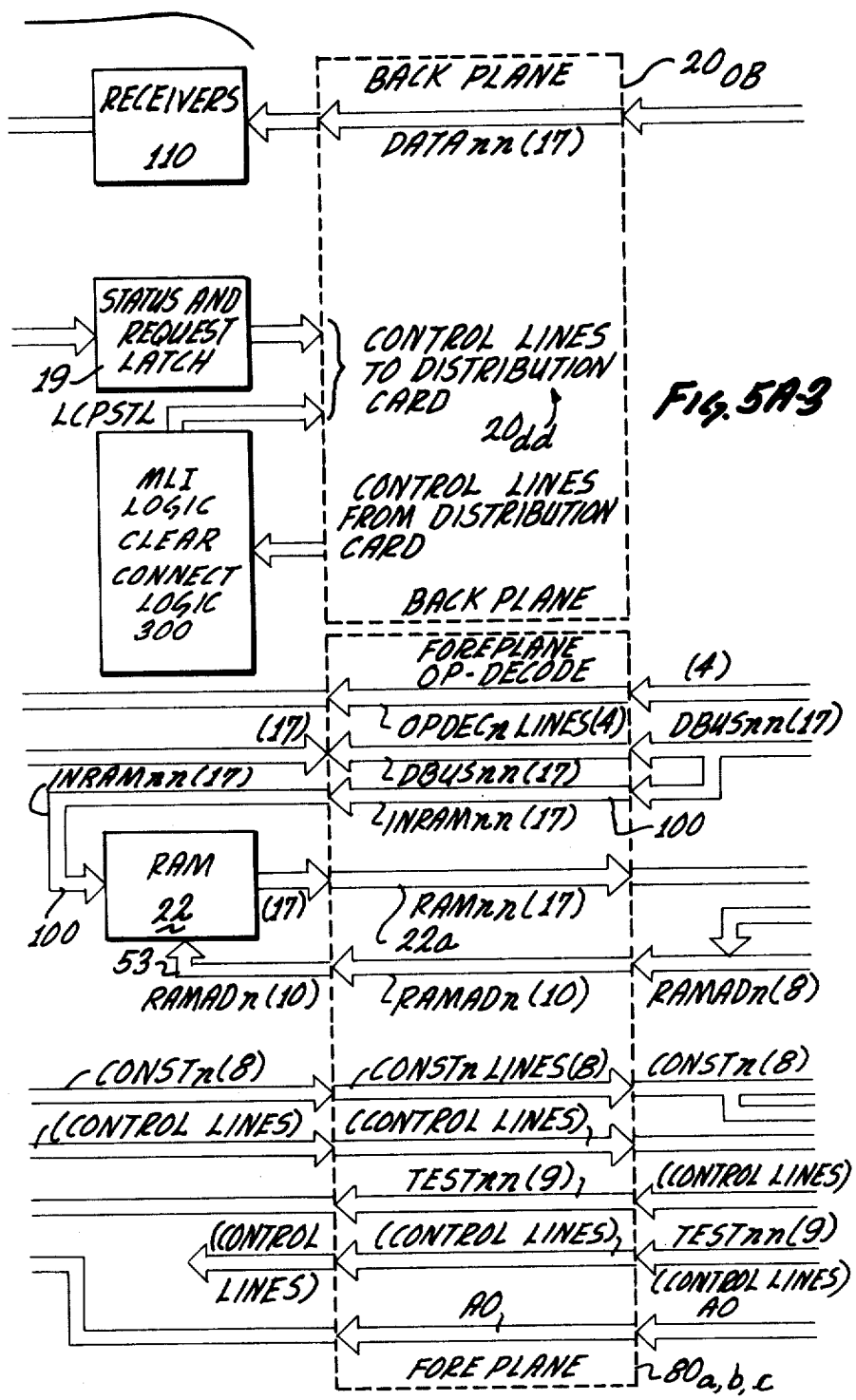

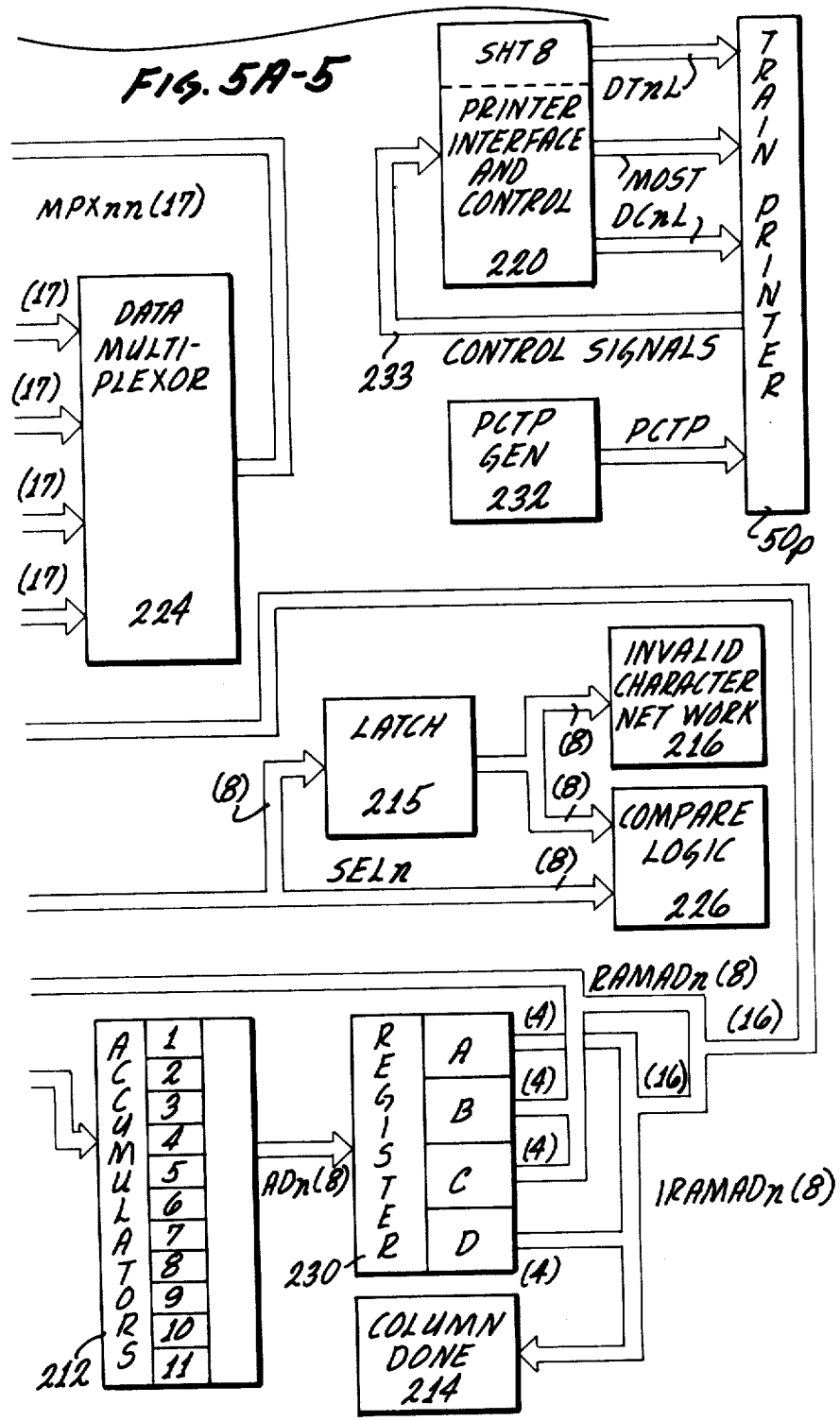

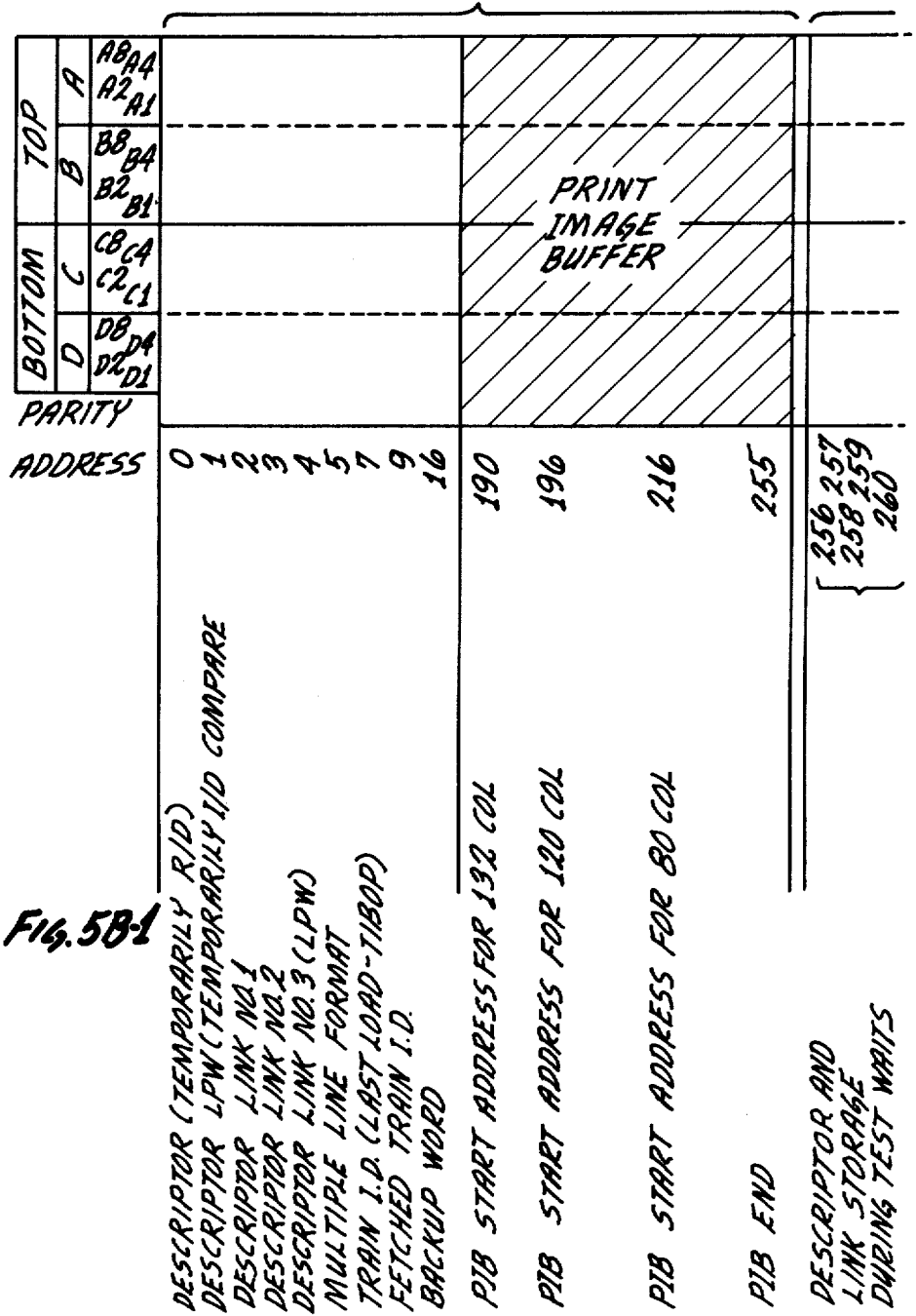

RAM BUFFER

KEY: | 5B-1 | 5B-2 |

MEMORY USAGE

KEY: | 5C-1 | 5C-2 |

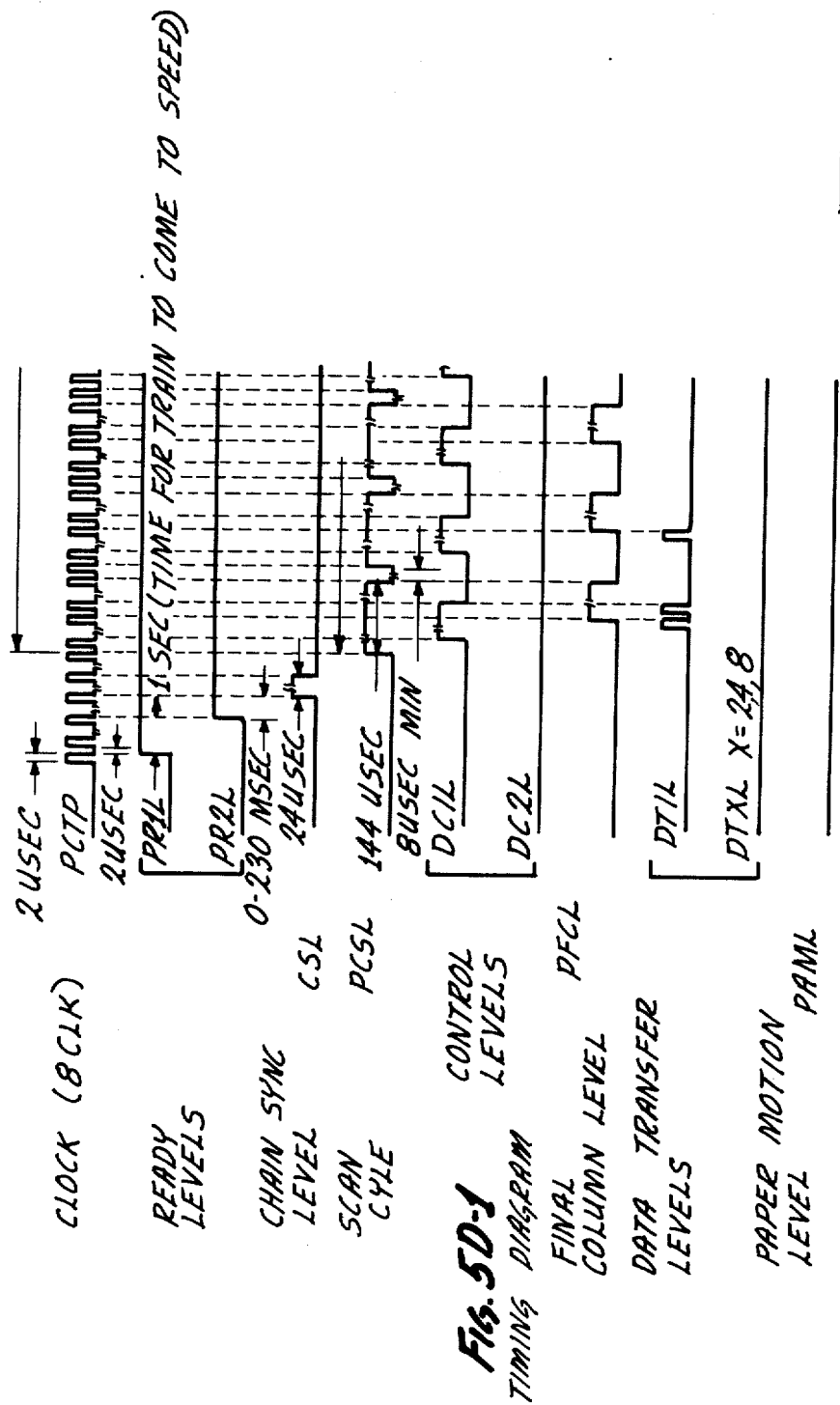
Fig. 5D-1 TIMING DIAGRAM

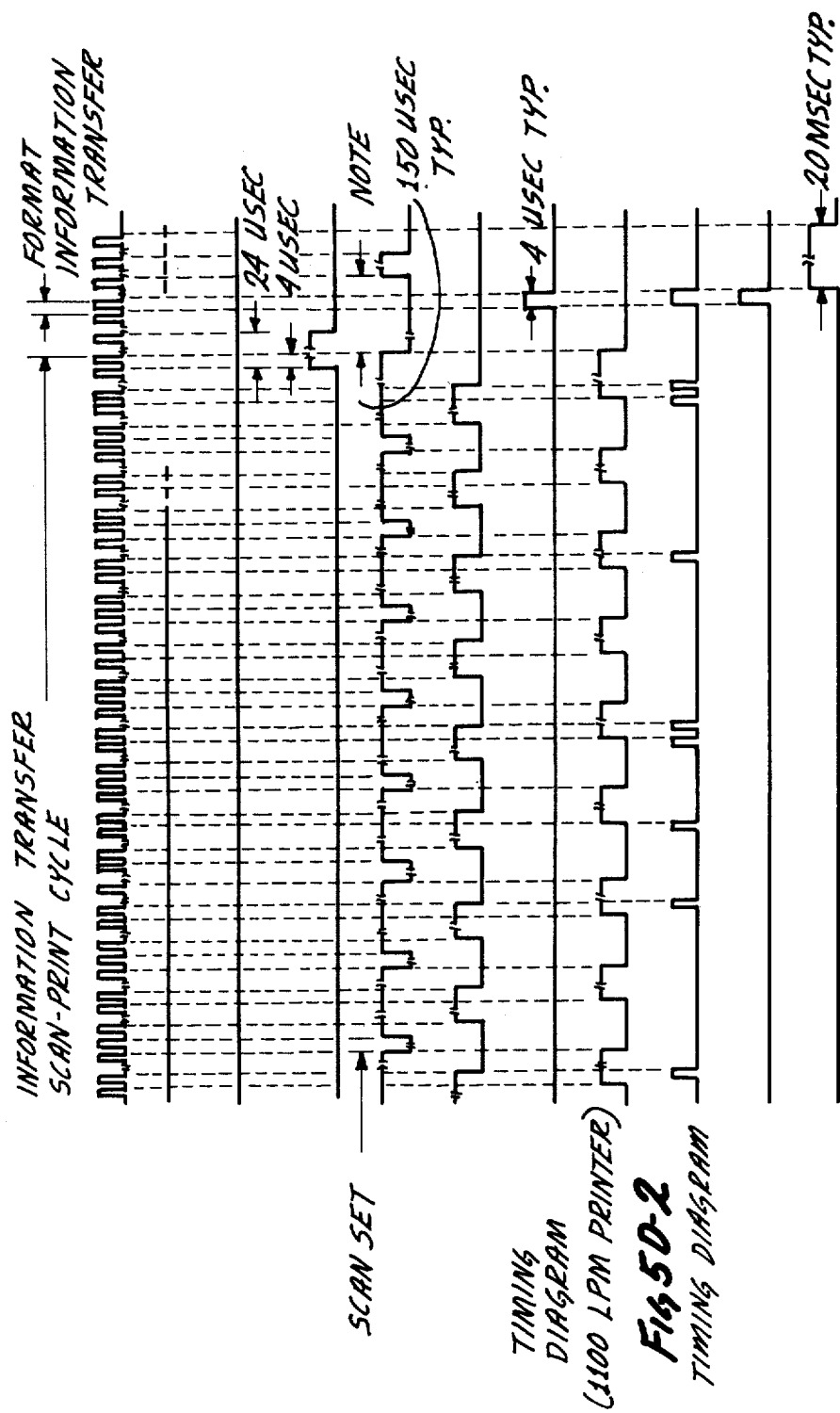

LOAD TIB FLOW CHART

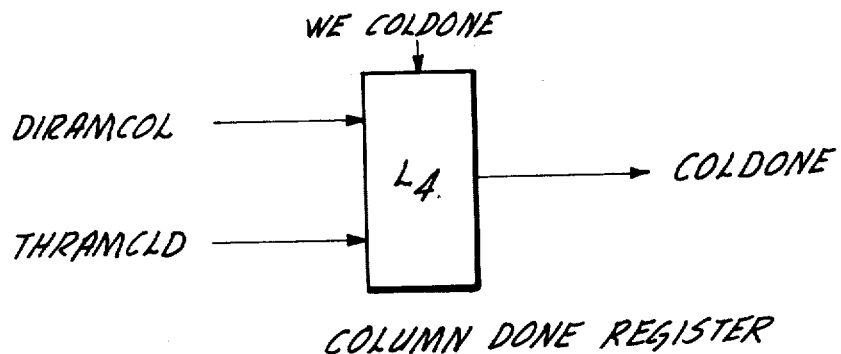
COLUMN DONE REGISTER
Fig. 5G
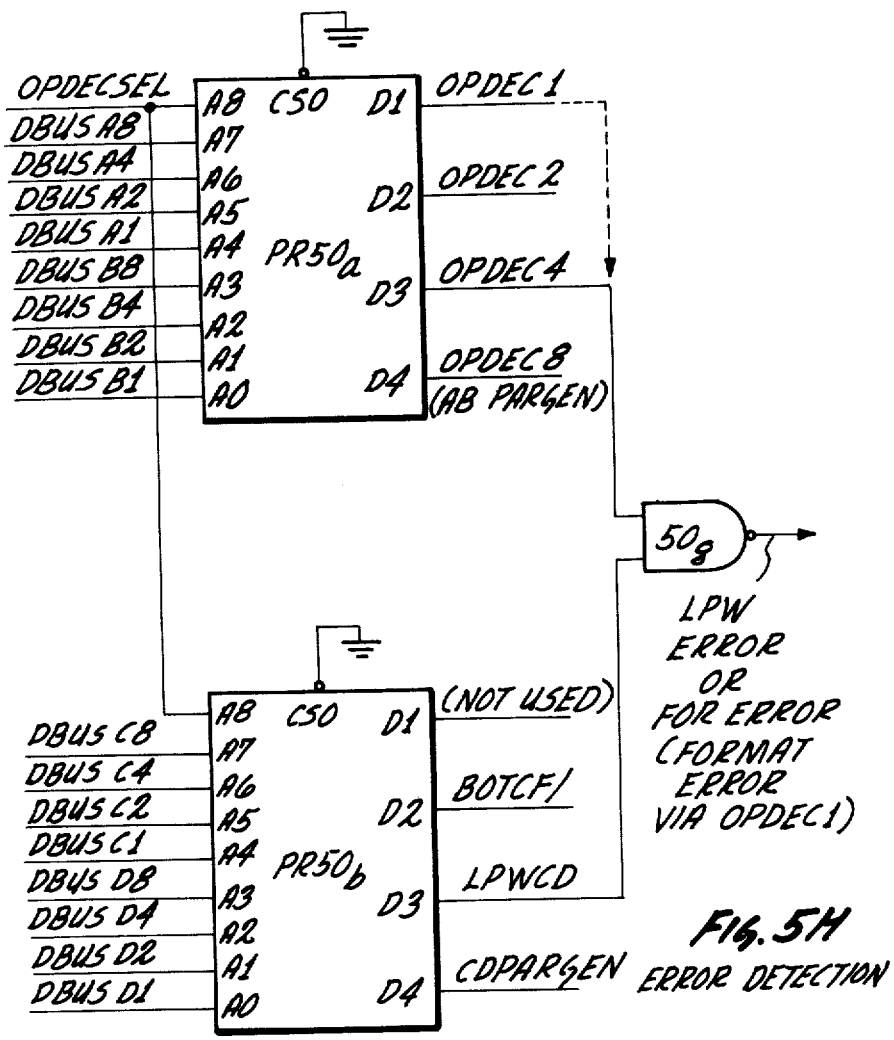
Fig. 5H ERROR DETECTION

VERTICAL PARITY GENERATION/CHECK

DELIMITER DETECTION

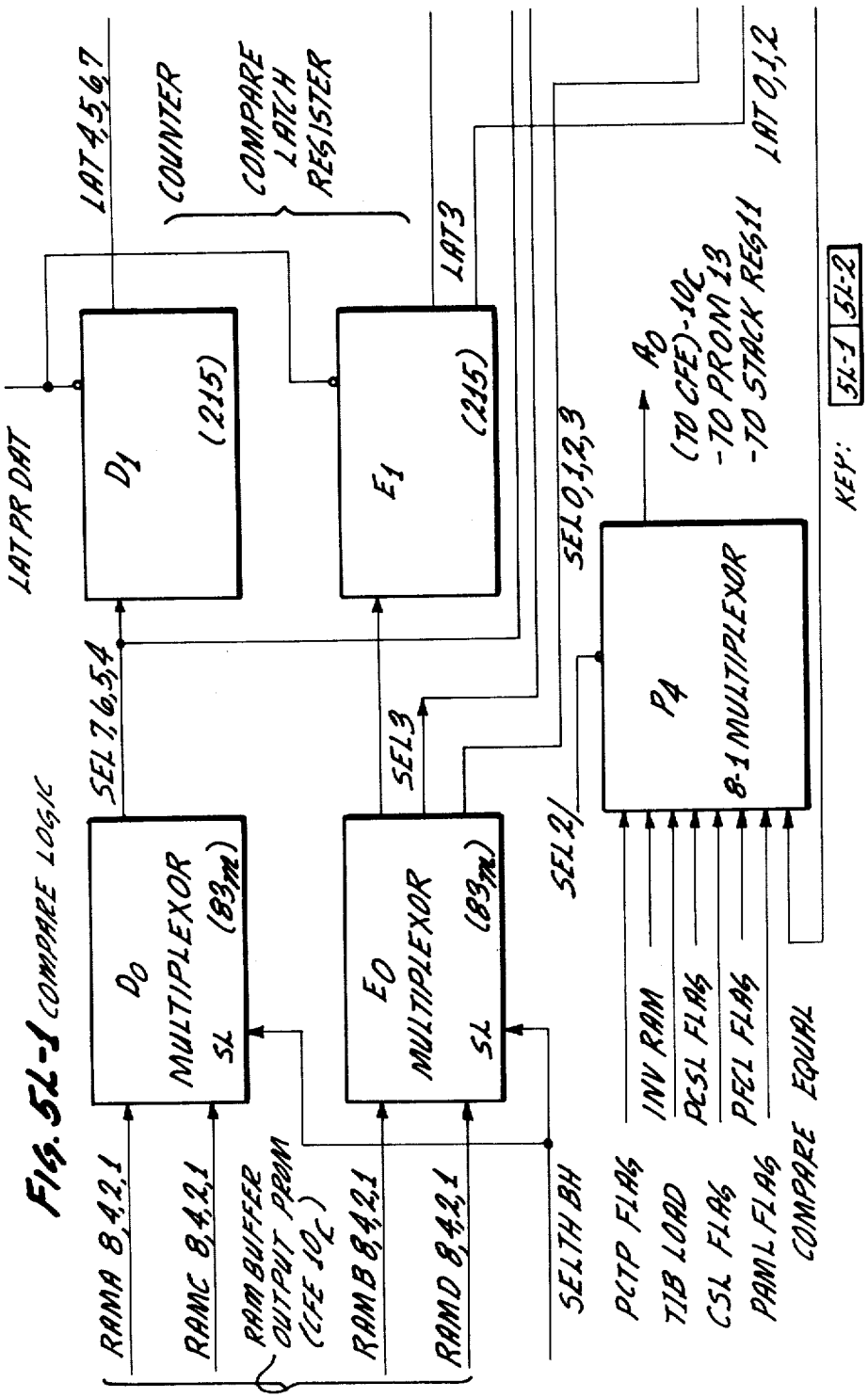
FIG. 51-1 COMPARE LOGIC

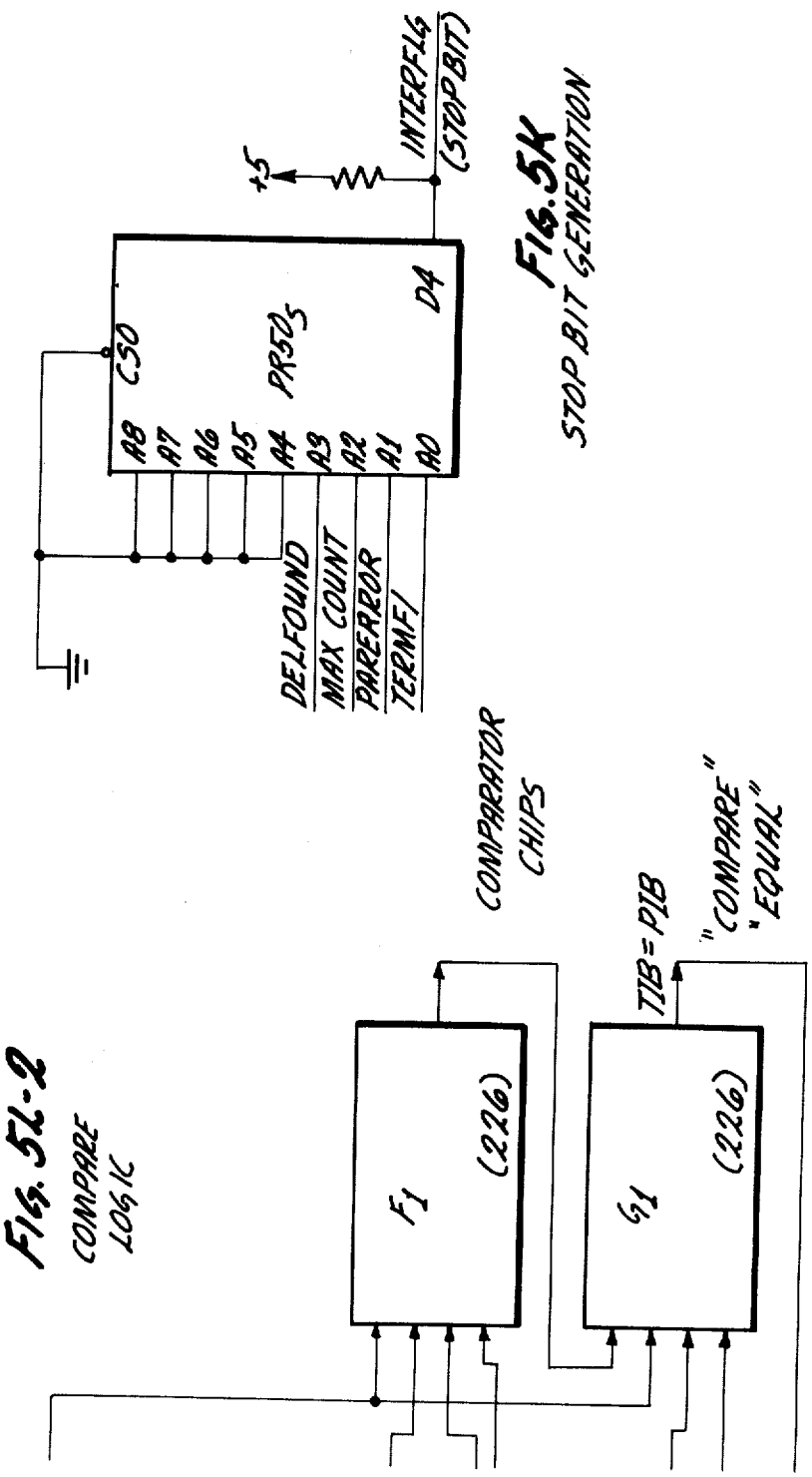

LINE TURN LOGIC

RAM BUFFER MEMORY CIRCUIT SYSTEM FOR TRAIN PRINTER-DATA LINK PROCESSOR

FIELD OF THE INVENTION

This disclosure relates to the field of devices called peripheral-controllers and specifically applies to data link processors used as an I/O controller for a host computer in order to operate a peripheral unit known as a train printer mechanism.

CROSS REFERENCES TO RELATED APPLICATIONS AND PATENTS

The following cases which involve the use of an input-output subsystem connecting a main host computer and various peripheral units are included herein by reference:

U.S. Pat. No. 4,162,520, inventors Darwen Cook and Donald Millers, II. The case described the peripheral-controller known as a line control processor which controlled and handled data transfers between a given peripheral terminal unit and the main host system.

U.S. Pat. No. 4,074,352 entitled "Modular Block Unit for I/O Subsystem", inventors Darwen Cook and Donald Millers, II. This case described a base module unit which housed and supported a group of eight peripheral-controllers and interfaced them to a main host computer system.

U.S. Pat. No. 4,106,092, entitled "Interface System Providing Interfaces to Central Processing Unit and Modular Processor-Controllers for I/O Subsystem", inventor Donald Millers II. This patent described a unit in the main host system, designated as an I/O translator or "IOT", which controls and regulates data transfer between the main host system and a plurality of base modules and their peripheral-controllers.

U.S. Pat. No. 4,189,769, entitled "Input/Output Subsystem for Digital Data Processor System", Inventors Darwen Cook and Donald Millers, II. This case describes a subsystem wherein a plurality of peripheral-controllers are organized in base modules for data communications with a main host system. The peripheral-controllers and the base module form an input-output subsystem for controlling data transfers to/from a large number of peripheral units to the main host computer system.

U.S. Pat. No. 4,322,792, issued Mar. 30, 1982, entitled "Common Front End Control for Peripheral Controller", Inventor Kenneth Baun.

U.S. Pat. No. 4,313,162, issued Jan. 26, 1982 entitled "I/O Subsystem Using Data Link Processors", Inventors Kenneth Baun and Donald Millers II.

The above issued patents form a foundation and background for the present application and are included by reference into this specification.

SUMMARY OF THE INVENTION

The basic functions of a data link processor (or intelligent I/O interface control unit as it was previously called in the cited patents) is to provide the specific processing and control functions for data transfers between a specific peripheral and a main host computer system.

There has newly been developed an improved peripheral controller (data link processor) which, instead of being individually designed and oriented for one particular type of peripheral, now has isolated certain common function elements for all types of peripheral-controllers to form a data link processor of improved capability. The common-to-all unit is designated as the common front end (CFE) which forms a basic part of the data link processor. This common front end, when used in conjunction with a peripheral dependent logic board (PDB) (which adapts the data link processor to a particular peripheral unit) is known as a Common I/O data link processor.

The line control processor (peripheral-controller) in U.S. Pat. No. 4,162,520 was described as an input-output interface data transfer control unit. While many of the general overall operating functions remain the same in regard to following the commands of I/O descriptors from the main system and the returning of Result Descriptors to the main system, the improved peripheral-controller now designated as the "data link processor" (DLP) provides a PROM with micro-code words for use of the required control functions rather than the complexities of processor logic and plurality of multiplexors used in the peripheral-controller line control processor described in U.S. Pat. No. 4,162,520.

A peripheral-controller, for controlling the printout of data via a train-printer mechanism, has a specialized RAM buffer memory with dedicated portions for control data and dedicated portions for two special buffer storage areas. One area is named PIB or print image buffer. It stores the data (received from the host system) to be subsequently printed by the train-printer.

The second special area is the TIB or train image buffer which stores codes representing the character data on the train blocks of a rotating train. The special buffers make it possible for comparison scans in each buffer to be compared for a match which indicates a desired character is juxtaposed to a print-hammer which can now be fired to print the character in the appropriate column of the paper.

BRIEF DESCRIPTION OF THE DRAWINGS

FIG. 1 is an overall system diagram showing the relationship of the data link processor to the main host system and the peripheral terminal unit, designated as the train printer.

FIGS. 4A1 and 4A2 constitute a circuit diagram of the common front end (CFE) card of the data link processor; FIG. 4C shows the clock control circuitry for the CFE; FIG. 4D shows the connection logic circuitry of the common front end; FIG. 4E is a timing diagram showing how data transfers are effectuated during certain clock periods.

FIGS. 5A1-5 constitute a circuit block diagram for the entire data link processor used to control the train printer peripheral; FIGS. 5B1-2 constitute a schematic drawing of the RAM buffer memory storage; FIGS. 5C1-2 illustrate portions of memory designated print image buffer and train image buffer; FIGS. 5D1-2 constitute a timing and signal diagram for a typical 1100 LPM train printer; FIG. 5E is a simplified basic timing diagram for basic functions of the train printer-data link processor;

FIG. 5G is a schematic drawing of the column done register; FIG. 5H is a block diagram illustrating how data bus characters are error-checked; FIG. 5K is a block diagram of the stop bit generator circuit; FIGS. 5L1-2 constitute a simplified block diagram of the compare logic circuit.

Figures 4, 5A:
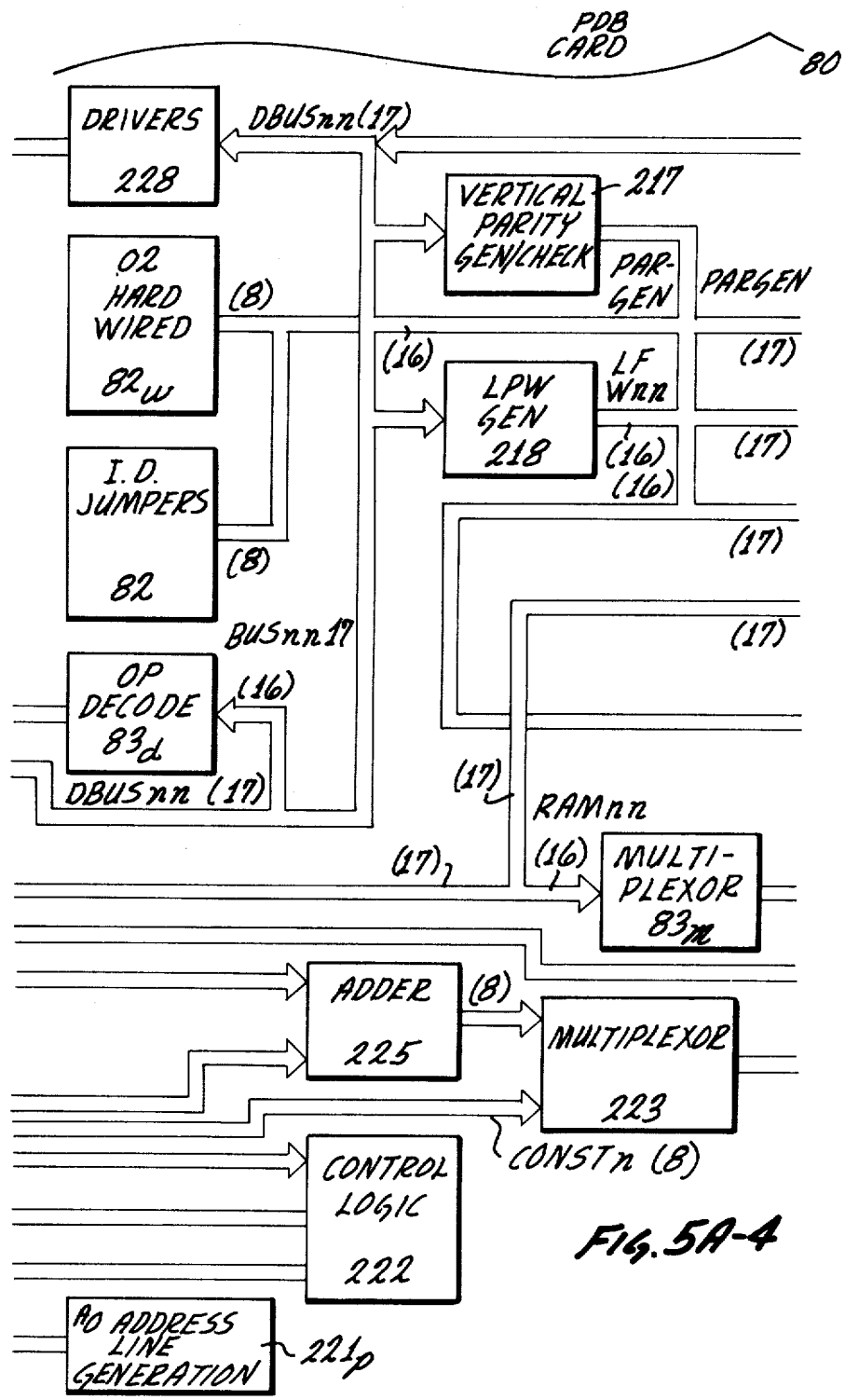
Figures 2, 5B:
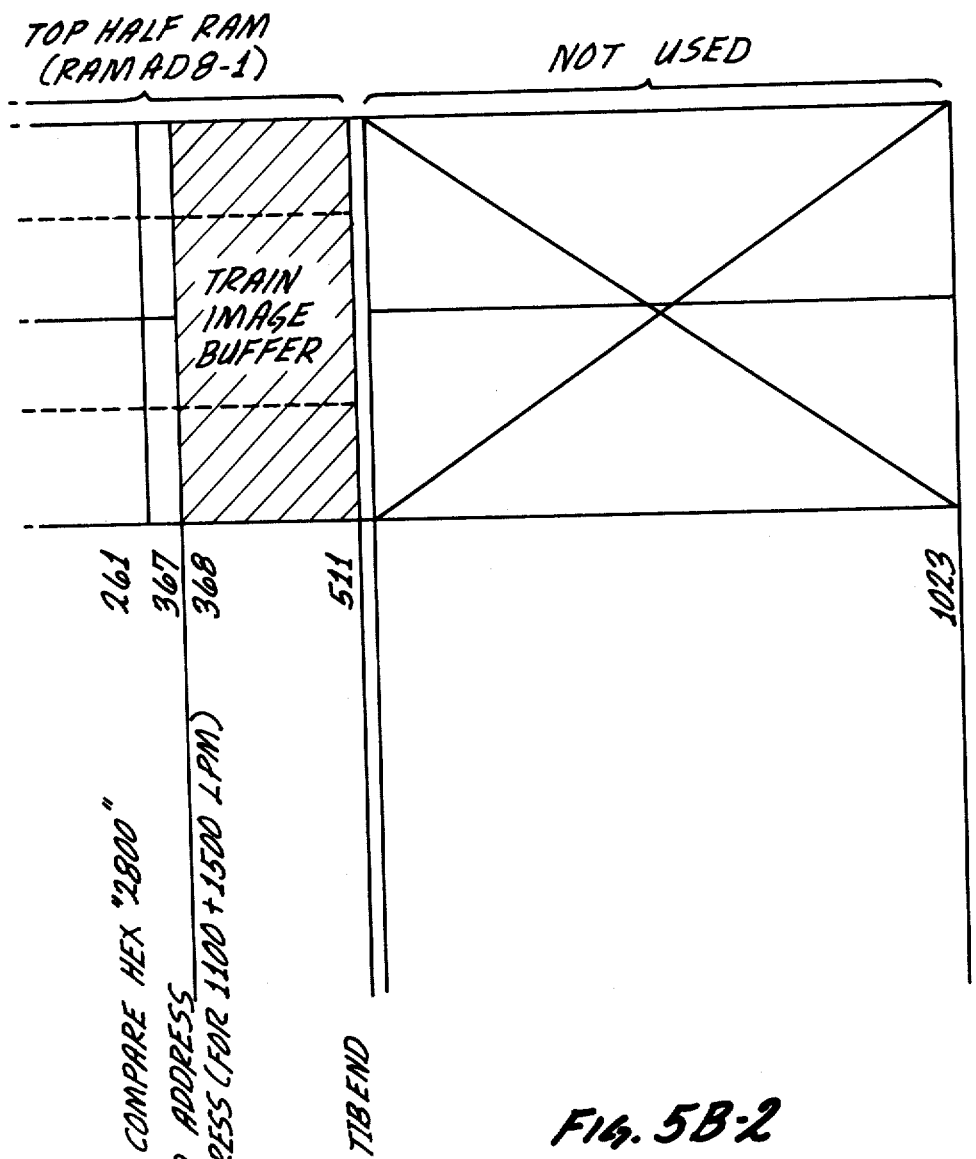
Figures 1, 5C:
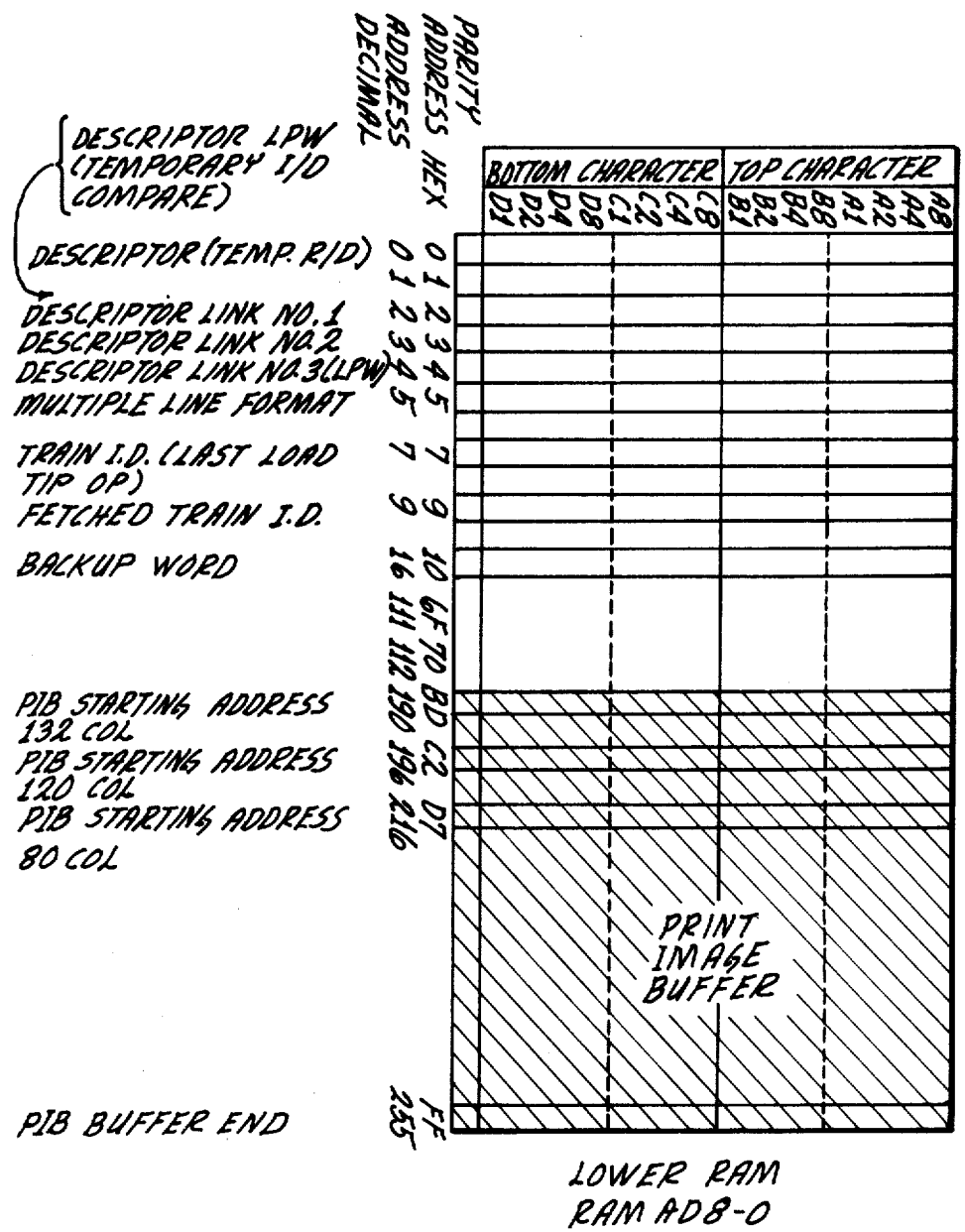
Figures 2, 5C:
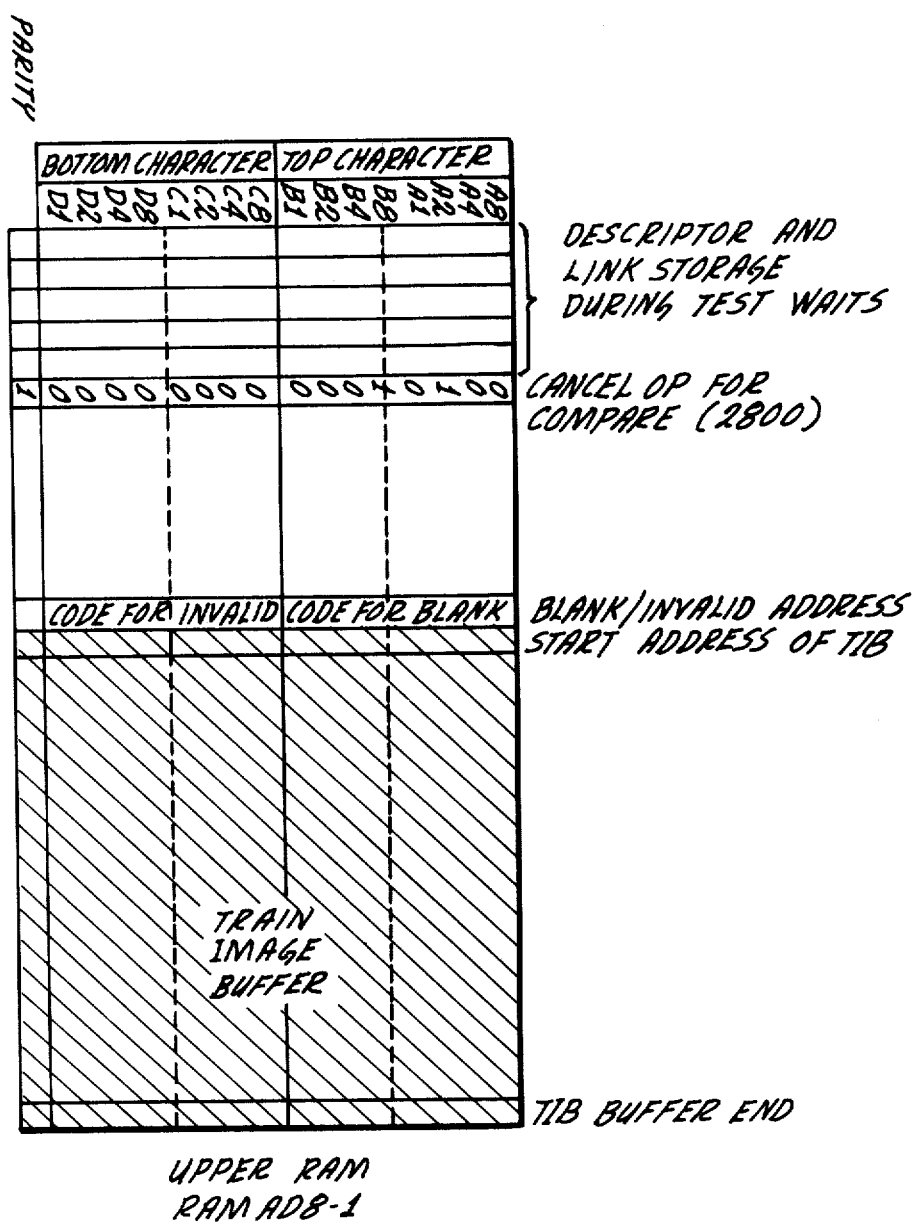

The overall environment or system configuration in which a data link processor, such as a train printer data link processor (TP-DLP) operates, is shown in FIG. 1. The main host computer system 10 having a host dependent port $10_p$, connects message level interface buses $15_i$ to specialized peripheral-controllers such as data link processor (DLP) $20_{10}$ and $20_{11}$ through a distribution control card $20_{id}$. Likewise, the message level interface $15_i$ connects to a distribution control card (DC) $20_{0d}$, which supports a plurality of other data link processors, such as the train printer-DLP, $20_{03}$, FIG. 1.

In the particularly preferred system embodiment for the train printer-data link processor, the DLP $20_{03}$ (FIG. 1) is connected by bus 101 to a train printer mechanism (peripheral) such as is described in Burroughs Corporation publication form 1094802 copyright 1976 by Burroughs Corporation, Detroit, Michigan 48232.

Figure 2:
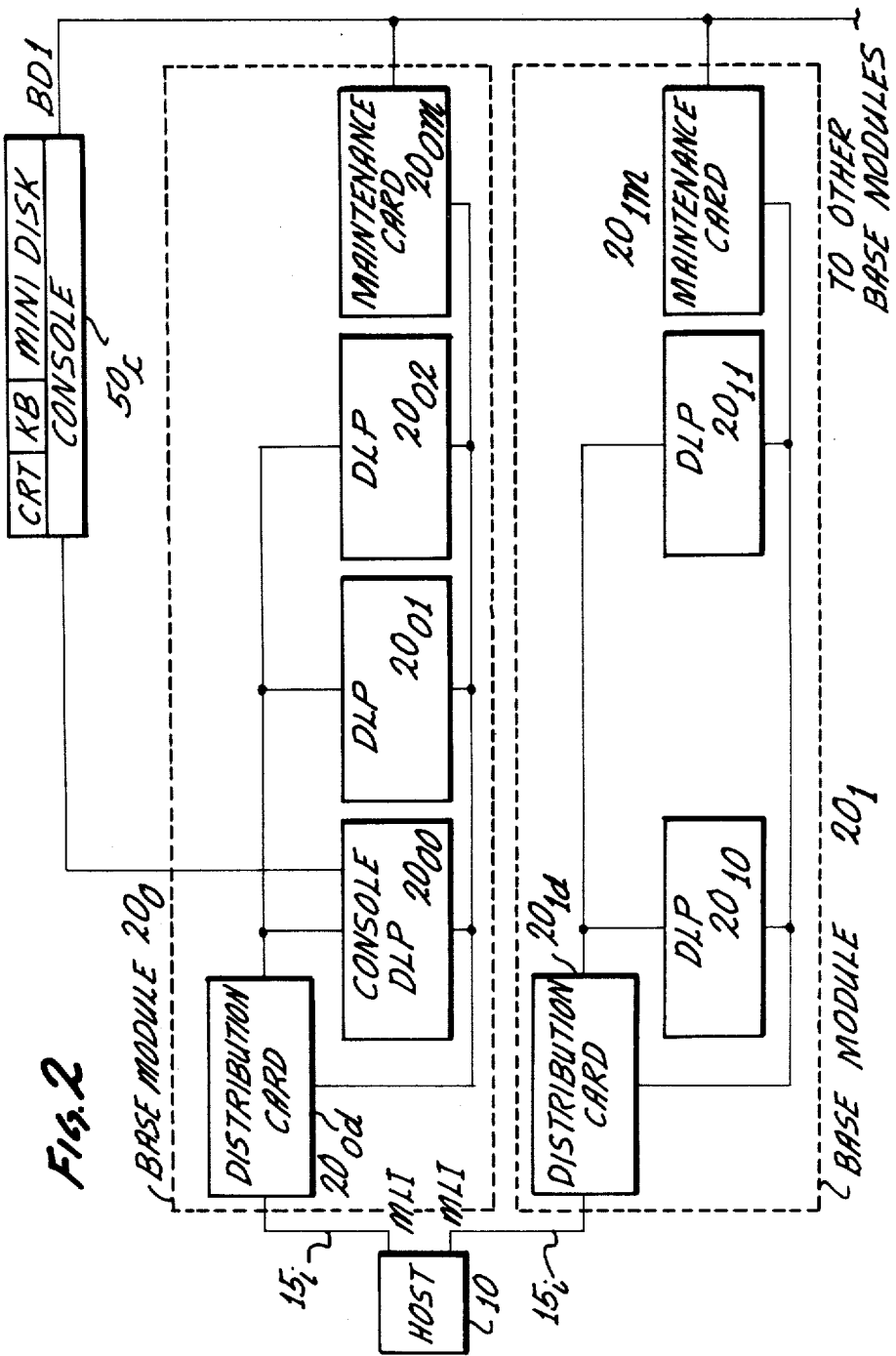
FIG. 2 is a block diagram of a plurality of typical base modules which house and support a plurality of data link processors.

FIG. 2 shows a more generalized situation in which a host computer 10 is connected by a message level interface $15_i$ to two base modules $20_0$ and $20_1$. Each of these base modules has its own respective distribution cards (DC) respectively designated $20_{0d}$ and $20_{1d}$.

Each base module supports a plurality of data link processors (peripheral-controllers). For example, base module $20_0$ may have a console data link processor $20_{00}$ which controls a console unit $50_c$. Likewise, data link processor $20_{01}$, $20_{02}$ may respectively handle control and data communication transfers between items such as a card printer, card punch or other peripheral units. Each particular data link processor is specifically oriented for serving the requirement of each type of peripheral unit.

Likewise, base module $20_1$ has its own distribution card (DC) $20_{1d}$ which can connect to data link processors such as $20_{10}$, $20_{11}$, each of which data link processors is specifically tailored to handle the data transfer and control operation for a particular type of peripheral terminal unit. Each base module will be seen to have its own maintenance card unit ($20_{0m}$ for base module $20_0$ and maintenance card $20_{1m}$ for base module $20_1$). The maintenance card provides diagnostic and maintenance coperations for the data link processors of a given base module.

As previously described in U.S. Pat. Nos. 4,106,092 and 4,162,520, each base module has a series of backplane connectors and grooved slides whereby a large number of printed circuit-component cards may be inserted and slid-in for connection to the backplane of the base module. Thus, the distribution card $20_{0d}$, the maintenance card $20_{0m}$ and other printed circuit cards which constitute the peripheral-controllers or other function cards, may be inserted and connected into the common backplane of the base module.

Figure 3:
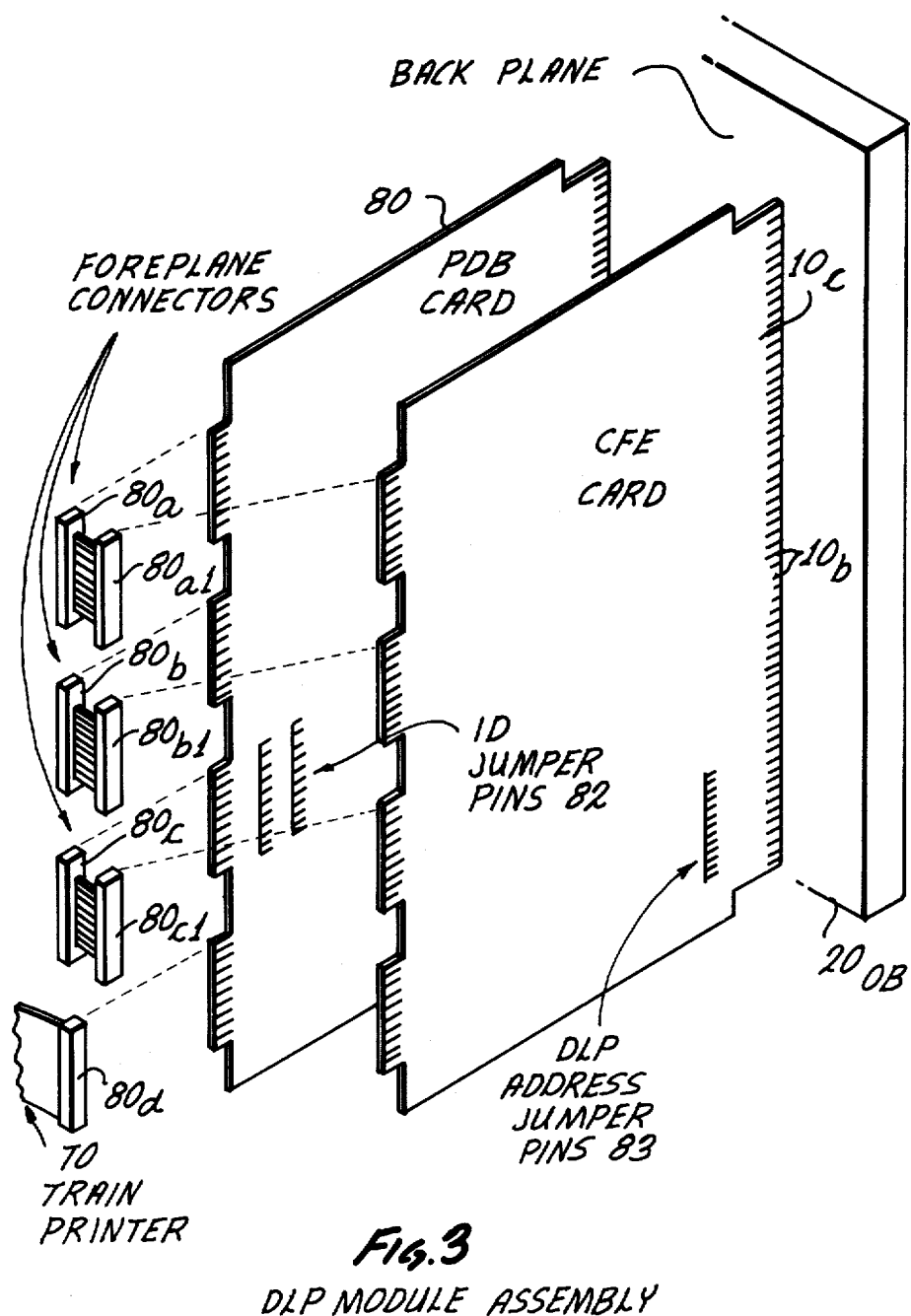
FIG. 3 is a schematic drawing of the printed circuit cards which make up the data link processor.

FIG. 3 is a schematic illustration of how a specific data link processor (peripheral-controller) may be physically structured with slide-in printed circuit cards. Thus, a common front end card $10_c$ is seen having a series of backplane connections $10_b$, for connection to the motherboard of the base module, and having frontplane or foreplane connectors $80_{a1}$, $80_{b1}$, $80_{c1}$, and DLP address jumper pins 83 which are used to set the specific address of the particular data link processor (DLP) involved.

Connected to the CFE card $10_c$ by means of the foreplane connectors is the peripheral dependent board (PDB) card 80. This card has foreplane connectors $80_a$, $80_b$, $80_c$, which connect to its associated common front end (CFE) card $10_c$. The peripheral dependent board 80 also has a foreplane connector $80_d$ for connection to the train printer peripheral unit. The PDB card 80 has jumper pins 82 for identification (ID) whereby an encoded identification signal for the board can be effectuated.

Thus, the specialized data link processor (peripheral controller) as $20_{03}$ can be seen to comprise two slide-in cards, one of which, the common front end card $10_c$, is common to all types of peripheral controllers; while the peripheral dependent board, PDB card 80, is a specialized card providing the circuitry functions required for the control, handling and specialized protocols particularly required for a specific type of peripheral unit.

OVERALL SYSTEM DESCRIPTION

As previously discussed in U.S. Pat. Nos. 4,162,520 and 4,106,092, use was made of an input/output subsystem operating between a main host computer and one or more peripheral devices. The input/output subsystem used a plurlity of base module cabinets, each of which supported a group of base modules. The base modules consisted of up to eight "Line Control Processors" (peripheral-controllers) which were designated as intelligent input/output processing units which controlled data transfers between any specific peripheral device and the main host system. Since these line control processors (LCP) provided an identification code or "data link" for each task assigned by the main host system, these Line Control Processors came, in subsequent design, to be known as Data Link Processors (DLP) and henceforth will be referred to by the term of data link processors.

The data link processor I/O subsystem interfaces a variety of peripheral (I/O) devices with one, or more than one, host system. This setup simplifies the I/O device maintainability by allowing maintenance of the I/O subsystem to be performed without being specifically tailored to the vagaries of main host systems. The data link processor subsystem is distinguished by its adaptability to any host computer system having the MLI (message level interface) capabilities described in U.S. Pat. Nos. 4,162,520 and 4,106,092.

The data link processor I/O subsystem can be utilized by host systems having totally different internal characteristics, for example, the same I/O subsystem may be shared by any combination of different Burroughs B 900 systems, as the B 2900, B 3900, B 4900 and the B 6900 system.

The message level interface is a connected line discipline by which the host system or host systems communicate with the I/O subsystem. In the preferred embodiment of the latest configuration, each of the host systems utilizes a unit called a Host Dependent Port (HDP) to achieve the message level communication.

The peripheral devices which are attached to and operate with a data link processor I/O subsystem operate in a semiautonomous environment, that is, a host system must initiate a peripheral device to perform an operation, by sending the data link processor an I/O descriptor. After the DLP is initiated, it (DLP) performs the operation (OP) independently of the host system. At the conclusion of the operation, the DLP reconnects back to the host system which initiated the operation and returns information called a "result descriptor" (R/D). During this operation, the DLP can "reconnect" to the host system to transfer data via the data link processor.

The ability of a DLP to disconnect from a host system and proceed with an I/O transfer operation frees the host system to perform other operations during the time that an I/O transfer operation is in progress within the data link processor subsystem.

The ability to reconnect to a host system requires the data link processor to contain a "linking mechanism" to re-establish the communication path between the peripheral device and the host system that initiated that peripheral device. The logic circuit that provides for this reconnection is contained in the data link processor. Alternatively the logic circuit that provides for this connection and reconnection may be contained in a system controller (SC) or a unit such as the IOT (input/output translator unit, described in the aforementioned U.S. Patents). Every peripheral device that is connected to the DLP I/O subsystem uses one of this type of "connection—reconnection" control devices.

The message level interface that connects the host system to a DLP I/O subsystem is capable of conducting all communication between the host system and the peripheral subsystem including connection, reconnection and disconnection.

Two types of communications are made use of between the host system and the I/O subsystem. These are (a) "control" communications done by control levels and (b) "data transferring" communications. In both types of communication information (either control levels or data) pass between the host system and the peripheral subsystem.

When information passes from the main host system to the DLP I/O subsystem, the operation is described as a "Write" operation. When information is passed from the I/O subsystem to the main host system, the operation is described as a "Read" operation. For example, when a peripheral device requests to be reconnected to the main host system or to another available main host system, the communication starts in the I/O subsystem with information passed on to the host system and is, therefore, a "Read" type of operation. When a host system initiates a peripheral device and the communication starts from the host system with information being passed from the host system to the peripheral, this is called a "Write" type of operation.

Those peripheral devices of the "input" type will produce only "Read" data for the host system. Those peripheral devices of the "output" type will only receive data from the host system, i.e., a "Write data" operation. Thus, input or output peripheral units require either a "Read data" or a "Write data" operation. Read data and Write data are not the same thing as "read or write" operations because "read or write" only describes the direction of the flow of information on the message level interface. A read function performed by an input peripheral device requires a "Write" operation to initiate the peripheral device first, followed by a "Read" operation to pass the data to the host system.

As described in U.S. Pat. No. 4,074,352, the LCP base module is the basic building block for an input-output subsystem. In the case where a universally "Common Front End" card is used in each data link processor (DLP), the subsystem can be designated as the "Common I/O Subsystem". The DLP base module consists of a backplane which connects slide-in cards, any two of which form a DLP. A base module consists of one to six distribution cards (DC) for communication to/from the system and houses from one to eight data link processors (DLP's), each of which handles data communications to/from a specific peripheral terminal unit. Each base module also includes one maintenance card (MC), two termination boards and space for additional cards for specialized purposes, but which are not essential to a normal operating situation.

Each data link processor (DLP) consists of a common front end card (CFE) and peripheral dependent logic which is located on separate circuit board known as the peripheral dependent board (PDB). Read only memories designated as PROMs located on the common front end card contain micro-code words which are the only elements dependent on the type of peripheral device used, the remaining of the elements being standard independent components. The common front end card and the peripheral dependent board communicate to each other via three 50-pin frontplane connectors seen in FIG. 3.

The data link processor ($20_{03}$, FIG. 1) contains the hardware and power required to interface the host dependent port $10_p$ of the main host system 10 with a plurality of peripheral devices 53. The hardware of the subsystem consists of a base module as $20_0$, FIG. 2, which include the following:
1. a control console ($50_c$, FIG. 2)
2. the message level interface cabling (MLI), $15_i$.
3. the base backplane $20_{0B}$ for the data link processors, FIG. 3.
4. the base modules which fit into the cabinet and connect to the base backplane.
5. the data link processors (DLP) which are typically organized such that 8 data link processors are supported by each of the base modules (FIG. 2).

As described in the heretofore mentioned patents, the base modules were fitted with one or more distribution card (DC) depending on the number of host systems which could be connected to that base module, plus a termination card and a maintenance card (MC).

As described in the afore-cited patents, the "poll test" is defined as the procedure used by a host system and its host dependent port to establish communication with a DLP subsystem. The host system initiates a connection to a data link processor by performing a "poll test" sequence. The result of this sequence is as follows:
1. a connection is made from the host system to the data link processor that also includes the status condition of the addressed data link processor.
2. a signal indication that a particular data link processor is "not active" in that particular DLP address, that is, the DLP is not physically present, or it has been taken off-line by the maintenance card, or it is unavailable because of a PROM parity error.
3. a signal indication that another distribution card (DC) is actively engaged in the particular base module and thus a path to the requested DLP is not available at this time.
4. a signal indication that the address requested did not carry the proper parity.

To begin a "poll test", the host system 10 sends a Channel Select to the particular base module that it has selected to be connected. The Channel Select signal provides an indication to the distribution card (DC) that it has been selected for a poll test. The host system sends the address for the DLP on data lines D-8 (MSB, most significant bit) through D-1 (LSB, least significant bit).

A LEM (line expansion module) card can be connected to a base module to enable 16 DLPs to be connected to a signal MLI $15_i$. A BCC (base control card) can be used to provide identity signals for a base module.

If a line expansion module (LEM) is in use, the host system sends the distribution card the address of the requested base module on data lines C-8 (MSB) through C-1 (LSB). If a base control card (BCC) is to be addressed, then bit A-8 is used. The host dependent port (HDP) then sends Address Select to all of its base modules. This causes the distribution cards that receive the Channel Select to begin a poll test, and signifies to all other distribution cards that the host system interface is busy. This busy indication is needed by non-connected distribution cards to resolve distribution card priority in handling DLP requests for connection in situation where there is a multiple distribution card base environment.

The distribution card (DC), which is selected by the Channel Select and the Address Select signal, acknowledges by returning a DLP strobe signal back to the host system 10. If another distribution card is actively engaged on the base module backplane, or a distribution card of higher priority is also taking a poll test connection, then a "port busy" indication accompanies the acknowledge signal. If the vertical parity carried on the address is incorrect, a parity error indication accompanies the acknowledged signal. If the base module is available for connection and the address parity is correct, then the host system receives only the acknowledge signal. The distribution card addresses and connects to the addressed DLP.

The distribution card connects with the selected DLP by decoding the DLP address and driving one of eight address lines. The DLP specified by the address line has the address receiver jumpered to the correct address line. The DLP receiving this address sends a DLP connected signal (LCPCON) back to the host system to indicate its presence.

Upon receiving an "acknowledge" signal, and no indication of a port busy or parity error signal, the host system drops its Channel Select signal. This makes all lines available for connected communication. However, if an exception condition is reported, the host system must disconnect from the DLP.

When the distribution card detects the absence of a Channel Select, it sends another acknowledge (strobe signal). If the DLP addressed, has responded with LCPCON, the distribution card "enables" the DLP's status signal to the host system with this second "acknowledge". With the second acknowledge, the DLP and host system are connected via the distribution card. If the selected DLP did not respond (because it was off-line or not installed) the host system receives (together with the acknowledge signal) a DLP status signal of "zero" indicating that the DLP is not available.

If the DLP is unable to handle a poll test at this time (because it is busy) the DLP status indicates this condition. It is the function of the host system to detect and to respond to this condition by "disconnecting" or converting to a poll request. The connection established with this "poll test" remins intact as long as "address select" remains true.

The DLP participation in the poll test-host system connection routine is minimal. The DLP only receives its unique address line and returns LCPCON in acknowledgement and enables the status line. If there are multiple distribution cards installed in a base module, then access to the backplane of the base module is achieved by a request granted mechanism in the path selection module (PSM). The PSM also provides for distribution card priority resolution. POLL TEST TO POLL REQUEST CONVERSION: If the host system 10 is performing a poll test, and the initial DLP status indicates that the DLP desires access to the host system for information exchange because of a previous I/O descriptor, the host system has three options:

(a) disconnect
(b) selectively clear a DLP
(c) handle and service the DLP

If the option (c) is selected, the host system converts to a "poll request". A "poll request" is defined as the procedure used by a data link processor to establish communication with a host system. A "poll request" is the opposite of a "poll test" because the origination of the communication is reversed, that is, with the DLP being the transmitter and the host system being the receiver and responder.

In conjunction with any initial status in the "read" direction (information flow toward the host system) the distribution card sends the DLP data toward the host system. If the initial status is "Send descriptor link", this data is the first word of the descriptor link and contains the host return field. The host system must check this field to be certain that it can handle the DLP information transfer. If the host system cannot handle it, the DLP must "disconnect" before sending any host system strobes. DLP INITIATED CONNECTION (POLL REQUEST): When access is required to the host system and a disconnection has occurred, the DLP re-establishes connection by initiating a "poll request" sequence. Because all DLP's may request connection at the same time, a decision is made on a priority basis. Priority is partitioned into two types—(a) global priority, and (b) base module priority. The global priority of a DLP is based on the type of peripheral device which it services. There are 6 standard levels of global priority for DLPs. The global priority of a particular DLP is assigned with regard to the host system access requirements of the peripheral device, such as speed, stream mode, etc.

An additional and higher level of global priority is provided to designate an emergency request. This is designated as global priority equal to 7. An emergency request is defined as a condition requiring immediate access to the host system in order to avoid difficulty in error recovery or operator action. Global priority is used by the main host system to determine the priority of each requesting distribution card. Base module priority is the priority of each DLP within the base. Base module priority is used by the distribution card to determine the priority of each requesting DLP.

Base module priority is determined by the DLP number of each DLP in the base module. This number corresponds to the DLP address jumpered on each DLP, for example, the DLP address 7 is equal to DLP number 7 which is equal to the base module priority equal to 7. The established priority levels are arranged such that the highest base module priority is 7 while the lowest is 0. Only one DLP within each base module is assigned to each priority number. Thus, a base module has been organized to contain a maximum of up to 8 DLPs.

To begin a poll request, the DLP raises the "request" level jumpered to one of eight DLP request lines in the DLP, depending upon and equal to tha address of the DLP. Upon detecting a DLP request, if the host system is idle, the distribution card raises an interrupt request to the host system. When the host system detects "Interrupt Request" it sends "Access Granted" to all the base modules and begins a poll request sequence. Access Granted allows all distribution cards that have requests on-line to begin poll requesting. Access Granted also signifies that the message level interface (MLI) is busy to all distribution cards that are not requesting.

CONNECTED STATE: In the connected state, the distribution card (DC) provides the communication path between the host system and the selected data link processor. All communication between the host system and the base module is asynchronous. This requires that send/acknowledge on the message level interface be pulses rather than levels. The host system send/acknowledge (AG+SIO) and the DLP send/acknowledge (LCPST/) are pulses on the message level interface (MLI).

The base module of the I/O subsystem can support up to eight data link processors which are mounted on slide-in cards which connect to the backplane of the base module. In each base module facilities are provided for slide-in cards which can be installed and which work with the data link processors and the main host system. These cards may be summarized as follows:

Distribution Card (DC):

The distribution card provides an electrical and functional interface between a given DLP base module and a host system. The circuitry of this card provides host system connection for 1-8 data link processors (DLPs). The routines for establishing a connection between a given DLP and the host system are implemented by logic circuitry contained on the distribution card. A connection can be initiated by either the host system or by a data link processor. When the host system initiates the connections, this is designated as "poll test"; when the data link processor initiates connections, these are designated as "poll requests".

All communications between a host system and a base module are asynchronous. The distribution card synchronizes this communication. The distribution card provides for the capabilities of up to 6 transfer paths into a base module from one or more host systems. Each separate path into a base module requires a separate distribution card, if a multiple configuration is used, then a card known as the PSM or path selection module is required. Once a distribution card has provided a connection between the host system and a selected data link processor, the distribution card assumes a "connected" state and then becomes practically transparent to communication transfers between the host system and the selected data link processor.

PATH SELECTION MODULE (PSM): The path selection module is a card inserted into the base module and is required when the base module contains two or more distribution cards. The path selection module governs access to the base backplane, and it selects and routes the DLP request, in addition to also handling Master Clear of all base modules and in addition to Selective Clear of selected base modules.

BCML/TTL CONVERTER (BURROUGHS CURRENT MODE LOGIC/TRANSISTOR TYPE LOGIC) CONVERTER: This optional converter card is used to interface a main system host dependent port (HDP) that is using Burroughs current mode logic architecture with the standard transistor type logic format of the data link processor subsystem.

TERMINATION CARDS: Each DLP base standardly requires two termination cards (TC). These cards are designated as numbers 1 and 2 and contain the required transistors and capacitors in order to properly balance and load the base module backplane lines.

MAINTENANCE CARD: Since a single backplane is provided in common for all of the data link processors of a given base module, this permits a large proportion of the DLP maintenance to be centralized. This centralized maintenance circuitry is located on the maintenance card that is installed at one end of the DLP base module (opposite from the position of the distribution card). The maintenance card contains the clock generation circuitry for the entire base module, in addition to other maintenance circuitry, such as circuitry for diagnostic procedures. These diagnostic procedures include the ability to stimulate the peripheral interface, to control the clock to the data link processor, and to access the storage elements of the data link processor for comparison with standardly expected results.

As stated, the clock generation logic circuitry of the entire base module is located on the maintenance card. Since every card in a given base module receives this signal, the actual signal distribution has been divided into two lines in order to halve the driver requirements. The actual clock is an 8-megahertz, 50% duty cycle positive pulse on the DLP backplane.

DATA LINK PROCESSOR (DLP): A data link processor provides the control logic and the host system interface function for the associated peripheral units which it services. The DLP logic that controls the peripheral device is device-dependent; therefore, some DLPs contain different hardware and/or different micro-codes. Communication with the main host system is via the message level interface by way of the distribution card. Requests for host system access originate from a data link processor. The DLP disconnects from the host system while transferring information to or from the peripheral device it services. A DLP consists of two or more cards (generally 10 by 13 inches each). Each card can contain a maximum of 96 TTL chips arranged in a 6×16 array. The cards plug into adjoining slots in the base module backplane. A data link processor is made up of a common front end card (CFE) and one or more peripheral dependent boards (PDB). The CFE and first PDB are connected together by three foreplane connectors, containing 50-pins each (FIG. 3). If more than one PDB is required for a CFE, then the PDB cards are connected to each other by a fourth 50-pin foreplane connector. The CFE card contains the necessary logic to store and execute the micro-code that is dictated by the particular peripheral dependent board being used. Random access memory (RAM) chips and programmable read-only memory (PROM) chips are located on the common front end card. The unique logic required by a particular peripheral device is located on the PDB 80 and can vary according to the particular type of peripheral device being serviced. On the other hand, the CFE $10_c$ is a standardized card which provides functions common to all types of peripheral dependent boards and peripheral devices serviced.

The function of the DLP is to interface a particular peripheral device to the main host system. The required communication between the host system and the DLP is standardized in method and content. Every DLP communicates to the main host system using this standard discipline. The DLP masks the peripheral idiosyncrasies from the host system. Thus, the DLP is independent of the host system because of this. The data link processor performs its peripheral-controlling functions in response to information received over its interface to the host system.

Data link processor communication with the host system is accomplished by use of standard DLP "status" states. These status states indicate to the host system the requirements of the DLP (at any given unit of time). Once a connection is established between a data link processor and a host system, all information transfers are performed as indicated by the DLP "status" signal. Thus, the entire communication process is oriented about the DLP and is "DLP status driven". The "status state signals" are common for every type of data link processor. This has been described in detail in U.S. Pat. No. 4,162,520.

Every data link processor contains a message buffer of a size sufficiently applicable to its associated type of peripheral device. Data transmissions between the DLP and the host system operate to and from this message buffer. This eliminates access errors for peripherals having fixed record lengths such as card readers, printers or card punches. Stream mode devices such as tapes and disks contain and utilize two or more buffers to accomplish variable length message transfers.

DLP STATUS FLOW SIGNALS: The DLP status flow is designed to allow orderly message transfers. When it is said that the host system is "DLP status driven", this means that the DLP indicates its requirements to the host system by sending its status state signal. These status states are transmitted continuously by the DLP once it is connected to the host system. The host system examines these status lines at DLP "send-/acknowledge" time. Every DLP implements this common signal flow in a manner designed to provide as much commonality as possible so that each DLP will have a standardized routine. Status states are generated for host system usage only; they are not used logically by the DLP. They are used to make the host system aware of the internal operation routine of the DLP. Thus, this allows the host system to anticipate somewhat the requirements of the DLP.

STATUS STATE SIGNALS FOR THE DATA LINK PROCESSOR: As was previously described in U.S. Pat. No. 4,162,520 on column 70 and in connection with FIG. 6A and Table VII, each condition or situation of the operating routine of the DLP will have a Mnemonic and a "status state count number". In the present system which uses the data link processor and a host dependent port, HDP, rather than the input/output translator (IOT) of the above mentioned patent, the following Table O-SS outlines the description of each of the status states of the data link processor in a generalized sense. It will be seen that each of the states follow the same routine pattern of that shown for the earlier line control processors. Slight variations in meaning occur for each type of DLP according to the type of peripheral it services. A specific table for the Train Printer DLP will be presented hereinafter.

TABLE O-SS

| Status - Mnemonic | Status State Count | Usage or Meaning |
|---|---|---|
| Cleared | STC=0 | Entered by the DLP when it is cleared. This status is also shown if the DLP is not present, it has a PROM parity error, or it has been taken off-line by the Maintenance Card. |
| Disconnect | STC=1 | Used by the DLP to indicate that no more transfers are possible during the connection, or to indicate that the DLP is unable to accept a new I/O descriptor. |
| Reserved | STC=2 | Reserved for expansion. Detection of this status results in an error. |
| Idle | STC=3 | Indicates that the DLP can accept a new I/O descriptor, or that a DLP receiving this new descriptor requires additional descriptor words. |
| Read | STC=4 | Indicates that data is being transferred to the host system by the DLP. |
| Send Descriptor Link | STC=5 | Indicates that the descriptor link is being sent, to the host system. |
| Receive Descriptor Link | STC=6 | Indicates that the DLP needs to receive, or is receiving the descriptor link. |
| Result Descriptor | STC=7 | Indicates that the result descriptor is being sent to the host system. |
| Write | STC=8 | Indicates that the DLP needs data from the host system. |
| Encoded Status | STC=9 | Indicates that the DLP is sending special status information on the data lines. |
| Port Busy | STC=10 | The host is waiting on port busy, but the LEM has a request from another DLP. |
| I/O Descriptor LPW | STC=11 | Indicates that the DLP requires the I/O descriptor LPW. |
| Break | STC=12 | Indicates the end of a data message, and the DLP now wants an LPW. |
| Break Enable | STC=13 | Indicates the desire by the DLP to transmit another message to the host system. The host system may accept or refuse this request. |
| Character Transfer | STC=14 | Used by certain DLPs to resolve the contents of the last data word that has been received |

TABLE O-SS-continued

| | (Generalized Pattern) | |
|---|---|---|
| Status - Mnemonic | Status State Count | Usage or Meaning |
| Result Descriptor LPW | STC=15 | from the host system. Indicates that the final word of the result descriptor is being sent to the host system and is followed by the appropriate LPW. |

INFORMATION TRANSFERS: All information transfers between the DLP I/O subsystem and the host system are asynchronous and accomplished by means of control strobes. On the other hand, transfers between distribution card and the DLP are synchronous. The various types of information transfers are briefly described hereinunder.

SYSTEM TRANSMIT: When information is ready to be sent to that I/O subsystem, the host system emits a pulse (SIO) to the DLP I/O subsystem. When the subsystem has received data it then emits a pulse (LCPST) over to the host system. At this point the next transfer takes place beginning with a SIO signal. Resynchronizing of the asynchronous signals occurs in the distribution card (DC). Upon receipt of the host system strobe, the distribution card synchronously sets the STIOL level to the DLP. STIOL is synchronously reset when LCPSTL is "true" from the DLP. The answer to the host system occurs as soon as LCPSTL is "true" from the DLP. If this is the case, STIOL is "true" for only one clock period and the host system strobes are immediately answered. Data from this system is latched in the distribution card on the trailing edge of the host system strobe.

SYSTEM RECEIVE: When the host system can accept another word of data from the DLP I/O subsystem, it emits a pulse (SIO) to the subsystem. In turn, when the subsystem is capable of sending a new word it emits a pulse (LCPSTL) to the host system. Upon receipt of the host system strobe, the distribution card synchronously sets the STIOL "level" to indicate that a new cycle can begin. The new cycle is completed and the host system is strobed when LCPSTL is "true" and STIOL is synchronously reset. LCPSTL can be "true" before the SIO is received. If this is the case, STIOL is "true" for only one clock period and the host system's strobe pulses are immediately followed by subsystem strobe pulses with new data. Data to the host system is latched in the distribution card on the leading edge on the subsystem strobe pulse to the host system.

LINE TURN: In the course of a message transfer, it is sometimes necessary to change the information direction. The host system and the DLP coordinate in this turnaround of bi-directional lines. The DLP controls the data direction in the base module with a backplane line called I/O send (IOSND/). I/O send, when low, directs the data lines toward flow into the host system. The DLP initiates the "line turn" with a status transition that requires a change in information direction. Two situations occur here:

1. Host System Transmit to Host System Receive: If the host system detects a status change when it receives an acknowledge (on the information transfer that requires it to receive information) the host system sends another strobe to acknowledge the "status change". The DLP detecting the host systems "acknowledge" raises the I/O send and begins transmission to the host system.

2. Host System Receive to Host System Transmit: If the host system acknowledges an information transfer in conjunction with a status change that requires a line turnaround, the DLP inactivates the I/O send and sends another DLP strobe to the host system. When the host system receives the "acknowledge" (that the base lines have been turned), then the host system begins to transmit to the DLP.

DLP BASE ADDRESS: As the DLP base backplane is made up of common lines running the length of the base, the printed circuit cards, which form the DLP, can function in almost any set of slide-in card locations. The base address chosen for a DLP is "jumpered" on the DLP card (FIG. 3). The base address serves only to make the DLP unique within the base. The DLP's global priority is not affected by its base address. This priority is selected on the distribution card (DC).

There are two backplane line functions that are linear: the DLP request and the DLP address. They are allocated eight lines each (0-7). The request and address jumpers must correspond.

DLP ID (IDENTIFICATION): Upon receiving a TEST/ID OP code, the DLP returns a two-word result descriptor (R/D). The second word contains DLP ID information. Digits A and B of the ID word are a predetermined bit pattern specifying the type of DLP. Digits C and D of the ID word are a bit pattern specified by field-installed jumpers, and are used to uniquely identify the DLP. The ID word for the DLP is formatted as follows:

| A | | | | B | | | | C | | | | D | | | |
|---|---|---|---|---|---|---|---|---|---|---|---|---|---|---|---|
| 8 | 4 | 2 | 1 | 8 | 4 | 2 | 1 | 8 | 4 | 2 | 1 | 8 | 4 | 2 | 1 |

I/O DESCRIPTORS: The I/O descriptor is transmitted in 17 parallel bits including odd parity. The DLP OP codes are limited to the following four types:
1. Read
2. Write
3. Test
4. Echo Operations that do not transfer data are considered "test". Thus, a test is defined as an operation that results in the host system receiving a result descriptor only. Echo is a maintenance operation that causes the DLP to accept a buffer load of data from the host system, and then return it back to the host system. This allows a quick confidence check of the I/O data path as far as the DLP buffer is concerned. Also, the various translation logics can be checked by an echo operation.

DLPS that require further information associated with the basic operations obtain that information in the form of variants. The first I/O descriptor transfer contains the four OP code bits and up to 12 variant code bits. Further variants are transferred in 16 parallel bit increments and are not limited to any size.

RESULT DESCRIPTORS: A result descriptor is transmitted to the host system along 17 parallel bits including odd parity. The first four bits (one digit) of the first word of the DLP result descriptor are common for every DLP. These first four bits are shown as follows:

| Bit | Significance |
|-----|--------------|
| A8  | Not ready peripheral |
| A4  | I/O Descriptor error |
| A2  | MLI Vertical parity error |
| A1  | MLI longitudinal parity error |

The B, C and D digits of the "DLP result descriptor" will vary according to the type of data link processor involved.

FIG. 4A shows a block diagram of the common front end, $10_c$, (which is sometimes designated as a "Common I/O" unit). The maintenance control bus 30, coming from the maintenance card $20_{om}$ provides input to a receiver 15 which has one output to the address multiplexor 12 and another output on bus 37 to the peripheral dependent board (PDB) 80.

The distribution card data bus 32 provides input to receiver 16 while line 31 provides another input (RCV/) to receiver 16 from the peripheral dependent board 80. One output of receiver 16 is fed to the address multiplexor 12; while the other output forms bus 36 as a data bus to the PDB 80.

Receiver 17 has one input from the maintenance card data bus 34 and another control, SIMRCV/ (simulate receive) input line 33 from the peripheral dependent board PDB 80. Receiver 17 provides an output to the address multiplexor 12 and an output to the data bus 38.

Bus 35 from PDB 80 provides another input to the address multiplexor 12, while the low order address bit (A0) from the PDB 80 on line 36 provides an input to the PROM 13. PROM 13 provides a bus to the PROM register 14, which register also has an input from AND gate 24 which has two inputs; one of which constitutes the PROMCLK/ line and the other input is from the parity check circuit 18 to signal whether or not a parity error has been detected.

PROM register 14 has an output on bus 40 for maintenance display signals and connects to the common backplane of the base module. Another output of the PROM register 14 connects to the Request Status Latches circuit 19 which feeds its output to drivers 20 to provide signals designated IOSF (I/O Send flip-flop) Status, REQ (request) and EMREQ (emergency request) which are interrupts to the host. This bus also connects to the common backplane.

The PROM register 14 outputs include: the control lines of bus 43, the PDB usage bus 44 and the multiplexor enable bus 45, all of which connect to the peripheral dependent board, PDB 80.

A random access memory or RAM buffer storage 22 will be seen having four sets of inputs from the peripheral dependent board 80. These inputs are: the chip select line 50, the write enable line 51, the RAM data in-bus 52 and the RAM address bus 53. The output bus of RAM 22 is designated as the RAM data-out bus which connects to the peripheral dependent board 80.

COMMON FRONT END-CARD (CFE)

Referring to FIG. 4A which shows a block diagram of the common front end (CFE) $10_c$, the central operative element of the Common Front-End is the PROM controller and storage unit 13. The PROM storage 13 consists of 13 separate PROM chips which may have a total storage capacity of 1024 52-bit words. This includes odd parity.

As seen in FIG. 4A the common front end also contains the receivers 15, 16 and 17, for the data link processor (DLP) interfaces with the distribution card on data bus 32 and the maintenance card on control bus 30. The "enable" signals for these buses are driven by the peripheral dependent board (PDB) 80.

The data link processor RAM storage buffer 22 has a capacity of 1027 17-bit words which includes odd parity. The RAM storage unit 22 is controlled entirely by the peripheral dependent board 80 (FIG. 5A). The following Table IA lists a glossary of various signals and terms used in the common front end. The Table IB is a glossary of terms used in the peripheral dependent board PDB 80, of the train printer-data link processor.

TABLE IA

| COMMON FRONT END CARD GLOSSARY OF TERMS | |
|---|---|
| A0 | BROP |
| PROM address bit 0. | When high, a 16-way PROM address branch is selected. |
| A1 | BRST |
| PROM address bit 1. | When high, use stack register for PROM address. |
| A2 | BUFFEND/ |
| PROM address bit 2. | Active low, from PDB, used to stop burst mode. |
| A3 | CLK8 |
| PROM address bit 3. | 8-megahertz clock. |
| A4 | CLK8/ |
| PROM address bit 4. | 8-megahertz clock not. |
| A5 | CLKEN |
| PROM address bit 5. | High active, clock conditioning level. |
| A6 | CLKEN/ |
| PROM address bit 6. | Low active, used to enable clock on PDB and CFE. |
| A7 | CLKST |
| PROM address bit 7. | When high, PROM clock is disabled. |
| A8 | CLOCK . . . 0 |
| PROM address bit 8. | 8-megahertz backplane clock from MC. |
| A9 | CLOCK/ |

TABLE IA-continued
COMMON FRONT END CARD GLOSSARY OF TERMS

PROM address bit 9.
ADLOC/
  When high, DLP is MC addressed or DLP address is not valid.
ADRVLD/0
  When low, LOCnn/.0 is valid.
AF
  When high, strobe I/O has been received.
AF/
  When low, strobe I/O is sent to the PDB.
BASLCL/0
  When low, the base is in local.
BR6
  A branch line from PDB for PROM address selection.
DATAA8/0-DATAPR/0
  17-bit data bus from DC.
DBUSA8-PARITY/0
  17-bit data bus.
DBUSn
  9-bit bus used as input to PROM address MPXs.
DIOSND/0
  Active low, I/O SEND level to MC.
DLCPST/0
  Active low, DLP strobe to MC.
DPLY01/0
  Ten display lines to MC.
DSEL1/-DSEL4/
  Multiplexor address lines for data selection to display lines.
DSEL8/
  Active low, multiplexor chip select line for input to display lines.
DSIMA8/0-PARSIM/0
  17-bit data bus from MC.

DSIMn
  9 bits of DSIM lines, used to become DBUSn.
DSTAT1/0-DSTAT8/0
  Four DLP status lines to MC.
EMREQ
  Active high, DLP emergency request.
EMRREQ/0
  Active low, DLP emergency request to DC.
GPRIF/
  Peripheral bus control term to PDB.
GPRIF/.0
  Active low, from MC, disconnects PDB peripheral cable.
GRP0/
  Active low, controls 16-line display to MC.
INRAMA8-INRAMPR
  17 RAM input data lines.
IOSF
  I/O SEND flip-flop to PDB.
IOSND/.0
  I/O SEND to DC.

OPDECI
  PROM address A0 bit from PDB when 16-way branching.
OPDECX
  PROM address bits A1-A3 from PDB, when 16-way branching.
PARSIM/0
  Data simulate parity line from MC.
PER
  Active high, PROM output parity is even (an error).
PERF
  Active high, PROM parity error is present.
PERF/
  Active low, Prom parity error (disables clocks).
PROMCLK/
  PROM clock.
RAM
  17 bits of RAM addressed by RAMAD0 RAMAD9.
RAMA8-RAMPR
  17 bits of RAM output information.
RCV/

CFE control logic clock.
CLR/
  Active low, logic clear term.

CLRD
  Active high, logic control term.
CLRLAT
  Active high, logic term used to control SCLR.
CONECT/
  Active low, DC is connected to DLP.
CS/
  Active low, RAM chip select level.
LCLCLR/0
  Active low, clear level from MC.

LCPAD
  Active high, DLP is addressed by DC or MC.
LCPAD/
  Active low, DLP is addressed by DC or MC.
LCPADF
  Active high, DLP is addressed by DC or MC.
LCPCON/0
  Active low, DLP is connected to DC.
LCPRQn/0
  Active low, DLP request levels to DC.
LCPSTL
  Active high, DLP strobe level.
LCPSTL/0
  Active low, DLP strobe level to DC.

LCSTU1/0-LCSTU8/0
  Four DLP status lines to DC.

LOCAL/
  Active high, DLP is not MC addressed, or address is not valid.
LOCAL/.1
  Active low, DLP is MC addressed.
LOCnn/.0
  Local address lines from MC.
MLCPAD/0
  Active low, DLP is addressed by MC.
MSTCLR/0
  Active low, base power-up clear from MC.
MSTIOL/0
  Active low, maintenance strobe I/O from MC.
MTERM/.0
  Active low, maintenance terminate from MC.

OFFLN
  Active high, MC has localized the CFE.
OFFLN/
  Active low, the DLP is in local.
OFFLNE/0
  Active low, off-line control level from MC.
START/.0
  Active low, from MC, allows clock in signal-pulse mode.
STCKA8-STCKA0
  PROM address lines used during stack branching.

STCLKEN
  Active when going high, counts up the stack register +1.
STIOL/.0
  Active low, strobe I/O from DC.
STOPB
  Active high, used to stop burst mode.

STOPB/
  Active low, stop burst mode to PDB.
STOPF
  A 2-way PROM branching bit.
SW1/
  Active low, used to do PROM maintenance read.
SWH.1/.0
  Active low, SW1/ from MC.

TERMF
  A 2-way PROM branching bit.
TERMF/

TABLE IA-continued
COMMON FRONT END CARD GLOSSARY OF TERMS

Active low, enables data bus from DC.
REQ
Active high, DLP request for DC attention.
SCLR
Active high, synchronized clear, sets PROM address = 0.
SEL2/-SEL6/
Active lows, to PDB, for MPX enables.
SELCLR/0
Active low, clear line from DC.
SEMREQ/
Active low, an emergency request is present in the base.
SIMRCV/
Active low, enables MC DSIM lines, from PDB.
SP/...0
Active low, single-pulse mode from MC.

ST1-ST8
DLP status lines internal to CFE.

LDINT/
Active low, (load interface) PROM MLI bus control level.
LDSTK/
Active low, allows stack register load of current PROM address. This level is held high during all microcode subroutines.

Active low, used to terminate burst mode.
TERM/..0
Active low, terminate level from DC.
TEST5 and TEST6
2-way PROM branching bits from PDB.

TEST8-TEST14
2-way PROM branching bits from PDB.
WE/
Active low, RAM write enable level.
BRANCH1-#BRANCH5
PROM branching control lines.

CONST0-#CONST7
Multipurpose PROM outputs, PDB-dependent.
G3-#L4
PDB dependent PROM outputs (see PDB Glossary of Terms).
LCPSTL/
Active low, DLP strobe level, from PROM controller to DC.
NEXT0-#NEXT8
PROM address bits.

PARITY
PROM parity bit (odd).

+5V
VCC from power supply.

TABLE IB
Train Printer-Data Link Processor
PDB GLOSSARY OF TERMS

BRANCH1-#BRANCH3
Branch lines from microcode that select which signal is selected to generate A0.

CONST7-#CONST0
Control status lines to controlling registers on PDB, microcode outputs. Also contains literal input for accumulators.
J4
Write enable signal from microcode. Gated with 8-MHz clock to generate WE/ (write enable) to CFE card.
ACC1
Accumulator address bit 1 from microcode.
ACC2
Accumulator address bit 2 from microcode.

ACC4
Accumulator address bit 4 from microcode.

ACC8
Accumulator address bit 8 from microcode.
AD0-AD7
Accumulator data. The 8-bit output of the accumulators.

A0
PROM address bit 0. Manipulated by the microcode to provide 2-way branching depending upon the state of the signal being tested.
BOTCF/
Bottom character of DBUS equals HEX CF (delimeter character code). Low active
BR6
Branch 6 signal, microcode output #14. Used with other #BRANCH signals to select which signal generates A0 (LSB of CFE microcode address).
CDPARGEN
DBUS digits C and D have odd parity. High active

CIDL/
Chain identification level from the printer. A 6-bit ID code of negative pulses that is generated from the notched gear teeth of the train module.
CIDLFLAG
Synchronous result of CIDL/.

CID8-DID1
Identification jumpers.

CLEAR/
Clear signal from the CFE card.
CLKEN/
Clock enable from the CFE card. Disables PDB clock when high.
CLKLPWRG
Clock longitudinal parity word (LPW), microcode output. Normally high. LPW generator is clocked on the positive edge of this signal.
CLOCK . . . 0
8-MHz clock from backplane.
COLDONE
Column done. The output of the column done RAM. A high level if column has been serviced. Becomes TEST14 on the foreplane and is sent to the CFE card for 2-way branching.
CONECT/
When low, this signal indicates a connected condition with the host system.

CONTRAD1-CONTRAD6
Control address input to control register, from microcode.
CS/
Chip select/. When low, enables the RAM buffer on the CFE card. This signal is grounded on the PDB.
CSL/
Chain sync level from the printer. A negative pulse, occurs once for each revolution of the train module. It is used by the TP-DLP to keep in sync with the train module. It is developed from the

TABLE IB-continued
Train Printer-Data Link Processor
PDB GLOSSARY OF TERMS CFE
Common Front End.
CSLF
Chain sync level flip-flop.

CSLFLAG
Synchronous result of CSL/.

DATAA8/0-PARITY/0
Backplane common data bus. From DBUS via tri-state inverters, enabled by XMIT.
DBUS
17-bit data bus.

DBUSA8-DBUSPR
17-bit data bus.

DBUSA8
Data bus A, digit 8 bit. MSB of DBUS, see DBUSA8-DBUSPR. Also sent to CFE card as TEST11 to test for paper advance information in descriptor.
DBUSC4
Data bus C, digit 4 bit. One bit of DBUS, see DBUSA8-DBUSPR. Also sent to CFE card as TEST13 to test for 1100 LPM bit in descriptor.
DBUSC8
Data bus C, digit 8 bit. One bit of DBUS, see DBUSA8-DBUSPR. Also sent to CFE card as TEST12 to test for delimiter mask in descriptor.
DC
Distribution Card.

DC1L/
Data control 1 level to the printer. Used in conjunction with DC2L/. Part of a 2-bit code which controls the operation of the printer (idle, scan-print, or paper advance).

DC1LCTR
Data control 1 level control register output. Generates DC1L and is used for DTnL selection.
DC2L/
Data control 2 level to the printer. Refer to DC1L/.
DC2LCTR
Data control 2 level control register output. Generates DC2L and is used for DTnL selection.
DCnL
Data control levels.
DCnL/
Data control levels.
DT8L/
Data transfer 8 level to the printer. DT8L/ thru DT2L/ are used in conjunction with DT1L to form a 4-bit code which transfers the type of paper spacing (format control) to the printer. This occurs only when DC1L/ is high and DC2L/ is low.
DTnL
Data transfer levels.

DTnL/
Data transfer levels. Low active.

EDPL/
End of page level from the printer. Goes low during a single or double space paper advance, when a format tape channel 12 punch is sensed. It is reset to a high level at the next paper advance cycle.
ENDATMPX
Enable data multiplexor, microcode output. En-
first chain sync pulse on the train. The next six chain sync pulses are gated to the CIDL line.

DELFOUND
Delimiter found. Sent to the CFE card as TEST8 to be used for 2-way branching. Its state depends upon the output of the DBUS decoding PROMs. It is high only when a delimiter character is present on the DBUS×n lines.
DIRAMCOL
Data in RAM column done. Data input to column done RAM. High active.
DIRAMINV
Data in RAM invalid. Data input to invalid RAM. High active.
DPLY11/0-DPLY13/0
Display line 11, 12, and 13. Sent out the backplane to the Maintenance Card and used to test internal nets on the Peripheral-Dependent Board.
DSEL4/-DSEL1/
Display select lines from Maintenance Card. Selects which inputs to the 8-to-1 multiplexor chips are selected.
DSEL8/
Display select 8/ from Maintenance Card. Enables 8-to-1 multiplexor chips to display circuit nets.

DSELn/
Display select lines.

DSIM
Data simulate lines. Maintenance data bus.

DSIMA8/0-PARSIM/0
Backplane data simulate bus. Same as DATA×n/0 lines except that it is only used for maintenance purposes.
DT1L/
Data transfer 1 level to the printer. The least significant bit of the 4-bit format code. Also used during the scan-print operation to transfer an equal compare bit to the column storage latches in the printer.
DT1LCTRL
Data transfer 1 level control register output. Source for DT1L when in a print cycle.
DT2L/
Data transfer 2 level to the printer. Refer to DT8L/.
DT4L/
Data transfer 4 level to the printer. Refer to DT8L/.

INRAMAD7-INRAMAD0
AD register outputs (A and D digits of register). Supplies the 8-bit input to the column done RAM and is used with RAMAD7-RAMAD0 (BC register) to supply the 16-bit register output to the data multiplexor.
INRAMA8-INRAMPR
16 bits of data plus parity sent to the RAM buffer on the CFE card. Same as DBUSA8-DBUSPR.
INTERFLG
Internal flag. Called STOP in microcode listing. Used by microcode to determine when to stop receiving buffer data from the host system.
INVALID
Data output of invalid RAM. High active.

IOSF/
I/O SEND flip-flop. When low, the TP-DLP is

TABLE IB-continued
Train Printer-Data Link Processor
PDB GLOSSARY OF TERMS ables output of data multiplexor onto the DBUS via tristate buffers.

ENDLFLAG
Synchronous result of EDPL/.

ENDTX1/
Enable DTX1. Enables DT1LCTRL to printer DT1L/ line via a tristate inverter when low.

ENFOR/
Enable format information to printer when low.

ENMDTX1/
Enable maintenance DTX1. Enables DT1LCTRL via a tristate inverter to PRIF07/0 when low.

ENMFOR/
Enable maintenance format. Enables format information to PRIF04/0-PRIF07/0 (maintenance peripheral lines).

ENMPX/
Enable multiplexor outputs to the DBUS.

FORERROR
Format error. Sent to the CFE card as TEST10 to be used for 2-way branching. Its state depends upon the output of the DBUS decoding PROMs (high = error).

FREECLK/
CLOCK/. Always running.

GPRIF/
Gate maintenance PRIF (peripheral) lines. When low, backplane PRIF lines are selected instead of train printer interface cable.

LPWA8-LPWD1
Longitudinal parity word generator outputs.

LPWCD
Longitudinal parity word in digits C and D of DBUS is OK. High active.

LPWERROR
Longitudinal parity word error. Sent to the CFE card as TEST6 to be used for 2-way branching. Its state depends upon the output of the DBUS decoding PROMs (high = error).

MAXCOUNT
Maximum count. High when BC register equals HEX FF.

MC
Maintenance Card.

MCIDL/
Maintenance Card generated CIDL/.

MCSL/
Maintenance Card generated CSL/.

MEDPL/
Maintenance Card generated EDPL/.

MICROCODE
A name given to the program information contained in the 1K-by-52 bit PROMs on the CFE card.

MLI
Message Level Interface.

driving the MLI. When high, the DLP can receive MLI information.

LATPRDAT
Latch print data into compare register. Load input to compare register. Low active.

LAT0-LAT7
Latched outputs of compare register.

DLP
Data Link Processor DL-2.

LDREGCAD
Load register column address. Load AD register with the column address. Load signal to the A and D digits of the general purpose register. Active when low. Column address is only one of the uses of this register.

LDREGAD
Load register RAM address. Load RAM address into the BC register. Load B and C digits of the general purpose register. Low active, from microcode. RAM address is only one of the uses of this register.

LOADCONT
Load control register, microcode output. Loads control register when low.

LOCAL/
When low, this signal indicates the Maintenance Card has access to the TP-DLP.

LOCDIS/
Local display. Activates the DSIM×n (data simulate) lines to the Maintenance Card.

MPR.L/
Maintenance Card generated PR2L/.

MPXA8-MPXD1
Data multiplexor outputs.

MPXDATAA
Data multiplexor A select. Refer to MPXDATAB.

MPXDATAB
Data multiplexor B select. Used in conjunction with MPXDATAA to select one of four inputs to the data multiplexor. Microcode output.

MPXPAR
Data multiplexor parity bit output.

MPXSELAD
Multiplexor select adder. Selects input to the accumulators from #CONST lines when low, and from adder when high.

OFFLINE/
Off-line signal from Maintenance Card. Also generates the signal TIBLOAD/ on the PDB to ensure that the train image buffer is reloaded after the TP-DLP has been Maintenance Card selected.

OPDECSEL
Operation decode select. When high, the decoding PROMs decode the OP code; when low, the decoding PROMs are used to decode LPW, vertical parity, delimiter characters, and format errors.

OPDEC1
OP decode line 1 from operation decode PROM on PDB. Used by CFE card to perform a 16-way branch when OPDECSEL is high. When OPDECSEL is low, this signal is used to detect format errors. During this time, OPDEC1 is high if digit bits 4, 2, and 1 equal zero.

OPDEC2
OP decode line 2 from pperation decode PROM on PDB. Used by CFE card to perform a 16-way branch when OPDECSEL is high. When OPDECSEL is low, this signal is used to detect delimiters. During this time, this signal is low only if the A

TABLE IB-continued
Train Printer-Data Link Processor
PDB GLOSSARY OF TERMS MOST/
Motor start command to the printer. A low pulse causes the train module motor circuit in the printer to enable the motor.

MOSTCTR
Motor start control register output.
MPAML/
Maintenance Card generated PAML/.
MPCSL/
Maintenance Card generated PCSL/.
MPFCL/
Maintenance Card generated PFCL/.
MPRSL/
Maintenance Card genarated PRSL/.
MPRIL/
Maintenance Card generated PRIL/.
OPDEC8
OP decode line 8 from operation decode PROM on PDB. Used by CFE card to perform a 16-way branch when OPDECSEL is high. when OPDEC-SEL is low, this signal is used for vertical parity checking. During this time, this signal is high only if the A and B digits of DBUS have odd vertical parity.
PAML/
Paper motion level from the printer. High while paper is advancing.
PAMLFLAG
Synchronous result of PAML/.
PARERROR
Parity error. Sent to the CFE card as TEST5 to be used for 2-way branching. Its state depends upon the output of the DBUS decoding PROMs and DBUSPR (high = error).
PARGEN
Parity generate. The generated parity bit for data on the DBUS. High active (odd parity).
PCSL/
Printer column scan level from the printer. A negative pulse used to duplicate the rotation of the train module and to identify the allowable scan time for the up-coming print position of the train module.
PCSLFLAG
Printer column scan level flag. Used by the microcode to test for PCSL leading edge.
PCSLT
Synchronous result of PCSL/.

PCTP/
Printer column timing pulse to the printer. A square wave clock.
PCTPFLAG
Printer column timing pulse flag. A positive pulse occurring at the trailing edge of each PCTP pulse.
PCTP1-PCTP8
Printer column timing pulse jumpers.

PDB
Peripheral-Dependent Board.
PERF/
Parity error flip-flop. From CFE card. Kill signal to the printer.

and B digits of DBUS contain a delimiter character (HEX CF). This signal is also sent to the CFE card as TEST9 to be used for 2-way branching.
OPDEC4
OP decode line 4 from operation decode PROM on PDB. Used by CFE card to perform a 16-way branch when OPDECSEL is high. When OPDEC-SEL is low, this signal is used for LPW checking. During this time, this signal is high only if the A and B digits of DBUS indicate a good LPW (A and B digits equal zero).

PFCL/
Printer final column level from the printer. Goes low when the printer logic has reached the last column during a scan operation. Not used by the TP-DLP.

PFCLFLAG
Synchronous result of PFCL/.

PRIFnn/0
Simulated peripheral interface lines.
PRSL/
Printer speed level from the printer. Not used by TP-DLP.

PRSLFLAG
Printer speed level. See PRSL/.

PR1L/
Printer ready 1 level from the printer. High when the printer is ready (on-line). Indicates that the printer is ready to receive commands.

PR1LFLAG
Synchronous result of PR1L/.

PR2L/
Printer ready 2 level from the printer. Low when the train module motor circuit is enabled (the motor is running).
PR2LFLAG
Synchronous result of PR2L/.

RAMAD8
RAM buffer address bit 8. Generated by control register.
RAMAD9-RAMAD0
RAM buffer address lines from the BC register. RAMAD7-RAMAD0 are also used to supply the B and C digits of the register to the data multiplexor along with the INRAMAD7-INRAMAD0 lines. RAMAD9 is grounded and not used. RAMAD8 is generated by the control register.
RAMAD8-RAMD1
16-bit RAM buffer output from CFE card.
RAMPAR
RAM parity. Parity bit from RAM buffer on CFE card.
RCV/
Receive/. When low, this signal turns on the DATA×n receivers to receive data from the Distribution Card (DC). Generated by the line turn logic on the PDB.

TABLE IB-continued
Train Printer-Data Link Processor
PDB GLOSSARY OF TERMS

REGISTER FILES
Register file chips. R440s. Six chips used as twelve 8-bit accumulators.
RESTLPW
Reset LPW. Microcode output. Presets the LPW generator to all ones.

RSETPCSL
Reset PCSL flag.

RSETTIB/
Reset TIB load flip-flops.
SELTHBH
Select top half/bottom half. Microcode output. Selects RAM buffer output digits A and B, when low, and selects digits C and D when high (for the RAM output multiplexor chips).
SEL0–SEL7
Selected 8 bits of data from compare multiplexor.

SEL2/–SEL4/
Select 2, 3, and 4. Generated from the #BRANCH lines and BRANCH6 on the CFE card. Used to select which 8-to-1 multiplexor chip is used for A0 generation.
SEL5/
Select 5/. When low, indicates that PROM address bit 0 is derived from the RAM address lines.
SELn
Select lines.

SETCSLF
Set chain sync level flop. Preset input to sync flip-flop. Low active.
SIMRCV/
Simulate receive/. Generated by the line turn logic on the PDB. Used during maintenance testing to simulate the DATA×n lines.
SPARE
Spare jumper. Not used.

SW1/
Switch one/. From Maintenance Card.

SYNCFLAG
Sync flag. Output of chain sync flip-flop.
TERMF/
Terminate signal from CFE card. Used on the PDB to generate the signal INTERFLG (STOP in microcode listing).

THRAMCLD
Top half of RAM column done select. When high, indicates upper half of PIB.
TIB=PIB
Train image buffer equals print image buffer. Data in compare register is equal to the data selected by the compare multiplexor. High active.
TIBLOAD/
Train image buffer load. When low, indicates that the train image buffer needs to be loaded.
TP-DLP
Train Printer Data Link Processor DL-2.
TRAIN ID
Train identification. The 6-bit identification number of the train installed on the printer.

WECOLDN
Write enable column done. Write enable signal to column done RAM. Low active.
WERAMBUF
Write enable RAM buffer. Write enable signal to RAM buffer on CFE card. Generated by microcode output #J4 and 8CLK1. Low active.

WERAMINV
Write enable RAM invalid. Write enable input to invalid RAM. Low active.
WEREGFIL
Register file write enable signal from microcode, supplies write enable signals to addressed 4-by-4 register file chips (accumulators).
XMIT/
Transmit/. When low, DATA ×n drivers are enabled.
1100LPMJ
1100 line-per-minute printer jumper. Field-installed. Low active.

120COLIP
120-column jumper. Low active. Field-installed jumper.
132COLIP
132-column jumper. Low active. Field-installed jumper.

DISTRIBUTION CARD INTERFACE: As previously indicated in FIG. 2, data link processors are housed in a base module unit. Each data link processor, consisting of two cards, slides into the base module housing having a common backplane to which the printed circuit boards of a data link processor are connected.

All communications between the common front end $10_c$ and the distribution cards such as $20_{0d}$, $20_{1d}$ are performed through the data link processor base module backplane as $20_{0B}$ of FIG. 3. The backplane is common to all cards that are installed in a base module.

Table II shows a list of all the backplane signals that occur on the distribution card interface to the common front end. The 17-bit wide data portion of the bus 32, FIG. 4A, is received from distribution card (DC) on the common front end (CFE). This same 17-bit bus is driven in the opposite direction (by drivers on the PDB) when the data link processor is sending data back to the distribution card. The enabling levels that control the direction of this bus are generated on the peripheral dependent board. However the Train Printer Data Link Processor, working with an output-only type peripheral, (Train Printer) does not send data back but rather receives data for printing.

TABLE II

| | Distribution Card/CFE Interface | | |
|---|---|---|---|
| Level | Pin # | Direction | Definition |
| LCSTU8/0 | 123 | to DC | DLP status bit 8 |
| LCSTU4/0 | 023 | to DC | DLP status bit 4 |
| LCSTU2/0 | 126 | to DC | DLP status bit 2 |
| LCSTU1/0 | 026 | to DC | DLP status bit 1 |
| LCPCON/0 | 074 | to DC | DLP is connected |
| IOSND/.0 | 124 | to DC | DLP is sending |
| EMRREQ/0 | 191 | to DC | DLP has emergency request |
| LCPRQ7/0 | 163 | to DC | DLP #7 has request |
| LCPRQ6/0 | 063 | to DC | DLP #6 has request |
| LCPRQ5/0 | 164 | to DC | DLP #5 has request |
| LCPRQ4/0 | 064 | to DC | DLP #4 has request |
| LCPRQ3/0 | 165 | to DC | DLP #3 has request |
| LCPRQ2/0 | 065 | to DC | DLP #2 has request |
| LCPRQ1/0 | 166 | to DC | DLP #1 has request |
| LCPRQ0/0 | 066 | to DC | DLP #0 has request |
| LCPSTL/0 | 024 | to DC | DLP strobe |
| STIOL/.0 | 127 | to CFE | Strobe I/O |
| TERM/..0 | 072 | to CFE | Terminate |

TABLE II-continued

Distribution Card/CFE Interface

| Level | Pin # | Direction | Definition |
|---|---|---|---|
| SELCLR/0 | 167 | to CFE | Selective clear |
| LCPAD7/0 | 176 | to CFE | DLP #7 is addressed |
| LCPAD6/0 | 076 | to CFE | DLP #6 is addressed |
| LCPAD5/0 | 177 | to CFE | DLP #5 is addressed |
| LCPAD4/0 | 077 | to CFE | DLP #4 is addressed |
| LCPAD3/0 | 178 | to CFE | DLP #3 is addressed |
| LCPAD2/0 | 078 | to CFE | DLP #2 is addressed |
| LCPAD1/0 | 179 | to CFE | DLP #1 is addressed |
| LCPAD0/0 | 079 | to CFE | DLP #0 is addressed |
| DATAA8/0 | 106 | Bi-Dir | Data bit |
| DATAA4/0 | 006 | Bi-Dir | Data bit |
| DATAA2/0 | 108 | Bi-Dir | Data bit |
| DATAA1/0 | 008 | Bi-Dir | Data bit |
| DATAB8/0 | 110 | Bi-Dir | Data bit |
| DATAB4/0 | 010 | Bi-Dir | Data bit |
| DATAB2/0 | 117 | Bi-Dir | Data bit |
| DATAB1/0 | 017 | Bi-Dir | Data bit |
| DATAC8/0 | 119 | Bi-Dir | Data bit |
| DATAC4/0 | 019 | Bi-Dir | Data bit |
| DATAC2/0 | 121 | Bi-Dir | Data bit |
| DATAC1/0 | 021 | Bi-Dir | Data bit |
| DATAD8/0 | 132 | Bi-Dir | Data bit |
| DATAD4/0 | 032 | Bi-Dir | Data bit |
| DATAD2/0 | 134 | Bi-Dir | Data bit |
| DATAD1/0 | 034 | Bi-Dir | Data bit |
| PARITY/0 | 136 | Bi-Dir | Data parity bit (odd) |

MAINTENANCE CARD INTERFACE: All communications between the common front end and the maintenance card (as $20_{0m}$) take place on the data link processor's base module backplane. Table III shows a list of all the backplane signals that occur between the common front end and the maintenance card.

TABLE III

Maintenance Card/CFE Interface

| Level | Pin # | Direction | Definition |
|---|---|---|---|
| DSTAT8/0 | 044 | to MC | DLP status bit 8 |
| DSTAT4/0 | 145 | to MC | DLP status bit 4 |
| DSTAT2/0 | 045 | to MC | DLP status bit 2 |
| DSTAT1/0 | 146 | to MC | DLP status bit 1 |
| DLCPST/0 | 140 | to MC | DLP strobe |
| DIOSND/0 | 144 | to MC | DLP is sending |
| MSTIOL/0 | 040 | to CFE | Strobe I/O |
| MTERM/.0 | 184 | to CFE | Terminate |
| MLCPAD/0 | 154 | to CFE | DLP is addressed |
| BASLCL/0 | 161 | to CFE | Base is in local |
| MSTCLR/0 | 172 | to CFE | Base clear |
| LCLCLR/0 | 174 | to CFE | Local clear |
| SWH.1/.0 | 058 | to CFE | Maintenance switch #1 |
| SP/....0 | 147 | to CFE | Single-pulse mode |
| START/.0 | 149 | to CFE | Allow clock(s) |
| CLOCK..0 | 048 | to CFE | 8 Mhz clock |
| ADRVLD/0 | 043 | to CFE | Local address is valid |
| LOC16/.0 | 187 | to CFE | Local address bit 16 |
| LOC08/.0 | 087 | to CFE | Local address bit 8 |
| LOC04/.0 | 188 | to CFE | Local address bit 4 |
| LOC02/.0 | 088 | to CFE | Local address bit 2 |
| LOC01/.0 | 189 | to CFE | Local address bit 1 |
| OFFLNE/0 | 073 | to CFE | DLP is off line |
| GPRIF/.0 | 061 | to CFE | Gate off peripheral interface |
| DSEL8/.0 | 060 | to CFE | Display select bit |
| DSEL4/.0 | 085 | to CFE | Display select bit 4 |
| DSEL2/.0 | 186 | to CFE | Display select bit 2 |
| DSEL1/.0 | 086 | to CFE | Display select bit 1 |
| DPLY01/0 | 054 | to MC | Display line |
| DPLY02/0 | 155 | to MC | Display line |
| DPLY03/0 | 055 | to MC | Display line |
| DPLY04/0 | 156 | to MC | Display line |
| DPLY05/0 | 056 | to MC | Display line |
| DPLY06/0 | 157 | to MC | Display line |
| DPLY07/0 | 057 | to MC | Display line |
| DPLY08/0 | 067 | to MC | Display line |
| DPLY09/0 | 168 | to MC | Display line |
| DPLY10/0 | 068 | to MC | Display line |
| DSIMA8/0 | 112 | Bi-Dir | Data simulate line A8 |

TABLE III-continued

Maintenance Card/CFE Interface

| Level | Pin # | Direction | Definition |
|---|---|---|---|
| DSIMA4/0 | 012 | Bi-Dir | Data simulate line A4 |
| DSIMA2/0 | 113 | Bi-Dir | Data simulate line A2 |
| DSIMA1/0 | 013 | Bi-Dir | Data simulate line A1 |
| DSIMB8/0 | 114 | Bi-Dir | Data simulate line B8 |
| DSIMB4/0 | 014 | Bi-Dir | Data simulate line B4 |
| DSIMB2/0 | 115 | Bi-Dir | Data simulate line B2 |
| DSIMB1/0 | 015 | Bi-Dir | Data simulate line B1 |
| DSIMC8/0 | 027 | Bi-Dir | Data simulate line C8 |
| DSIMC4/0 | 128 | Bi-Dir | Data simulate line C4 |
| DSIMC2/0 | 028 | Bi-Dir | Data simulate line C2 |
| DSIMC1/0 | 129 | Bi-Dir | Data simulate line C1 |
| DSIMD8/0 | 029 | Bi-Dir | Data simulate line D8 |
| DSIMD4/0 | 130 | Bi-Dir | Data simulate line D4 |
| DSIMD2/0 | 030 | Bi-Dir | Data simulate line D2 |
| DSIMD1/0 | 131 | Bi-Dir | Data simulate line D1 |
| PARSIM/0 | 137 | Bi-Dir | Data simulate parity line (odd) |

MAINTENANCE FACILITIES: In FIG. 2 certain maintenance facilities are provided. These consist of a console $50_c$ (which may include a cathode ray tube CRT, a mini-disk, etc.) and the maintenance card, as $20_{0m}$, plus other software packages and hardware which are included in the DLP. Under programmatic control, the console $50_c$ can be used to manipulate the DLP in such a manner as to determine its internal state for given operations and to compare it to a known correct state by use of the maintenance card $20_{0m}$. Thus diagnosis of a failing DLP can be made.

The console is the interface between the host system and the host system operator, as well as being the maintenance interface to the I/O subsystem. Maintenance of the Train Printer-Data Link Processor originates at the console, when in the off-line mode; and from the host system, when in the on-line mode of operation. A data base can be supplied on flexible diskettes or magnetic tape to perform diagnosis of the data link processor (DLP). The selection of the test and type of module can be done at the host system by a field engineer or a host system operator.

DIAGNOSTIC TESTING MODES: There are two modes of diagnostic testing, (a) off-line and (b) on-line. In either mode the units undergoing tests are not available to the host system as a resource and must be placed off-line prior to running diagnostics. Diagnostic programs use the console-to-maintenance card interface in the diagnosis of the subsystem modules. These programs can perform a card test on the addressed unit by means of a maintenance data base that is stored on flexible diskettes or is resident in the host system.

OFF-LINE MODE: This mode implies the following:
1. The host systems resources are not available
2. The test data base is console-diskette-resident
3. The operator must supply control information.

ON-LINE MODE: This mode implies the following:

1. The host systems resources are available
2. The test data base is host-system-resident
3. A host resident program performs the diagnosis.

Confidence test programs can be developed which use the message level interface (MLI) to ascertain a confidence level of the I/O subsystem unit or units under test. These tests may be used to isolate a failing unit so that maintenance can be invoked to determine if the cause of the failure is in an I/O subsystem module or in the peripheral device.

PERIPHERAL-DEPENDENT BOARD INTERFACE: As seen in FIG. 3 the peripheral dependent board (PDB) and the common front end card are provided with foreplane connectors $80_a$, $80_b$, $80_c$, $80_d$, and $80_{a1}$, $80_{b1}$, $80_{c1}$.

The interface between the common front end and the peripheral dependent board is made of three 50-pin foreplane connectors $80_a$, $80_b$ and $80_c$. Table IV lists the connectors and shows the pin numbers together with the logic names of the signals involved specifically for the Train Printer Data Link Processor.

TABLE IV
CFE FOREPLANE CONNECTORS FOR TRAIN PRINTER-DLP

| Connector | Pin Number | #-Side Signal | $-Side Signal |
|---|---|---|---|
| element 80 a1 | | | |
| 1 | 00 | RAMA4 | RAMPAR |
| 1 | 01 | RAMA1 | RAMA8 |
| 1 | 02 | RAMB4 | RAMA2 |
| 1 | 03 | RAMB1 | RAMB8 |
| 1 | 04 | GND | RAMB2 |
| 1 | 05 | RAMC4 | RAMC8 |
| 1 | 06 | RAMC1 | RAMC2 |
| 1 | 07 | RAMD4 | RAMD8 |
| 1 | 08 | RAMD1 | RAMD2 |
| 1 | 09 | INRAMB8 | INRAMA8 |
| 1 | 10 | INRAMB4 | INRAMA4 |
| 1 | 11 | INRAMB2 | INRAMA2 |
| 1 | 12 | INRAMB1 | INRAMA1 |
| 1 | 13 | INRAMC2 | INRAMC8 |
| 1 | 14 | INRAMC1 | INRAMC4 |
| 1 | 15 | SIMRCV/ | RCV/ |
| 1 | 16 | DBUSA4 | DBUSA8 |
| 1 | 17 | DBUSA1 | DBUSA2 |
| 1 | 18 | DBUSB4 | DBUSB8 |
| 1 | 19 | DBUSB1 | DBUSB2 |
| 1 | 20 | GND | DBUSC8 |
| 1 | 21 | DBUSC4 | DBUSC2 |
| 1 | 22 | DBUSC1 | DBUSD8 |
| 1 | 23 | DBUSD4 | DBUSD2 |
| 1 | 24 | DBUSD1 | DBUSPR |
| 2 | 25 | WE/ | GND |
| 2 | 26 | RAMAD9 | CS/ |
| 2 | 27 | RAMAD7 | RAMAD8 |
| 2 | 28 | RAMAD5 | RAMAD6 |
| 2 | 29 | GND | RAMAD4 |
| 2 | 30 | RAMAD3 | RAMAD2 |
| 2 | 31 | RAMAD1 | RAMAD0 |
| 2 | 32 | GPRIF/ | PERF/ |
| 2 | 33 | IOSF | DSEL8/ |
| 2 | 34 | DSEL4/ | DSEL2/ |
| element 80 b1 | | | |
| 2 | 35 | DSEL1/ | SW1/ |
| 2 | 36 | GND | CONECT/ |
| 2 | 37 | GND | LOCAL/ |
| 2 | 38 | GND | CLR/ |
| 2 | 39 | GND | SEMREQ/ |
| 2 | 40 | INRAMD2 | INRAMD8 |
| 2 | 41 | INRAMD1 | INRAMD4 |
| 2 | 42 | TEST14 | INRAMPR |
| 2 | 43 | TEST12 | TEST13 |
| 2 | 44 | TEST10 | TEST11 |
| 2 | 45 | GND | TEST9 |
| 2 | 46 | TEST8 | TEST6 |
| 2 | 47 | TEST5 | OFFLN/ |
| 2 | 48 | AF/ | BUFFEND/ |
| 2 | 49 | GND | CLKEN/ |
| element 80 c1 | | | |
| 3 | 50 | OPDEC4 | OPDEC8 |
| 3 | 51 | OPDEC1 | OPDEC2 |
| 3 | 52 | SEL6/ | TERMF/ |
| 3 | 53 | SEL4/ | SEL5/ |
| 3 | 54 | GND | BR6 |
| 3 | 55 | #L3 | #L4 |
| 3 | 56 | #L1 | #L2 |
| 3 | 57 | #K3 | #K4 |
| 3 | 58 | #K1 | #K2 |
| 3 | 59 | #J3 | #J4 |
| 3 | 60 | #J1 | #J2 |
| 3 | 61 | #I3 | #I4 |
| 3 | 62 | #I1 | #I2 |
| 3 | 63 | #H3 | #H4 |
| 3 | 64 | #H1 | #H2 |
| 3 | 65 | STOPB/ | #G4 |
| 3 | 66 | #CONST6 | #G3 |
| 3 | 67 | #CONST4 | #CONST7 |
| 3 | 68 | #CONST2 | #CONST5 |
| 3 | 69 | #CONST0 | #CONST3 |
| 3 | 70 | GND | #CONST1 |
| 3 | 71 | #BRANCH3 | #BRANCH2 |
| 3 | 72 | #BRANCH1 | SEL3/ |
| 2 | 73 | SEL2/ | GND |
| 3 | 74 | GND | A0 |

The following Table V is a listing of the signal lines connecting the Peripheral (Train Printer) to the peripheral-connector on the PDB card 80.

TABLE V
Signal Lines Between Train Printer and Peripheral Dependent Board (PDB 80).

| Peripheral Connector On PDB | 20 Conductor Coax Cable | Signal Name |
|---|---|---|
| S75 | | |
| S76 | | |
| S77 | SC | PCTP/ |
| S78 | SD | DC1L/ |
| S79 | SE | DC2L/ |
| S80 | SF | DT1L/ |
| S81 | SG | DT2L/ |
| S82 | SH | DT4L/ |
| S83 | SI | DT8L/ |
| S84 | SJ | MOST/ |
| S85 | SK | PR1L/ |
| S86 | SL | CSL/ |
| S87 | SM | PCSL/ |
| S88 | SN | PFCL/ |
| S89 | SP | PAML/ |
| S90 | SQ | EDPL/ |
| S91 | SR | PRSL/ |
| S92 | SS | |
| S93 | ST | |
| S94 | SU | |
| S95 | SV | CIDL/ |
| S96 | SW | PR2L/ |
| S97 | | |
| S98 | | |
| S99 | | |

THE PROM CONTROL-STORE: The PROM control-store 13 shown in FIG. 4A is made up of 13 PROM chips located on the CFE card $10_c$. These chips are combined to make up a 52-bit micro-code instruction word. The address lines of the 13 PROM chips are bused together so that all of the individual address lines are common to every single chip. The chip select on each PROM chip is always enabled (grounded).

The data output of the 13-chip PROM matrix forms the 52-bit word. This word is read out of the address that is present on the common input address line A0–A9 (FIGS. 4A, 5A). The PROMs herein are basically unclocked devices so that means is required to synchronize their outputs with an eight megahertz clock which feeds through gate 24. This is done by making use of register chips 14. The register chips contain eight flip-flops each. Thus, seven chips are used to synchronize and latch the 52-bit micro-code word. This latched micro-code instruction word is used to control the operation of the entire data link processor. Every eight-megahertz clock pulse latches the next subsequent word into the register chip 14.

Different types of data link processors require their own unique micro-code. Thus, all common front end cards will contain identical hardware except for the 13 PROM chips. Although the PROM word physically contains 52-bits, only 49 bits are used by the micro-code program. The remaining three bits are not party checked. Tables IVa and VIb indicate the 49-bit micro-code word, by bit position and mane. All PROM output signal names are preceded by a "pound sign" (#) so that they are easily recognizable. Bit 32 of the micro-code word is the odd parity bit. The CFE card is made to continually check for odd parity and it halts the micro-code program if a parity error (even parity) occurs on any 49-bit PROM micro-code word.

TABLE VIa

| PROM Output Signals | | | |
|---|---|---|---|
| Bit | Name | Bit | Name |
| 48 | #NEXT9 | | |
| 47 | #NEXT7 | 23 | #LDINT/ |
| 46 | #NEXT6 | 22 | #LDSTK/ |
| 45 | #NEXT5 | 21 | #G3 |
| 44 | #NEXT4 | 20 | #G4 |
| 43 | #NEXT3 | 19 | #H1 |
| 42 | #NEXT2 | 18 | #H2 |
| 41 | #NEXT1 | 17 | #H3 |
| 40 | #NEXT0 | 16 | #H4 |
| 39 | #NEXT8 | 15 | #I1 |
| 38 | #BRANCH1 | 14 | #I2 |
| 37 | #BRANCH2 | 13 | #I3 |
| 36 | #BRANCH3 | 12 | #I4 |
| 35 | #BRANCH4 | 11 | #J1 |
| 34 | #BRANCH5 | 10 | #J2 |
| 33 | #LCPSTL/ | 09 | #J3 |
| 32 | #PARITY | 08 | #J4 |
| 31 | #CONST7 | 07 | #K1 |
| 30 | #CONST6 | 06 | #K2 |
| 29 | #CONST5 | 05 | #K3 |
| 28 | #CONST4 | 04 | #K4 |
| 27 | #CONST3 | 03 | #L1 |
| 26 | #CONST2 | 02 | #L2 |
| 25 | #CONST1 | 01 | #L3 |
| 24 | #CONST0 | 00 | #L4 |

TABLE VIb

TP-DLP
CFE/PDB PROM Name
Cross Reference
Table

| CFE Name | PROM Word Bit | PDB Name |
|---|---|---|
| #G3 | 21 | LOADCONT |
| #G4 | 20 | ENDATMPX |
| #H1 | 19 | LDREGRAD |
| #H2 | 18 | CONTRAD1 |
| #H3 | 17 | CONTRAD2 |
| #H4 | 16 | CONTRAD3 |
| #I1 | 15 | CONTRAD4 |
| #I2 | 14 | CONTRAD5 |
| #I3 | 13 | CONTRAD6 |
| #I4 | 12 | "BRANCH 6" |
| #J1 | 11 | CLKLPWRG |
| #J2 | 10 | MPXDATAB |
| #J3 | 09 | MPXDATAA |
| #J4 | 08 | (not named) |
| #K1 | 07 | SELTHBH |
| #K2 | 06 | THRAMCLD |

TABLE VIb-continued

TP-DLP
CFE/PDB PROM Name
Cross Reference
Table

| CFE Name | PROM Word Bit | PDB Name |
|---|---|---|
| #K3 | 05 | ACC8 |
| #K4 | 04 | ACC4 |
| #L1 | 03 | ACC2 |
| #L2 | 02 | ACC1 |
| #L3 | 01 | WEREGFIL |
| #L4 | 00 | RESTLPW |

MAINTENANCE CONTROL: As seen in FIG. 4A, the common front end contains receivers 15, 16, 17 which include decoding logic. Receiver 17 is used for operation of the maintenance control lines 33, 34. Table VII shows the addressing signals for maintenance mode of the data link processor. Thus, this Table lists all possible maintenance to common front end addressing codes with the response of any given data link processor. The Maintenance Card (MC) has the ability to address any one of eight DLPs in the base module.

TABLE VII

ADDRESS CODES: DLP Maintenance Mode Addressing (Maintenance Card to CFE)

| Base Local (BASLCL/0) | Address Valid (ADRYLD/0) | Address Equal (LOCnn/.0) | Action Produced |
|---|---|---|---|
| 1 | 1 | X | Normal on-line mode |
| 1 | 0 | 1 | |
| 1 | 0 | 0 | Standard local mode, all maintenance available |
| 0 | 0 | 0 | Local mode with base in local |
| 0 | 0 | 1 | Base in local and the DLP clocks are disabled |
| 0 | 1 | X | Base single-pulse |

1 = high.
0 = low.
X = don't care.

The high order address line from the maintenance card (LOC 16/.0) must be "high" in order to address a DLP. It will be seen that all backplane signals are low active. The other four address lines provide encoding for DLP selection. The CFE does not decode the maintenance address until the maintenance card indicates the address is valid and stabilized by driving ADRVLD/0 low.

The maintenance card drives four lines which are used to enable unique maintenance features in any given DLP or connection module.

When in local mode, the CFE uses one of these lines (SWH.1/.0) for allowing the maintenance card to drive the address lines of the CFE PROM 13. When this line (SWH.1/.0) is low, the peripheral dependent board drives RCV/high and drives SIMRCV/low, as well as not driving the 17-line data bus 32.

Table VIII shows a list of the maintenance card lines which drive the PROM address lines in this local mode. This feature of the maintenance operation is used to verify PROM controller 13 integrity.

TABLE VIII
Maintenance Lines Driving PROM Address

| PROM Address Line | Maintenance Line | (Data Simulation) |
|---|---|---|
| A9 | DSIMC8 | |
| A8 | DSIMC4 | |
| A7 | DSIMA8 | |
| A6 | DSIMA4 | |
| A5 | DSIMA2 | |
| A4 | DSIMA1 | |
| A3 | DSIMB8 | |
| A2 | DSIMB4 | |
| A1 | DSIMB2 | |
| A0 | DSIMB1 | |

RAM BUFFER: The common front end $10_c$ of FIG. 4A contains a random access memory buffer (RAM) 22. This buffer memory 22 has a specifically designed organization for use in control of the Train Printer mechanism as seen in FIGS. 5B and 5C. This RAM buffer (data RAM) consist of 1,024 17-bit words. All inputs and outputs to this RAM are received by or driven by the peripheral dependent board PDB 80. The designation for the open collector line (60 nanosecond read access RAM) is RWON. This storage area is used to store the data, the OP code, the descriptor links, the descriptor links longitudinal parity word (LPW) and the various flags that are required to properly control the operation of the data link processor.

DLP ADDRESS AND REQUEST JUMPERS: There are eight backplane lines which are used by the distribution card(s) to address any one given data link processor (DLP). Likewise, eight backplane lines are used by the data link processors (DLPs) to indicate a service request to the distribution cards. The 16 lines are unique in that only one data link processor (DLP) can use a given request line. Further, the request lines are graded by priority. Once the priority of a data link processor is determined, that priority request line is "jumpered" for use on the common front end card (FIG. 3). The request and the address lines are identically numbered and operate as pairs. Therefore, once a request priority level is determined and jumpered, the corresponding address line is jumpered on the common front end card.

DLP LOCAL ADDRESS JUMPERS: The common front end card requires a minimum of two and a maximum of three jumpers (FIG. 3) to implement its local maintenance address. This address is used by a maintenance card, as $20_{0m}$, to address a data link processor as $20_{00}$. The data link processor's local address must always correspond to its on-line DLP address.

STACK REGISTER: The stack register 11 consists of three binary counter chips. This register contains the value of the current PROM address, or the value of the address to be used when returning from a subroutine by way of a stack-branch operation.

The Train Printer Data Link Processor will be seen to be made of two slide-in printed circuit cards. These are the common front end (CFE) card and the peripheral dependent board (PDB). Each of these two boards are totally different in function and structure; however, when they are used together they make up the totality of the Train Printer DLP.

The primary function of the CFE 10 is to provide a device in which to store and execute the applicable micro-code. The micro-code is used to sequence the operation of the data link processor (DLP). The random access memory ($RAM_{22}$) is housed on the common front end card and provides internal data link processor storage for various uses such as data storage, translation storage, etc.

The peripheral dependent board (PDB), on the other hand, contains the necessary logic to interface the peripheral device (as, for example a Train Printer) to the host system through the message level interface (MLI). (The message level interface $15_i$ will also be seen in U.S. Pat. No. 4,162,520 in FIGS. 1A, 2 and 3). The logical elements of the PDB are controlled by using the micro-code coming from the common front end (CFE). However, also, many signals are passed from the peripheral dependent board to the common front end to allow logical decision-making by the micro-code.

As seen in FIG. 4A there are interfaces to the front plane (double arrow) and to the backplane (single arrow) which involve the maintenance card. These MC lines will be seen as lines 30, 34 and 40.

MAINTENANCE CARD CONNECTION: There is a maintenance card common front end interface (MC/CFE) which is used when the maintenance card (MC) requires connection to a data link processor in order to perform normal maintenance functions. The maintenance card tries to connect to a DLP by driving the appropriate local maintenance address line (LOCnn/.0) and the signal ADRVLD/0 (address valid) low. This action causes the addressed CFE $10_c$ to recognize the MC connection and to drive the logic LOCAL/.1 low. The LOCAL/.1 term is used to enable a backplane receiver chip which allows the MC to take the DLP off-line (OFFLNE/0 signal coming from the MC goes low).

If the MC takes a DLP off-line, it is unavailable to the host system. If the DLP is off-line it does not see any DC (Distribution Control Card) attempts at connection, and all DLP requests to the DC are inhibited.

The maintenance card always takes the data link processor off-line when maintenance routines are called for. This is done so that maintenance functions (such as single-pulse, and PROM verification) do not interfere with normal distribution control card operations to the on-line data link processors. The logic term LOCAL/.1, when low, is also used to enable the following functions:

1. It allows GPRIF/.0 (from the maintenance card) to turn off the data link processors peripheral interface.
2. It becomes LOCAL/ which is used by the peripheral dependent board PDB for bus interface directional control logic.
3. It is used to allow the maintenance card (MC) local clear and PROM verification (SW1/) function.
4. It is used by the common front end card (CFE) for the development of the clock-enable term CLKEN.

DISTRIBUTION CARD CONNECTION: The following discussion involves the connection mechanism as used by the distribution control card/common front end card interface (DC/CFE) when the distribution control card requires connection to a data link processor. This connection will be initiated by a distribution control card (DC) poll test or by a data link processor (DLP) initiated poll request. The connection logic is shown in FIG. 4D.

The CONST lines 4–7 are fed as input to a 4-bit binary counter J3-C. The output of this counter is fed to a tri-state inverter C4-C to provide, as output, the "status" lines LCPSTU—. The data link processor address LCPADn/0 and the off-line signal OFFLN provide inputs to buffer chip M5-C whose output is fed through inverter P4-C to form the LCPAD signal to NAND gate M3-C. NAND gate M3-C also has signal inputs for parity error (PERF/) and off-line (OFFLN/). The output of NAND M3-C is the signal CONECT/ which connects to the PDB bus directional control PROM and also provides inputs to inverters C4-C, C4-C1, E4-C and also to the buffer F4-C. The CONECT/ also is formed as input to NAND B3-C having an output which is fed to NOR gate A4-C. The NOR gate A4-C is fed to inverter B4-C to form the logic control signal CLRD. The outputs of the inverter C4-C1 form the signal IOSND/.0 (input-output send) and the signal LCPCON/0 (data link processor connected). The buffer F4-C provides a distribution card strobe output and a distribution card terminate signal. The inverter E4-C provides a strobe level signal LCPSTL/0 (data link processor strobe level).

The distribution control card (DC) will attempt to connect to a data line processor (DLP) by driving the appropriate DLP address line (LCPADn/0) low. This backplane signal is applied to a buffer chip (M5-C) which is enabled when the data link processor (DLP) is on-line. The output of the buffer chip is then fed through an inverter (P4-C) and applied to a 3-legged NAND gate (M3-C) to become the term-CONFECT/. This CONFECT/ term is used to enable the following set of signals on the DC/CFE interface:

1. LCPCON/0. This line goes low when the DLP is connected.
2. LCPSTUn/0. These are the four data link processors status lines.
3. IOSND/.0. This is the state of the I/O-send flip-flop.
4. LCPSTL/0. This is the data link processor strobe signal.
5. STIOL/.0. This is the host system strobe signal.
6. TERM/.0. This is the host system terminate signal.
7. SELCLR/0. This is the distribution card (DC) to the data link processor (DLP) selective clear signal.
8. DATAxn/0. This is the 17-bit data bus.

All these backplane signals are low active and are enabled only when (a) the CFE is properly addressed by the distribution control card (DC) and (b) a connection is possible, that is, when the data link processor is on-line, and there is no PROM parity error. The actual state of the enabled lines is dependent upon the logical condition of the data link processor and the distribution control card (DC) at the time of the connection.

DATA LINK PROCESSOR REQUESTS: A DLP request is the method by which a data link processor can notify the distribution control card that it needs host system attention. A request can be considered to be a DLP interrupt (REQ) to the distribution card (DC).

A DLP request is made to the distribution control card when the DLP drives its jumpered request line (LCPRQn/0) low, or when the DLP drives its jumpered request line and EMRREQ/0 (emergency request) low. Both types of these requests can be generated on the common front end card (CFE) by the PROM stored micro-code program. When the micro-code-program drives the PROM output line #LDINT/ (load interface) low, the signals #CONST1 (for emergency request), and #CONST2 (for request) are loaded into a register called the request (FIG. 4A) latch 19 (FIG. 4A) at CLK8/time. Combinational type logic on the common front end allows "emergency request" to be enabled on the backplane anytime it occurs, if the data link processor is "on-line". If a DLP issues an emergency request, it also issues a non-emergency request. This is done so that the distribution control card can determine which DLP is doing the emergency-requesting.

The backplane line EMRREQ/0 is common to all data link processors in the base module, and the LCPRQn/0 lines are each unique. If a data link processor issues a non-emergency request, it is "enabled" on the backplane only if the data link processor is on-line and no other data link processors in the base module are doing any emergency-requesting.

DATA LINK PROCESSOR DATA TRANSFER RATE: Two possible modes of operation govern the data transfer rate between the data link processor DLP and the main host system 10. These modes are called (a) demand mode and (b) burst mode.

Demand mode causes data transfers to occur at a rate of less than four-megahertz. Burst mode permits data word (16-bit) transfers to occur at a four-megahertz rate, that is, 64 megabits per second.

The data link processor (DLP) and the distribution control card (DC) send "strobe acknowledge" signals back and forth to each other when they present or accept data. The DLP sends the term LCPSTL/0 (DLP strobe level) to the distribution control card, and the distribution control card sends STIOL/.0 to the data link processor. These strobing signals are exchanged during both the demand mode and the burst mode operations. The data transfer rate is determined by the speed at which these strobe signals are exchanged. FIG. 4E show a data transfer timing diagram from the distribution control card (DC) to the data link processor. The common front end card (CFE) receives a STIOL/.0 signal from the distribution control card, and synchronizes it with the 8-megahertz clock by the use of a Schottky J-K flip-flop whose outputs are named AF (asynchronous flop) and AF/. The synchronized strobe level AF is used on the common front end card for PROM address bit A0 micro-code testing. The AF/ signal is available for use on the peripheral dependent board (PDB) by way of a foreplane connector pin.

DEMAND MODE: During buffer loading operations, the distribution card (DC) informs the data link processor that data is available by driving STIOL/.0 low. The data link processor micro-code program informs the distribution card that it has accepted the data that is on the distribution card interface line by driving the PROM logic term #LCPSTL/ low.

LCPSTL/ becomes LCPSTL/0 to the distribution card and causes the distribution card (DC) to drive the STIOL/.0 high until the next new word of data is available.

During buffer read operations, the distribution card informs the data link processor that it is ready to accept new data by driving STIOL/.0 low. The data link processor micro-code instructions inform the distribution card that new data is available on the distribution card interface line by driving the PROM logic term #LCPSTL/ low. #LCPSTL/ becomes LCPSTL/0 to the distribution control card. The distribution card informs the data link processor that it has accepted the data by driving the STIOL/.0 high.

The direction of the data flow is controlled by the PROM output term #CONST3. The term #CONST3 is clocked into the request latch 19 at PROM signal #LDINT/ (Load system interface) time and becomes IOSF (I/O send flop). The state of IOSF is sent to the distribution control card as IOSND/.0, and is used to inform the distribution control card of the interface bus line direction. The state of IOSF is also sent to the peripheral dependent board (PDB) 80. The PDB 80 uses IOSF to assist in developing the interface bus line directional control logic. This logic determines which data link processor bus is active and what drivers or receivers must be used.

BURST MODE: While certain Data Link Processors can operate in either Demand Mode or in Burst Mode, the Train Printer Data Link Processor operates only in Demand Mode.

CLEAR FUNCTIONS: The CFE card $10_c$ makes use of combinational type logic to implement its clearing functions. A description of clearing functions applicable to all data link processors using the common front end card follows:

Power-Up Clear: A power-up clear signal is provided to the base module from either the power supply of the cabinet or from some external source as determined by the host system 10. This signal is attached via coaxial cable to a pin of the maintenance card backplane connector. The maintenance card uses this signal to create the master clear, MSTCLR/0. The signal MSTCLR/0 clears the data link processor if it is on-line.

Base Clear: The base clear function is provided by a pushbutton switch located on the maintenance card foreplane connector. The switch is ORed with the power-up clear and performs the same function as a power-up clear.

maintenance local clear: If the maintenance card is connected to a data link processor, the maintenance card can clear the data link processor by driving LCLCLR/0 low (clear level from maintenance card).

Host System Master Clear: The host system 10 can issue a master clear signal across its message level interface $15_i$ (MLI). The distribution control card (DC) contains a host system jumper option which, if installed, causes the master clear (MSTCLR/0) to go "low". This signal clears all the data link processors that are not addressed by the maintenance card. If the distribution control card host system option jumper is not installed, then the host master clear signal is not passed through the distribution control card to the backplane.

Host System Selective Clear: The host system 10 can clear a single data link processor during a standard poll test operation by driving the message level interface (MLI) line TRM+ MC/1 low. This action causes the distribution card to drive SELCLR/0 low. The SELCLR/0 being "low" causes the connected data link processor to clear.

Figure 4B:
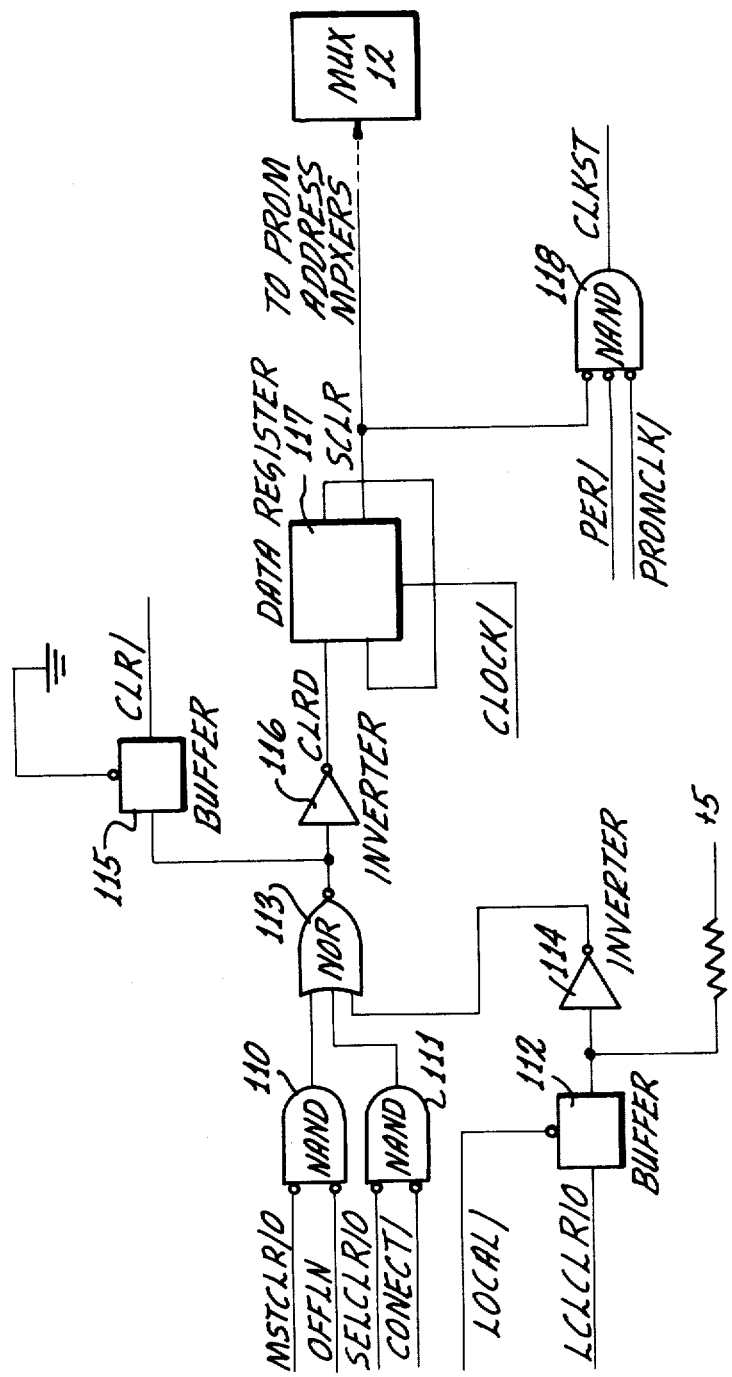
FIG. 4B is a circuit of the common front end clear circuitry.

FIG. 3 shows in schematic form the physical structure of the common front end (CFE) card $10_c$ while FIG. 4A shows the basic circuit block diagram of the common front end card. Included in the CFE is the clear circuitry shown in FIG. 4B. It will be seen that NOR gate 113 has inputs from NAND gates 110 and 111 in addition to an input from inverter 114 which is fed by buffer 112. The output of gate 113 is fed to buffer 115 and also to inverter 116. Inverter 116 feeds its signal to a Schottky data register chip 117 which provides an output to the PROM address multiplexor 12 of FIG. 4A. The output of data register 117 is also used to provide one of the inputs to NAND gate 118.

A "low" signal which results on the output of the NOR gate 113 occurs if any one of the following conditions is met:

1. MSTCLR/0 and OFFLN are both "low".
2. SELCLR/0 and CONECT/ are both low.
3. LCLCLR/0 and LOCAL/ are both low.

The "low" output of NOR gate 113 is used to perform the following functions:

1. The output is fed through a buffer chip 115 to become signal CLR/. CLR/ clears the PROM parity error flip-flop (and flip-flops SOTB, AF, and TERMF) on the CFE $10_c$.
2. CLR/ is sent to the peripheral dependent board (PDB) 80 to clear the specific peripheral-dependent logic.
3. The low output signal of NOR gate 113 is sent through an inverter 116 and is applied to one input of the data register chip 117. It is sent as the logic term CLRD. The signal CLRD is double synchronized with CLOCK/ and becomes the signal SCLR (synchronized clear).
4. The signal SCLR from register 117 is used to force the PROM clock-disabling term CLKST (clock stop) "low". This is done in the event that a PROM parity error may have caused CLKST to go high.
5. The SCLR signal is used to disable the PROM address multiplexor chips 12. This forces the PROM address lines to all zeros. Address zero is the starting address of all data link processor micro-code programs.

CFE CLOCK CONTROL: The clock control logic in the CFE $10_c$ uses combinational type logic (NAND gates, NOR gates, inverters, buffers, and a Schottky data register chip), in order to enable or disable the always-present 8-megahertz backplane clock (CLOCK ... 0). The circuitry for the CFE clock control is shown in FIG. 4C. The CFE clock control logic constantly monitors the state of the maintenance bus 30 to determine how it should supply clock signals to the data link processor. In Table VII there was shown the available clock control options and the maintenance bus line states that are necessary to cause the various options to be active. Table VIII showed the maintenance lines for driving the PROM address lines A0–A9.

In the CFE clock control circuitry shown in FIG. 4C, it will be seen that the NAND gate A3 has three inputs and the NAND gate 13-1 has four inputs. The first input to NAND gate A3 is from the data register C3 along the SCLR line. The second input to gate A3 is the line PERF/. The PERF signal is the PROM parity flip-flop signal. When "high", it indicates that an error has been detected on the PROM output register 14, thus stopping the DLP clock. The PERF/ signal is the complement of PERF. The third input to gate A3 is from the PROMCLK/ output of NOR H4-1.

The first input to gate 13-1 is the SCLR line. The second input to gate 13-1 is the PERF/ line. The third input to gate 13-1 is from the CLKEN line and the fourth input to gate 13-1 is the output of the buffer N5-1.

The NAND gate M3 has one input from inverter P4 (ADLOC) and another input coming from the inverter B4-1 (BASLCL/0).

The input for the data register C3 comes from NOR gate A3-2 which has one input from inverter B4, one input coming from NOR gate A3-1, and one input coming from the line START/.0. The NOR gate A3-1 has two inputs, one of which is the line BASLCL/0 and the other input is the line LOCAL/.1.

The output of gate A3 is fed to the input of NOR gate H4-1. The output of NAND gate 13-1 is fed to the input of NAND gate H4-13. The output of inverter H5

(CLOCK . . . 0) is fed to both the input of gate H4-2 and gate H4-13.

The output of gate A3 is fed to the input of NOR gate H4-1 to form the signal line PROMCLK/. The output of NAND gate H4-13 is fed to buffer 14-1 and to buffer G4. NORMAL ON-LINE MODE: When certain of the following conditions are met, then all data link processor clocks are active at the 8-megahertz rate. These conditions are:

1. BASLCL/0 is high (the base module is not in local).
2. LOCAL/.1 is high (the DLP is not Maintenance Card (MC) addressed).
3. PERF/ is high (no PROM parity error). The signals BASLCL/0 and LOCAL.1, both being "high", causes a "high" on to one input of the Schottky data register C3. This register chip is clocked by the always-present signal CLOCK/. This signal is derived from the backplane clock signal CLOCK . . . 0 after a triple inversion. One output of the register chip C3 becomes the logic term clock enable (CLKEN). The signal clock enable is NANDed on two gates (A3-4 and 13-1) using the signals PERF/, SW1/, and the output of NAND gate M3. Gate M3 has inputs which are:

a. The signal ADLOC/ (after inversion). The ADLOC/ is low when the DLP is not addressed by the MC, or when ADRVLD/0 is high.

b. The backplane signal BASLCL/0 (after inversion).

The output of NAND gate A3-4 becomes the signal logic term B (P-CLKEN) and this is NANDed with the signal CLOCK . . . 0 (after inversion by inverter H5 which is fed as one input to gate H4-2). The output of gate H4-2 is fed through a NOR gate H4-1 to form the signal PROMCLK/. This signal PROMCLK/ is used to clock the PROM data registers 14 and the stack register 11 of FIG. 4A.

The output of NAND gate 13-1 becomes the signal CLKEN/. This signal CLKEN/, when "low", enables the 8-megahertz backplane clocks on the peripheral dependent board, PDB 80.

The CLKEN/ signal is NANDed with the signal CLOCK . . . 0 (after inversion) at the gate H4-13. The output of gate H4-13 is fed through one inverter buffer 14-1 and also through one non-inverting buffer G4 to become the signals respectively CLK8/ and CLK8 (8-megahertz clock. These clock signals are used in the German Front End Card $10_c$.

STANDARD LOCAL MODE: The standard local mode of "maintenance" is operative under the following conditions: (Also see Table VII).

1. BASLCL/0 is high (base is not in local).
2. ADRVLD/0 (address valid) is low; and the LOCnn/.0 lines on the maintenance bus are valid.
3. The LOCnn/.0 lines equal the local address jumpers on the CFE $10_c$.

This equal comparison together with the ADRVLD/0 being low, forces LOCAL/.1 into low. LOCAL/.1 low means that the DLP is "maintenance card addressed".

In this mode all the maintenance functions are available; for example, the maintenance card can now:
1. select the single-pulse mode.
2. perform PROM micro-code verification.
3. set up known conditions by manipulating the PROM address during single-pulse operations, and test for known predicted results by sampling the maintenance bus display (DPLY) and the data simulate (DSIM) lines. SINGLE-PULSE MODE: After the maintenance card has localized the data link processor (DLP), it can place the DLP in a single-pulse mode by driving the signal SP/ . . . 0 into "low". This cation forces the logic term CLKEN into "low" because the NOR gate A3-2 of FIG. 4C is disabled by the following logic:

1. Signal SP/ . . . 0 is inverted into "high" and disables the top input line of gate A3-2.
2. The signal LOCAL/.1 is low because the DLP is not maintenance card addressed. This action disables the middle input line of gate A3-2 because of the high signal output of gate A3-1. The signal START/.0 is high and disables the third input of gate A3-2. When gate A3-2 is disabled, a low signal is set into the data register C3 at CLOCK/time. The output signal CLKEN, when low, turns off NAND gates A3-4 and 13-1, and causes their outputs to go high and to disable the NAND gates H4-2 and H4-13. When these two gates are disabled, the DLP clocks are turned off.

Once the DLP is placed into a single-pulse mode, the maintenance card can issue from 1 to 4,096 clocks by driving the START/.0 low. START/.0 is a pulse which effectively is a window around a desired number of clocks that the maintenance card wants issued. During the time frame when START/.0 is low, the high signal output of gate A3-2 is clocked into the data register C3 by the always-present clock signal CLOCK/. The CLKEN now becomes a pulse rather than a level, and the DLP clocks are enabled only during the low active time span of START/.0.

After the data link processor (DLP) has been placed into the single-pulse mode, the maintenance card can take the DLP out of it by driving SP/ . . . 0 high. The signal SP/ . . . 0, when high, forces a high level input into register C3 as follows (FIG. 4C): The signal SP/ . . . 0 is inverted low by the inverter B4. This low signal is fed into NOR gate A3-2 and causes its output to go high. This high level is clocked into data register C3 with CLOCK/ and becomes CLKEN. The signal CLKEN, when high, enables all the data link processor's clocks.

PROM MICRO-CODE VERIFICATION: If the maintenance card has localized and placed the data link processor into the single-pulse mode, it can read any common front end PROM micro-code word by driving the signal SWH.1/.0 low. The signal SWH.1/.0 is routed through the buffer N5-1 (FIG. 4C) to become the logic term SW1/. This signal SW1/ is sent to the peripheral dependent board PDB 80 and is used in the bus interface directional control logic in order to develop the logic term SIMRCV/, (Simulate Receive, FIG. 4A, line 33). When SIMRCV/ is low, the maintenance bus lines $10_{dm}$ DSIMnn/0 of FIG. 5B are gated into the inputs of PROM address multiplexor chips 12 of FIG. 4A. The SW1/ also forces the PROM address multiplexors 12 to select the DSIMnn/0 data as the actual PROM address. This way the maintenance card controls the current PROM address. SW1/ is also tied to one of the inputs of NAND gate 13-1, FIG. 4C, and is used to keep the clock signals CLK8/, CLK8, and the clock-enable signal CLKEN/ (to the peripheral dependent board 80) turned off.

When the maintenance card issues a single pulse clock, the PROMCLK/ latches the addressed PROM data into the PROM registers 14 (FIG. 4A) because SW1/ is not tied to the NAND gate A3. The maintenance card now has the current PROM word available for sampling. The maintenance card can now read the PROM data (8-bits at a time) by driving the maintenance bus lines DSELn/.0. The DSELn/.0 lines 34, FIG. 4A, are used on the CFE 10c to select which 8 data bits will be enabled onto the maintenance bus lines DPLYnn/0, at 40 of FIG. 4A. Seven reads are required to sample one entire micro-code address.

LOCAL MODE WITH BASE IN LOCAL: Under certain conditions the maintenance mode is operatively in effect; these conditions are:
1. BASLCL/0 is low (the base is in local).
2. ADRVLD/0 is low (that is, the LOCnn/.0 lines on the maintenance bus are valid).
3. The LOCnn/.0 lines equal the local address jumpers on the CFE 10c.

This equal comparison, along with ADRVLD/0 low, forces LOCAL/.1 low also. LOCAL/.1, when low, means that the data link processor DLP is being maintenance card addressed. This mode of operation causes the addressed data link processor to function in exactly the same manner as the standard local mode. All unaddressed DLPs disable their own clocks. BASE MODULE IN LOCAL MODE AND DLP CLOCKS DISABLED: This is a mode of operation which takes place when the following conditions are satisfied:
1. BASLCL/0 is "low" (the base is in local).
2. ADRVLD/0 is low (the LOCnn/.0 lines are valid).
3. The LOCnn/.0 lines do not equal the CFE local address jumpers.

This "unequaled" comparison along with ADRVLD/0 being low, forces LOCAL/.1 high and ADLOC/ low. The LOCAL/.1 when high, means that the DLP is not maintenance card addressed.

In this mode all the DLP clocks are disabled because the BASLCL/0 low level is inverted by the inverter B4-1 (FIG. 4C). This level "high" is NANDed by gate M3 with the inverted ADLOC/ signal (inverted by P4). When both inputs to gate M3 are "high", the output goes low and disables the NAND gate A3-4 and 13-1. The outputs of these gates both go high and disable the gate H4-1 and H4-13. When these two gates are disabled, all the DLP clocks are inhibited. BASE SINGLE-PULSE: The single-pulse maintenance mode is in effect when the following conditions occur:
1. BASLCL/0 is "low" (the base is in local).
2. ADRVLD/0 is high (that is, the LOCnn/.0 lines on the maintenance bus are invalid).

In this mode of operation the maintenance card can place the entire base in a single-pulse mode by driving the logic as follows:
1. SP/ . . . 0 low—this action disables the top input of the NOR gate A3-2.
2. BASLCL/0 is low. This action puts the base in local and causes the output of NOR gate A3-1 to go high. This high level disables the middle input line of NOR gate A3-2.
3. START/.0 high disables the bottom input of NOR gate A3-2.

When NOR gate A3-2 (FIG. 4C) is disabled, its output goes low. This low output is latched into the data register C3 and becomes the logic term CLKEN. This clock enable line, when low, disables NAND gates A3-4 and 13-1. The outputs of these NAND gates go high and disable the gates H4-1 and H4-13. When the gates H4-1 and H4-13 are disabled, then all DLP clocks are inhibited.

The "base single-pulse" maintenance mode of operation will make all data link processors respond to single-pulse because ADRVLD/0 is high and BASLCL/0 is low. The signal ADRVLD/0 when high, disables the tri-state 8-2-1 multiplexor chip (12, FIG. 4A) on the CFE that is used to generate the logic terms LOCAL/.1 and ADLOC/. When this multiplexor chip is disabled, both signals are pulled up high with 1100 ohm resistors to +5 volts. ADLOC/, when high, (after inverson to "low" by the inverter P4, FIG. 4C) disables the NAND gate M3. The high level output of gate M3 allows the single-pulse clock to be enabled when the maintenance card drives the signal START/.0 low. Further description of the single-pulse operation has been previously described in the "standard local mode" of operation.

STACK REGISTER OPERATION: The operation of the stack register 11 (FIG. 4A) is controlled by the state of a PROM 13 output signal line #LDSTCK/. The signal #LDSTCK/ is held low during non-subroutine micro-code instructions. This low level is applied to the low-enable inputs of the 3 stack register chips 11. This action causes the stack register 11 to load and hold the current PROM micro-code address.

All micro-code programs have the ability to enter one level of subroutine by driving and holding the signal #LDSTCK/ high. With #LDSTCK/ going high the following actions will occur:
1. The stack register load function is disabled.
2. The stack register count function is enabled.

The signal #LDSTCK/ of FIG. 4A is also routed through a Schottky data register chip to become the logic term STCLKEN/. This signal is then inverted and used to count up the stack register plus one. This address is held in the register until the subroutine is completed. This updated address is used when the subroutine does a stack branch to return to the main body of the micro-code instructions. The non-subroutine code is then re-entered and the signal #LDSTCK/ goes low.

MAINTENANCE DISPLAY LINES OF COMMON FRONT END (CFE) The CFE 10c contains standard items such as inverting tri-state buffers and eight-to-one multiplexor chips that are used to enable the maintenance display lines 40 of FIG. 4A (DPLY01/0-DPLY10/0). The lines 40 are shown with a /10 to indicate the 10 individual lines which compose this group of lines. Table IX lists the various individual display lines (DPLY01/0-DPLY10/0).

TABLE IX

| Maintenance Display Lines*** | CFE Signals Displayed With Given Display Select Codes | | | | | | | | |
|---|---|---|---|---|---|---|---|---|---|
| | DSEL8/,DSEL4/,DSEL2/,DSEL1/Value* | | | | | | | | |
| | (GRPO/=0) 1111** | 0111 | 0110 | 0101 | 0100 | 0011 | 0010 | 0001 | 0000 |
| DPLY01/0 | STCKA9 | * | * | * | * | * | * | * | * |

TABLE IX-continued

| Maintenance Display Lines*** | CFE Signals Displayed With Given Display Select Codes DSEL8/,DSEL4/,DSEL2/,DSEL1/Value* | | | | | | | | |
|---|---|---|---|---|---|---|---|---|---|
| | (GRPO/=0) 1111** | 0111 | 0110 | 0101 | 0100 | 0011 | 0010 | 0001 | 0000 |
| DPLY02/0 | STCKA8 | * | * | * | * | * | * | * | * |
| DPLY03/0 | STCKA7 | AF | #LDINT/ | #K1 | #NEXT8 | PER | #CONST7 | #I1 | #NEXT7 |
| DPLY04/0 | STCKA6 | TERMF | #LDSTCK/ | #K2 | #BRANCH1 | PERF | #CONST6 | #I2 | #NEXT6 |
| DPLY05/0 | STCKA5 | REQ | #G3 | #K3 | #BRANCH2 | SCLR | #CONST5 | #I3 | #NEXT5 |
| DPLY06/0 | STCKA4 | EMREQ | #G4 | #K4 | #BRANCH3 | CLKEN | #CONST4 | #I4 | #NEXT4 |
| DPLY07/0 | STCKA3 | A3 | #H1 | #L1 | #BRANCH4 | NEXT9 | #CONST3 | #J1 | #NEXT3 |
| DPLY08/0 | STCKA2 | A2 | #H2 | #L2 | #BRANCH5 | LCPADF | #CONST2 | #J2 | #NEXT2 |
| DPLY09/0 | STCKA1 | A1 | #H3 | #L3 | #LCPSTL/ | STOPB | #CONST1 | #J3 | #NEXT1 |
| DPLY10/0 | STCKA0 | A0 | #H4 | #L4 | #PARITY | CLKST | #CONST0 | #J4 | #NEXT0 |

NOTES:
1 = HIGH
0 = LOW
*Maintenance display line not driven by CFE with this display select code.
**With this display select code, the CFE also drives DSTAT8/0-DSTAT1/0, DLCPST/0, and DIOSND/0 (MC Group 24).
***Signals are low true on backplane.

The common front end also has the ability to display signals on the lines DSTAT8/0-DSTAT1/0 (Glossary Table I), which are the data link processor "status lines" to the maintenance card. The CFE also can display DLCPST/0 (the data link processor strobe to the maintenance card) and also the DIOSND/0 (which is the SEND level of I/O to the maintenance card). All of these lines are used by the maintenance card (as $20_{0m}$) to test and verify the operation of the CFE card. The DSEL8/0 lines (multiplexor chip select line for input to the display lines)—DSEL1/0 (multiplexor address line for data selection to display lines) are sent to the common front end from the maintenance card and are used to select the CFE internal signals that are enabled on to the display lines after the data link processor has been addressed by the maintenance card. The Table IX shows a list of the displayable CFE signals and also the DSELn/0 line codes that are required to enable them on to the maintenance display bus.

PROM ADDRESS SELECTION: Referring to Tables Xa and Xb, the selection of micro-code addresses is implemented on the common front end card $10_c$ which uses circuitry that employs standard logic gates, multiplexor chips, register chips and a decoder chip. The multiplexors 12 drive PROM address lines A0-A9 (FIG. 4A). This causes the micro-code data to be latched into the registers 14 with every 8-megahertz clock pulse.

TABLE Xa

| PROM Output Branch Lines (#BRANCHn) | | CFE PROM Address Selection | | | See Note |
|---|---|---|---|---|---|
| | | PROM Input Address Lines (An) | | | |
| BR6 | 54321 | 9-4 | 3-1 | 0 | |
| 0 | 00000 | #NEXTn | #NEXTn | #NEXT0 | 1 |
| 0 | 00001 | #NEXTn | #NEXTn | AF | 2 |
| 0 | 00010 | #NEXTn | #NEXTn | TERMF | 2 |
| 0 | 00011 | #NEXTn | #NEXTn | LCPADF | 2 |
| 0 | 00100 | #NEXTn | #NEXTn | STOPF | 2 |
| 0 | 00101 | #NEXTn | #NEXTn | TEST5 | 2 |
| 0 | 00110 | #NEXTn | #NEXTn | TEST6 | 2 |
| 0 | 00111 | #NEXTn | OPDECn | OPDEC1 | 3 |
| 0 | 01000 | #NEXTn | #NEXTn | TEST8 | 2 |
| 0 | 01001 | #NEXTn | #NEXTn | TEST9 | 2 |
| 0 | 01010 | #NEXTn | #NEXTn | TEST10 | 2 |
| 0 | 01011 | #NEXTn | #NEXTn | TEST11 | 2 |
| 0 | 01100 | #NEXTn | #NEXTn | TEST12 | 2 |
| 0 | 01101 | #NEXTn | #NEXTn | TEST12 | 2 |
| 0 | 01110 | #NEXTn | #NEXTn | TEST14 | 2 |
| 0 | 01111 | STCKAn | STCKAn | STCKA0 | 4 |
| — | 1— | #NEXTn | #NEXTn | PDB MX | 5 |
| 1 | — | #NEXTn | #NEXTn | PDB MX | 5 |
| SW1/ = 0 | | Maintenance Data Bus | | | 6 |
| CLEAR | | 0 | 0 | 0 | 7 |

NOTES
1 = Unconditional branch.
2 = 2-way branch (TEST5-TEST14 from PDB).
3 = 16-way branch (OPDEC from PDB).
4 = Stack branch.
5 = 2-way branch (A0 is driven directly from the PDB).
6 = Maintenance Card PROM read mode.
7 = Clear forces zeros onto the PROM address lines.
1 = high. 0 = low. — = don't care.

TABLE Xb

| PROM output branch lines (#BRANCHn) | | Enable Lines For Expanded A0 Selection |
|---|---|---|
| | | Enable line to Peripheral Dependent board for expanded |
| BR6 | 5 | 4 | selection of A0 |
| 0 | 0 | 0 | ... A0 is driven by multiplexors on CFE card |
| 0 | 0 | 1 | |
| 0 | 1 | 0 | SEL2 |
| 0 | 1 | 1 | SEL3 |
| 1 | 0 | 0 | SEL4 |
| 1 | 0 | 1 | SEL5 |
| 1 | 1 | 0 | SEL6 |

With reference to Table Xa showing the CFE signals, the primary multiplexor input-select lines are the current latched PROM outputs of #BRANCH1-#BRANCH5, Table IX and the signal term BR6 (Branch Line from PDB 80 for PROM address selection).

In order to accomplish Address Bit A0 Selection (at line 36, FIG. 4A): #BRANCH1-#BRANCH3 will select the input lines to two separate multiplexor chips. #BRANCH4, #BRANCH5 and BR6 is peripheral-type dependent and may be driven either by the PDB logic or by one of the latched PROM outputs. If a PROM output line is used to drive BR6 (Table Xb), it is sent over to the peripheral dependent board PDB 80 and then is returned as the BR6 line. There are 22 such lines,

G3-#L4, Table IX, which are available to the peripheral dependent board, PDB 80. These lines are primarily used for controlling the peripheral dependent logic on the PDB 80.

The #BRANCHn bits and BR6 are also used for the generation of PROM address lines A0-A9 (FIG. 4A). This is accomplished by the use of the term BROP (PROM address branch) and BRST (use stack register for PROM address). BROP is "high" whenever the #BRANCHn bits and the BR6 select a branch to one of 16 addresses (16-way branch). BRST is high when the #BRANCHn bits and BR6 select a branch that uses the stack register 11 as the address. If neither a 16-way or a stack register branch is selected, then either an unconditional or a two-way branch is performed.

PROM address selection can also be achieved by the use of the maintenance term SW1/, (FIG. 4C).

When the CFE $10_c$ is under the control of the maintenance card and the MC drives SW1/ "low", the MC can address and read any micro-code address. This feature is utilized to read and verify the contents of the PROM matrix and to test the integrity of its associated registers.

The #BRANCHn bits and the BR6 are overridden whenever a master, selective, or local clear is issued to the CFE $10_c$. Any clear condition forces the PROM address bus (A0-A9, FIG. 4A) to equal 0. The address bus A0-A9 is defined in Glossary Table I. Address 0 is the starting point of all micro-code programs.

As will be seen in Table Xa, there is a listing of all the possible branching conditions that can be used for the generation of the next PROM address. Table Xb shows a list of five CFE generated enable lines that can be used for an expanded selection of PROM address bit A0. These enable lines are activated when the PDB 80 requires additional two-way branching capabilities.

PROM PARITY CHECKING: The CFE card $10_c$ performs an odd parity check on every 49-bit PROM micro-code word. The total word length is actually 52-bits but the three most significant bits are not used by the micro-code program. These three bits are not parity checked.

The currently addressed micro-code word is latched into the register chips 14 and from these register chips is fed into cascaded parity checking chips 18 of FIG. 4A. Thus, this circuitry allows the CFE $10_c$ to examine the entire 49-bit word at one time. If the sum total of the word equals "even" parity, then the logic term PER (parity error) goes high. PER going "high" causes the "parity error" flip-flop of 18 to be set on the next 8-megahertz clock pulse. The setting of the parity error flip-flop causes the logic term PERF/ to go "low".

PROM PARITY ERROR: If "even" PROM parity is detected by the CFE card, the logic term PER goes "high" and causes the PROM parity error flip-flop to set. At the same time that PER goes high, then PER/ goes low. PER/ going low causes the logic term CLKST (clock stop) to go high. CLKST going "high" disables the clock that controls the latching of the PROM register chips (PROMCLK/). The disabling of PROMCLK/ causes the data (that caused the parity error) to remain in the registers 14. The disabling of PROMCLK/ also locks the stack register 11 to its current value. If the parity error flip-flop gets set, then the logic term PERF/ goes low on line 41 of FIG. 4A. The PERF/ going "low" causes the following actions to occur.

1. PERF/ is routed to the peripheral dependent board PDB 80 to turn off the peripheral device.
2. The request latch 19 on the CFE card is cleared. This action causes the I/O SEND flip-flop, REQ (request), and EMRREQ (emergency request) signals from Drivers 20 to turn "off".
3. The logic term CONECT/ is forced high. This action prevents any distribution card (DC) connection and severs any DC connection that may have been in progress at the time of the error.
4. The peripheral dependent board 8-megahertz clock is turned off. PERF/ going low forces the logic term CLKEN/ high. CLKEN/ is used by the PDB 80 to permit 8-megahertz clocks.
5. The CFE 8-megahertz clocks (CLK8 and CLK8/) are turned off.

If a PROM parity error disables (locks up) a data link processor, the error condition can be removed through the use of a base power-up clear, a maintenance card base clear, a dis Master Clear or a maintenance card initiated DLP local clear.

TRAIN PRINTER DATA LINK PROCESSOR:
Description

The Data Link Processor used in Burroughs I/O subsystems, whereby the Data Link Processors act as peripheral-controller interfaces between specified peripheral terminal units and a main host computer, have been designed so as to be assembled from two slide-in printed circuit cards. One of these cards is the CFE or common front end card which provides the common standardized functions of all types of data link processors, and the second card is the PDB, or peripheral dependent board, which supplies the particular functions required for a given type of peripheral terminal unit, in this case, the terminal unit being a Train Printer. Such Train Printers, which may also be called a train-type printer mechanism, come with generally 132 print positions and have unique 18, 48, 72 or 96 character sets. These line printers provide high quality, high speed alphanumeric output at operating speeds of 675 LPM (lines per minute), or up to 1100 LPM, or even up to 1800 LPM with an 18-character set. For example, a basic Train Printer is capable of printing at a rate of 1100 LPM when printing with a 48-character set and with single line spacing.

Train Printers of the above-mentioned categories are described in printed publications of the Burroughs Corporation, Detroit, Michigan 48232, such as Form #1094802 Copyright 1976, or Form #1066328 Copyright 1972, 1973, 1974.

The peripheral dependent board of the Train Printer Data Link Processor (TP-PDB) contains the necessary logic circuitry which typically interface 1100 and 1500 lines per minute Train Printers into the Burroughs I/O subsystems which use data link processors (DLP).

The PDB 80 is controlled by the micro-code words contained in the common front end card and its PROMs. As previously mentioned, the CFE and TP-PDB, in combination with the proper micro-code, make up the Train Printer Data Link Processor (TP-DLP).

The Train Printer-Data Link Processor accepts print information from a main host system, stores this information in a buffer, and sends hammer actuating signals to the Train Printer as each character in the buffer is matched by a train character coming into the proper position over a paper sheet to be printed.

The Train Printer-Data Link Processor contains the following elements and features:
(a) a print buffer which holds one full line of print.
(b) a soft-loaded universal train image buffer storage.
(c) print position compatibility recognition unit for 80, 120 or 132 characters.
(d) variable definition of graphic character sets.
(e) train and train image ID verification, when required.
(f) line delimiter capability.

The "train" or print-train is a rotating unit of blocks each individually connected to the next one like a string of box cars in a railroad system, and where each of the boxes or units carries a single character or several characters of the character sets to be used in printing on the paper which runs juxtaposed to the line of box cars of character sets. Graphics on the train or "string of box cars" are numbered sequentially beginning with the number "0" for the first character of each set on the train. Overprinting is permitted via the software.

I/O Descriptors for the Train Printer DLP

The TP-DLP I/O descriptors contain 1 digit of OP code and three digits of variant which describe the type of operation. This descriptor is received by the Train Printer Data Link Processor in one transmission from the host system.

There are three valid types of OP codes for the Train Printer Data Link Processor. These are codes for:

WRITE: This is any operation where data is transferred from the host system to the Train Printer-DLP buffer storage.

TEST: This is any operation where no data transfer takes place between the Train Printer-DLP and the host system, but operates by sending a result-descriptor to the host system.

ECHO: This is an operation that results in receiving a message block from the host system and then the transmission of the same information back to the host system.

It will be noted that there is no "Read" operation used in this system. At no time is a "Read" operation accepted as "valid" by the Train Printer-DLP. Thus the "Read" operation bit, A8, must always be "0". If a "Read" operation should be received by the Train Printer-DLP, a "descriptor-error" is flagged and a result descriptor is returned to the host system.

The I/O descriptors, sometimes called Command Words, are obtained in the form of variants which accompany the OP codes. The various permissible operations used are shown in the following Table 11.

TABLE 11

Train Printer-DLP OP codes and Variants

| Operation | OP Code | Variant 1 | Variant 2 | Variant 3 |
|---|---|---|---|---|
| Digit: | A A A A | B B B B | C C C C | D D D D |
| Bit: | 8 4 2 1 | 8 4 2 1 | 8 4 2 1 | 8 4 2 1 |
| Write | 0 1 0 0 | 0 0 0 0 | 0 0 0 0 | 0 0 0 0 |
| Write/halt | 0 1 0 0 | 0 0 0 1 | 0 0 0 0 | 0 0 0 0 |
| Write line | 0 1 0 0 | 0 1 0 0 | 0 0 0 0 | N N N N |
| Writeline/halt | 0 1 0 0 | 0 1 0 1 | 0 0 0 0 | N N N N |
| Write/load TIB | 0 1 0 0 | 1 0 0 0 | J J F F | F F F F |
| Move/write line | 0 1 0 0 | 0 1 1 0 | 0 0 0 0 | N N N N |
| Move write line/halt | 0 1 0 0 | 0 1 1 1 | 0 0 0 0 | N N N N |
| Test | 0 0 1 0 | 0 0 0 0 | 0 0 0 0 | 0 0 0 0 |
| Test/wait ready | 0 0 1 0 | 0 0 0 1 | 0 0 0 0 | 0 0 0 0 |
| Test/wait not ready | 0 0 1 0 | 0 0 1 0 | 0 0 0 0 | 0 0 0 0 |
| Test/skip | 0 0 1 0 | 0 1 0 0 | 0 0 0 0 | N N N N |
| Test/conditional | 0 0 1 0 | 1 0 0 0 | 0 0 0 0 | 0 0 0 0 |

TABLE 11-continued

Train Printer-DLP OP codes and Variants

| Operation | OP Code | Variant 1 | Variant 2 | Variant 3 |
|---|---|---|---|---|
| Digit: | A A A A | B B B B | C C C C | D D D D |
| Bit: | 8 4 2 1 | 8 4 2 1 | 8 4 2 1 | 8 4 2 1 |
| cancel Test/ID | 0 0 1 0 | 1 1 0 0 | 0 0 0 0 | 0 0 0 0 |
| Echo | 0 0 0 1 | 0 0 0 0 | 0 0 0 0 | 0 0 0 0 |

NOTES
1. N designates the bits which are used to encode the paper motion format. See table 12 for permissible formatting operations.
2. JJ designates the printer speed; that is, 00 = 750 LPM, 01 = 1100 LPM, 10 = 1500 LPM, and 11 is reserved.
3. F designates the bits which are used to encode the train identifier.
4. D designates the bit which, when true, inhibits the delimiter check capability of the TP-DLP.
5. TIB refers to "Train Image Buffer" which is a portion of RAM buffer 22 shown in FIGS. 4A, 5A, 5B, 5C.

DESCRIPTION: In reference to Table 11

WRITE: The "Write" operation prints and also moves paper, or else moves paper and also prints, according to the format information received in the first word of the data stream for each line to be printed. It continues printing lines until a "termination condition" is reached. If an invalid bit pattern is detected on a print buffer (FIGS. 5B, 5C) load operation, the operation is terminated after printing the line, and a result-descriptor (R/D) is returned to the host computer with the "print-check/invalid-found" bit set and also the "print/-error-line-printed" bit set.

WRITE/HALT: The "write/halt" operation performs the same actions as the Write operation except that if an "invalid" bit pattern is detected, the loading of the print buffer (FIG. 5B) is completed, but that line is not printed.

WRITE/LINE: The "write/line" operation prints one line with the paper motion as defined in the OP code. If an invalid bit pattern is detected, the line is printed and a result descriptor (R/D) (indicating the error condition) is returned to the host system. The paper motion format code is shown in the following Table 12:

TABLE 12

Train Printer-DLP Paper Motion Format Codes

| Code | Description | Printer Format Tape |
|---|---|---|
| 0 0 0 0 | No paper motion | (2 and 12 channel tape) |
| 0 0 0 1 | Advance to heading | (2 and 12 channel tape) |
| 0 0 1 0 | Advance to ch. 2 | (2 and 12 channel tape) |
| 0 0 1 1 | Advance to ch. 3 | (2 and 12 channel tape) |
| 0 1 0 0 | Advance to ch. 4 | (2 and 12 channel tape) |
| 0 1 0 1 | Advance to ch. 5 | (2 and 12 channel tape) |
| 0 1 1 0 | Advance to ch. 6 | (2 and 12 channel tape) |
| 0 1 1 1 | Advance to ch. 7 | (2 and 12 channel tape) |
| 1 0 0 0 | Advance to ch. 8 | (2 and 12 channel tape) |
| 1 0 0 1 | Advance to ch. 9 | (2 and 12 channel tape) |
| 1 0 1 0 | Advance to ch. 10 | (2 and 12 channel tape) |
| 1 0 1 1 | Advance to ch. 11 | (2 and 12 channel tape) |
| 1 1 0 0 | Advance to end of page | (2 and 12 channel tape) |
| 1 1 0 1 | Advance to EOP or next ch. | (2 channel tape only) |
| 1 1 1 0 | Single space | (2 and 12 channel tape) |
| 1 1 1 1 | Double space | (2 and 12 channel tape) |

NOTES
1. With the exception of write and write/halt, the above format information must appear in variant digit V3 as defined by NNNN in table 11.
2. For write and write/halt operations, the format information must appear in the first word transmitted with each line of print. The composition of the format word is as follows:

| Digit: | A | B | C | D |

TABLE 12-continued

Train Printer-DLP Paper Motion Format Codes

| Code | Description | Printer Format Tape |
|------|-------------|---------------------|
| Code: | S R R R    N N N N | R R R R    R R R R |

Where:
S = The bit which, when true, causes paper motion to occur prior to printing the line.
N = The bits which define format as in table 12.
R = The bits which are reserved and must be zero.

WRITE LINE/HALT: The write line/halt operation performs the same actions as the "write-line" except that if an invalid bit pattern is detected, the print buffer loading is completed, but that line is not printed.

MOVE/WRITE LINE: The move/write line operation performs the same operation as the write-line operation except that paper motion occurs prior to the printing of the line.

MOVE/WRITE LINE/HALT: The move/write-line/halt operation performs the same action as the write-line/halt operation except paper motion occurs prior to the printing of the line.

WRITE/LOAD TIB (TRAIN IMAGE BUFFER): The write/load TIB operation serves to load the train image buffer (FIG. 5B) which is described later. The variant digits Table 11, V2 and V3 define the train identification (ID). Bits 8 and 4 of V2 are encoded to define the printer's speed (00=750 LPM; 01=1100 LPM; 10=1500 LPM; 11 is reserved).

TEST: The test operation returns a test result descriptor (R/D) to the main host system. These test result descriptors will be discussed further hereinafter.

TEST/WAIT READY: The test/wait ready OP code causes the DLP to be placed in an "enable" state. It remains enabled until the Train Printer ($50_p$ FIG. 2) is made ready by the operator or until the test/wait operation is cancelled. If the DLP is in a "ready" state on receipt of this operation, the DLP branches and writes an "operation-complete" result descriptor. If the operator makes the Train Printer (peripheral) "ready" when the DLP is in a test/wait ready state, the DLP will report "operation complete" in its result descriptor (R/D).

If the DLP receives a "conditional cancel" OP code, the "test" OP code is cancelled and the conditional-cancel-complete bit is set in the result descriptor. If the Test/Wait operation is in progress and an operation is received which is not a valid "conditional cancel", the test operation is cancelled and both the descriptor error and the conditional cancel-completed-bits are set in the result descriptor.

TEST/WAIT-NOT-READY: The test/wait-not-ready operation performs similarly to the test/wait-ready operation except that the DLP waits for a "not ready" condition and then reports a "not ready" result descriptor.

TEST/SKIP: The test/skip operation is used to perform paper motion without doing any printing. The paper motion control is encoded in variant #3, as described in Table 12.

TEST/CONDITIONAL-CANCEL: This test/conditional-cancel operation is used to cancel a test/wait-ready operation or a test/wait-not-ready operation. If a valid conditional-cancel OP code is received while a test/wait operation is in progress, the test operation is terminated and the conditional-cancel-completed-bit is "set" in the result descriptor. If a test/wait operation is in progress and an operation is received which is not a valid "conditional-cancel", the test operation is cancelled and both the descriptor error and the conditional-cancel-completed-bit are set in a result/descriptor.

TEST ID: This operation results in the data link processor (DLP), sending a 2-word result/descriptor to the main host system. The first word is described below in discussion under the title of "Train Printer DLP Result/Descriptors". The second word of the result/descriptor is the ID word which establishes a unique identification for that DLP to the main host system. This second word of the result descriptor is composed of 4 digits: the first two digits containing the identifier for a Train Printer-DLP and the next two digits which are field-jumpered to identify the different TP-DLPs in a given subsystem. This ID word should be differentiated from the Train ID which is a 6-bit number for the "train block" of characters which is presently installed on the Train Printer mechanism $50_p$. The ID or "second word" of the result/descriptor is formatted as follows:

| A | B | C | D |
|---|---|---|---|
| 8 4 2 1 | 8 4 2 1 | 8 4 2 1 | 8 4 2 1 |
| 0 0 0 0 | 0 0 1 0 | x x x x | x x x x |
|  | fixed byte | | field-installed jumpers |

Second Word (ID) of Result Descriptor

The variants A and B, above, are preset to always emit a HEX 02, thus specifying to the main host system that the peripheral involved is a "Train Printer". The variants C and D specify, to the main host system, additional identification which provides the host system software with a method of differentiating between the multiple TP-DLPs within a data link processor subsystem. The digits C and D are field-jumperable in order to allow flexibility of identification.

ECHO: The echo operation causes the data link processor (DLP) to accept a full buffer of data from the main host system and return the data back again to the main host system. This is to permit a confidence check of the data paths.

TRAIN PRINTER-DLP RESULT/DESCRIPTORS: The Train Printer-DLP has the capability of returning different result-descriptors, depending upon the current operation. The A digit is the same for all result/descriptors. The following Table 13 is a description of the information conveyed by the bits in this A digit.

TABLE 13

| A8 | Not ready. The train printer is in a condition other than power on and ready to print. |
|----|-----|
| A4 | Descriptor error. A parity error was detected on the I/O descriptor or descriptor link. The OP code was not valid at this time (conditional cancel), or an invalid OP code was received. |
| A2 | Vertical parity error (host system interface). The vertical parity detected on the host system interface was even. |
| A1 | Longitudinal parity error (host system interface). The longitudinal check word was incorrect. |

WRITE RESULT/DESCRIPTORS: The following Table 14 provides the meanings for the bits in the B, C and D result/descriptor digits returned on any "Write" operation:

TABLE 14

| | |
|---|---|
| B8 | Train image buffer not loaded. The TP-DLP has detected a condition which invalidates the data which was formerly stored in the TIB. |
| B4 | Incorrect train on printer. The train identifier of the train on the printer does not match the train ID stored with the TIB. |
| B2 | End of page. The printer is at the end of the present page of print. This condition occurs only when single or double spaced format is executed. |
| B1 | Reserved. Is always zero. |
| C8 | Reserved. Is always zero. |
| C4 | Reserved. Is always zero. |
| C2 | Print check/sync error. An out-of-sync condition between the TP-DLP and the printer train was detected. |
| C1 | Print check/invalid found. An invalid bit pattern was detected on print buffer load and the TP-DLP substituted the invalid character at that position in the print buffer. |
| D8 | Print check/error line printed. The TP-DLP detected an error condition as reported by bit C1 but because of the type of write operation it printed the line. |
| D4 | Print check/print cycle parity error. A parity error was detected on the print cycle |
| D2 | Print check/hung, no match found. The TP-DLP did not find an "equal compare" on some bit pattern in the print buffer after one full revolution of the print train. |
| D1 | Print check/formatting error. The TP-DLP detected an error condition in the format word on a write or write/halt operation. |

TEST, TEST ID AND ECHO RESULT/DESCRIPTORS: The following Table 15 provides the meaning for the bits in the B, C and D result/descriptor digits returned on the Test, Test/ID and Echo operations:

TABLE 15

| | |
|---|---|
| B8 | Train image buffer not loaded. Refer to the description of bit B8 of the write result descriptor. |
| B4 | Incorrect train on printer. Refer to the description of bit B4 of the write result descriptor. |
| B2 | Column width bit 2. Used in conjunction with bit B1 to specify the length of the print line.[1] |
| B1 | Column width bit 1. Used in conjunction with bit B2 to specify the length of the print line.[1] |
| C8 | LPM type bit 2. Used in conjunction with bit C4 to indicate the printer speed (condition of jumper).[2] |
| C4 | LPM type bit 1. Used in conjunction with bit C8 to indicate the printer speed (condition of jumper).[2] |
| C2–D1 | Train ID. The 6-bit identification number for the train currently installed on the printer. |

NOTES

| [1]Column width | [2]LPM type |
|---|---|
| CWB2/*CWB1/ = 132 | LTB2/*LTB1 = 1100 |
| CWB2/*CWB1 = 120 | LTB2 *LTB1/ = 1500 |
| CWB2 *CWB1/ = 80 | |

TEST/WAIT AND TEST/CONDITIONAL CANCEL RESULT/DESCRIPTORS

The following Table 16 provides the meaning for the bits in the B, C and D Result/Descriptor digits returned on a Test/Wait-ready, Test/Wait-not ready and Test/conditional-cancel operation:

TABLE 16

| | |
|---|---|
| B8 | Train image buffer not loaded. Refer to the description of bit B8 of the write result descriptor. |
| B4 | Incorrect train on printer. Refer to the description of bit B4 of the write result descriptor. |
| B2 | Reserved. Is always zero. |
| B1 | Cancel complete. The TP-DLP has cancelled the current operation. |
| C8–C4 | Reserved. Are always zero. |
| C2–D1 | Train ID. The 6-bit identification number for the train presently installed on the printer. |

TEST/SKIP RESULT/DESCRIPTORS: The following Table 17 provides the respective meanings for the bits in the B, C and D result/descriptor digits returned on a Test/skip operation.

TABLE 17

| | |
|---|---|
| B8 | Train image buffer not loaded. Refer to the description of bit B8 of the write result descriptor. |
| B4 | Incorrect train on printer. Refer to the description of bit B4 of the write result descriptor. |
| B2 | End of page. Refer to the description of bit B2 of the write result descriptor. |
| B1–D1 | Reserved. Are always zero. |

ERROR RECOVERY: The Train Printer data link processor indicates error condition information in the result/descriptor. The errors are logged in the host system maintenance log. The actual recovery techniques are the responsibility of the host system software.

MESSAGE GENERATION AND PARITY CHECKING: The I/O descriptor, the descriptor links (D/L) and the result descriptors (R/D) are transmitted (FIG. 1) between the Train Printer-data link processor $20_3$ and the main host system 10 through the message level interface $15_i$ (MLI) via the distribution card $20_{od}$. The message level interface $15_i$ is a 25 wire cable used to connect the data link processor's base module $20_O$ with the main host system 10 as seen in FIG. 2.

Parity errors or invalid OP codes which are detected on descriptor transfers will cause the Train Printer-DLP to send a result/descriptor to the host system and suppress the data transfer. A parity error detected on a data transfer during print operation causes the Train Printer-DLP to complete the buffer loading and to send a result/descriptor to host 10 without printing the line.

A parity error detected on data transfer during the load-train-image-buffer operation causes the Train Printer-DLP to complete the operation and to send the result/descriptor to the host 10 indicating that the train-image-buffer is not loaded. Parity is stored in both the train image and the print image buffers (FIGS. 5B, 5C) and, during print operations, is checked when the Train-Printer-DLP is in a print cycle on to the printer mechanism. If an error is detected, the printing is terminated and a result/descriptor indicating the error is returned to the main host system 10.

TRAIN PRINTER-DLP CHARACTERISTICS

The following discussion will describe the major characteristics of the Train Printer-Data Link Processor, especially the train image buffer, the print image buffer, the delimiter character, format control and train identification in addition to other factors of significance.

TRAIN IMAGE BUFFER

In reference to RAM 22 of FIG. 5A and FIGS. 5B, 5C, the Train Printer-DLP contains an element designated as a train image buffer (TIB). The contents of this buffer are used to determine when to fire the print hammers of the printer mechanism $50_p$. For valid printing to occur, this buffer must be loaded with a character set that matches the currently-used print train blocks in the printer mechanism. The train image buffer (TIB) has 288 addressable bytes corresponding to the 288 characters on the train module. Each byte is an 8-bit entry corresponding to a particular character on the train module. The Train Printer-Data Link Processor receives two 8-bit bytes on each memory access as the train image buffer (FIG. 5B) is being loaded.

A new train image must be loaded from the host system into this buffer whenever train modules are interchanged or whenever the TP-DLP has been either master-cleared or taken off-line for maintenance operation.

The first word of data transmitted to the Train Printer-DLP on the "load TIB" operation must contain a host system definition for the blank and the invalid code bit pattern (two extra characters are supplied for a "load TIB" operation and are stored separately from the TIB). These special characters are described later.

The "blank code" bit pattern is designed to appear in the A and B digits of this first word and the "invalid code" bit pattern appears in the C and D digits.

The definition of "variable" graphic character-sets on the same train module is permitted. Also partial sets, or more frequently-used characters can be created in order to maximize print speed.

Most printer trains contain multiple copies of each graphic item. For example, on a 48-graphic train, the graphic "A" occurs in positions 18, 66, 114, and 162. If the EBCDIC character "A", (coded as HEX C1) is to be printed as a graphic A, then HEX C1 must be loaded into the train image buffer at location 17, 65, 113, and 161. The first location in the train image buffer is designated as "O".

If there were other EBCDIC values, in addition to "A", to be printed as the graphic "A", then the 4 train image buffer locations would be distributed among the alternative values. For example, if the lower case EBCDIC character "a", HEX 81, is to be printed upper case as well, the train image buffer is loaded as follows: TIB 17=C1; TIB 65=81; TIB 113=C1 and TIB 161=81.

During a train image "load", if a delimiter character (HEX CF, described hereinafter) is detected, the operation completes by returning a result/descriptor indicating the train image buffer is "not loaded".

PRINT BUFFER: The Train Printer-data link processor contains a "print buffer" which is loaded once per print operation with data entries consisting of two 8-bit characters plus parity per word. FIGS. 5B and 5C show the allocations in RAM 22 which are dedicated for the print image buffer, PIB. The buffer capacity is sufficient for one line of print (132 characters maximum). The number of printer columns determines when the buffer is full. The result/descriptor is returned just prior to paper motion. The Train Printer-DLP is capable of accepting a new descriptor and/or loading the buffer while paper motion is occurring in response to the previous descriptor or line of print.

DELIMITER CHARACTER: The delimiter character, HEX CF, is recognized when it occurs in a data train, and the data transmission is discontinued and the printing of the remaining columns is inhibited.

The delimiter character is not printable and the 8-bit HEX CF code cannot be used to represent a graphic at any time. The check for a delimiter character can be inhibited by setting bit C8 of the variant digit V2 of the print OP code. If a delimiter character is received from the host system during a print image buffer load with bit C8 for the variant digit V2 "set" (inhibit delimiter character check), this character is then flagged as invalid.

FORMAT CONTROL: The skipping and spacing of paper is determined by descriptor variant digit V3 on single line print operations or by information received in the first 16-bit transmission of data for each line of print on multiple-line print operation. The note 2 on Table 12 gives a pictorial description of this format word. This word contains 11 reserved bits (R) which must always be "0". On multiple line print operations, the TP-DLP examines these 11 bits as it is loading the format word. If it detects anything other than a "0" in anyone of these 11 positions, the operation is terminated and a result/descriptor is returned indicating a format error.

When accepting a line during a multiple line print operation, the Train Printer-DLP must receive at least one data character to be printed. If the host system terminates or transmits a delimiter immediately following the format word, the format error bit is set in the result/descriptor and the operation is terminated. The alignment of the paper in the train printer is determined by the use of printer format types which are inserted in the Train Printer mechanism $50_p$.

TRAIN IDENTIFICATION: A sequence of 6-bits is received from each train module as an identifier. This information is reported on the result/descriptor returned in response to all tests and echo operations, except the test/skip operation.

Trains with no identifier are interpreted as having an identifier of "0". The train ID bits of the "load train image buffer" (LTIB) descriptor must also be all "O's" or else printing is inhibited.

Whenever the printer changes from a "not-ready" to a "ready" state, compatibility between the train identifier (ID) and the train image buffer (TIB) is rechecked. Compatibility is also checked whenever the Train Printer-DLP has been off-line or master-cleared. If the two were unequal, the Train Printer Data Link Processor sets the "incorrect-train-on-printer" bit in the result/descriptor for all subsequent operations until the correct train image is loaded or the correct train is installed on the printer.

SPEED CAPABILITY: The Train Printer-Data Link Processor has 1100 LPM and 1500 LPM (lines per minute) capability provided that the proper hard wired jumper $82_w$ is installed. The operation of the Train Printer-DLP is not changed except that:

(a) in response to a "test" operation, the result descriptor bits are "set" to indicate the jumpered speed.

(b) the Train Printer-DLP is designed to expect the variant digit V2 (bit position C4 of the load-train-image-buffer) descriptor (LTIB) to indicate the printer speed (that is, 1100 or 1500 lines per minute). If this bit does not compare with the installed (speed) jumper, the operation is terminated and the bit B4 (incorrect train) of the result/descriptor is set.

BLANK CHARACTER: On a train image buffer (TIB) "load", the Train Printer-DLP is designed to receive the host system defined-bit configuration for the "blank" code. The characteristics for this "blank character" are as follows:

(a) if loaded into the print buffer on a print operation, the hammer associated with that column position on the paper, is not fired.

(b) if loaded into the train image buffer, the graphic character associated with that position on the print train will never be printed.

The "blank character" must be transmitted to the Train Printer-DLP in the A and B digits of the first word of the load-TIB data transmission.

INVALID CHARACTER: The Train Printer-DLP, on a "load-TIB" operation is designed to receive the host system defined-bit configuration for the invalid code. This configuration must be either the host system defined blank-code-bit pattern or any one of the validly defined characters in the train image buffer (TIB).

If it is any other configuration and it becomes necessary on a "Write" operation to substitute and print the invalid character because of an invalid bit pattern in the print buffer, the Train Printer-DLP attempts to print this character. However, since it never finds a "compare-equal" as defined under the print cycle, (hereinafter described) the Train Printer-DLP terminates the operation by returning the result/descriptor indicating a "hung-no-match-found".

The invalid character will be transmitted to the Train Printer-Data Link Processor in the C and D digits of the first word of the "TIB-load-data" transmission.

PAPER WIDTH DETERMINATION: A jumper option is provided in the Train Printer-DLP for paper widths of 80, 120, 132 columns. The jumper must be correctly installed for the current printer which is in use.

PRINT CYCLE: The actual printing of characters is controlled by scanning a message to be printed and comparing it with the train image buffer of FIG. 5C. The character in the print buffer corresponds to the hammer position in the printer. The address of the train image buffer (TIB) corresponds to the character positioned over the hammer. If the 8-bit entry in the train image buffer is equal to the 8-bit code in the print buffer, a set level is sent to the printer and that hammer is fired on the next print cycle of the printer.

A pointer into the train image buffer TIB is kept synchronized with the train movement. During print scans, the print message is scanned and the address of the train image buffer is changed to correspond with the character hammer positions. This is continued until all the characters in the print buffer have been printed.

TRAIN-PRINTER-DLP: The elements of the hardware of the Train Printer-DLP are shown in FIGS. 4A and 5A.

The Train Printer-Data Link Processor consists of two 96-chip, multi-layered printed circuit cards, which plug into adjacent slots in the DLP Base Module backplane. These two printed circuit boards are designated as the Common Front End (CFE) card and the peripheral-dependent board (PDB). These two boards are connected together by the use of three 50-pin foreplane connectors. Table IV, previously shown, lists the connectors by number and shows the signal name associated with each pin.

As seen in FIGS. 4A and 5A, the elements of the CFE are shown in block form. The central heart of the CFE is the PROM controller and storage sections 13 and 14. The PROM storage consists of 13 separate PROM chips giving a total storage capacity of 1,024 52-bit words, and this includes odd parity. The CFE $10_c$ contains the receivers 110 for the DLP interfaces with the Distribution and the Maintenance Cards. The "enable" signals for these buses are driven by the PDB 80. The DLP RAM storage buffer 22, which has a capacity of 1024 17-bit words (including odd parity), is also located in the CFE $10_c$. However, the RAM storage 22 is controlled entirely by the PDB 80. The Table I-A contains a glossary of applicable CFE terms.

PROM CONTROLLER: The 13 PROM chips designated element 13 (FIGS. 4A, 5A) on the CFE card are combined to make up a 52-bit micro-code instruction word. The address lines to the 13 PROM chips are bused together so that all individual address lines are common to every chip. The data outputs of the 13 chip PROM matrix forms the 52-bit word. This word is "read-out" of the address that is present on the common input address lines. Since these PROMs are unclocked devices, a means is required to synchronize the outputs with the 8-megahertz clock. This is accomplished by the use of register chips 14. The register chips contain 8 flip-flops each, and thus 7 chips are used to synchronize and latch the 52-bit micro-code word. This latched micro-code instruction is used to control the operation of the entire data link processor. Every 8-megahertz clock pulse latches the next subsequent word into the register chip 14.

Different types of data link processors require their own unique micro-code; thus, all CFE cards contain the identical hardware except for the 13 PROM chips. Although the PROM word physically contains 52-bits only 49 bits are used by the micro-code program.

Tables VI$a$, VI$b$ shows the 49-bit (0–48) micro-code word, by bit position and name. It will be seen that all PROM output signal names are preceded by a pound sign (#) so that they are easily recognizable in the drawings and tables and in hardware flows. Bit 32 of the micro-code word is the parity bit (odd). The CFE card continually checks for odd parity and halts the micro-code program if a parity error (even parity) occurs on any 49-bit PROM micro-code word.

RAM BUFFER: The common front end (CFE) $10_c$ of FIG. 5A contains the random access memory buffer, RAM 22. The RAM buffer (sometimes called the Data RAM) consists of 1024 17-bit words. All inputs and outputs of this RAM memory are received or driven by the PDB 80. The designation used for this open collector (60 nanosecond) read-access RAM is "RWON". This storage area is used to store the data, the OP code, the descriptor links, the descriptor links longitudinal parity word (LPW) and various flags that are required to properly control the operation of the Train Printer-DLP.

STACK REGISTER: The stack register 11 consists of 3 binary counter chips. This register can contain the value of the current PROM address or the value of the address to be used when returning from a subroutine by way of a stack branch operation.

PERIPHERAL-DEPENDENT BOARD (PDB): The peripheral-dependent board contains a general purpose register 230, of six 4×4 register files 212 used for accumulators, a column-done RAM 214, an invalid character circuit 216, a LPW (longitudinal parity word) generator 218, a peripheral interface 220, line control logic 222, a data path multiplexor 224 (using nine dual 4-1 data selector chips), compare logic 226, data bus drivers 28, plus error detection logic and 2-way branching logic.

The Table I-B contains a glossary of the PDB terms. A simplified description of the micro-code treatment of a "load train image" buffer command will be found described hereinafter.

The Train Printer-Data Link Processor (TP-DLP) is typically used to interface 1100 and 1500 lines per minute train printers to a host system via the message level interface $15_i$(MLI). As mentioned before, the TP-DLP consists of two cards which constitute: a common front end card (CFE) and peripheral dependent card which is commonly called a peripheral dependent board (PDB).

As previously discussed the common front end card provides 1024 52-bit words of PROM that is used to store micro-code, and 1024 17-bit words of RAM for data storage, maintenance logic, and part of the DLP interface.

The PDB 80 provides:
1. the controlling signals to the Train Printer, $50_P$.
2. address logic for the RAM buffer or the CFE and the RAM access logic.
3. longitudinal parity word (LPW) and the vertical parity generation and checking logic.
4. identification jumpers.
5. twelve 8-bit accumulators.
6. a general purpose register.
7. compare logic.
8. other necessary flags and control logic.

FIG. 5A shows the basic block diagram of the Train Printer-DLP.

ACCUMULATOR: The accumulators 212 of FIG. 5A provide data storage for twelve 8-bit registers (designated accumulators 0-11). The accumulators are made up of six 4×4 register file chips. Only two of these chips are selected at any one time. There are 8 input information lines and 8 output information lines associated with these accumulators. The addressing of the chips is indicated by Table 18 hereinbelow:

TABLE 18

Accumulator Addressing and Usage

| Accumulator | Chips Selected | | ACC8 | ACC4 | ACC2 | ACC1 |
|---|---|---|---|---|---|---|
| | MSD | LSD | | | | |
| 0 | K2 | I3 | 0 | 0 | 0 | 0 |
| 1 | K2 | I3 | 0 | 0 | 0 | 1 |
| 2 | K2 | I3 | 0 | 0 | 1 | 0 |
| 3 | K2 | I3 | 0 | 0 | 1 | 1 |
| 4 | I2 | K3 | 0 | 1 | 0 | 0 |
| 5 | I2 | K3 | 0 | 1 | 0 | 1 |
| 6 | I2 | K3 | 0 | 1 | 1 | 0 |
| 7 | I2 | K3 | 0 | 1 | 1 | 1 |
| 8 | J2 | J3 | 1 | 0 | 0 | 0 |
| 9 | J2 | J3 | 1 | 0 | 0 | 1 |
| 10 | J2 | J3 | 1 | 0 | 1 | 0 |
| 11 | J2 | J3 | 1 | 0 | 1 | 1 |

| Accumulator | Usage |
|---|---|
| 0 | Train absolute address |
| 1 | TIB subscan address |
| 2 | TIB subscan address (restore) |
| 3 | Print buffer subscan address |
| 4 | Print flags |
| 5 | CSL count |
| 6 | Result descriptor A and D digits |
| 7 | Result descriptor B and C digits |
| 8 | Initiate LPW flag, columns printed |
| 9 | Prescan blank address |
| 10 | Initiate flags, print data flags |
| 11 | Various addresses (working register) |

TABLE 18-continued

Accumulator Addressing and Usage

| Bit | Accumulator 4 Description |
|---|---|
| 0 | Column bottom/top (0 = top). |
| 1 | 1 = PCSL 3 or 4. |
| 2 | 0 = PCSL counted from 4 back to 1. |
| 3 | Train absolute bottom/top (0 = top). |
| 4 | 1 = Absolute train address overflow. |
| 5 | Not used. |
| 6 | Not used. |
| 7 | Train sub scan bottom/top (0 = top). |

| Bit | Accumulator 5 Description |
|---|---|
| 0 | WAITAF flag. Tells the PCSL update procedure to exit to the WAITAF procedure. |
| 1 | PRINT flag. Tells various procedures to return to the WRITE procedure. |
| 2 | ECHO flag. Tells various procedures to return to the ECHO procedure. |
| 3 | Load train buffer flag. Tells various procedures to return to the LOAD TIB procedure. |
| 4-7 | CSL count. This value is incremented by 1 each time CSL is anticipated. |

| Bit | Accumulator 10 Description |
|---|---|
| 0 | Wait flag (1 = wait operation pending). |
| 1 | Wait for ready (1 = wait for ready pending). |
| 2 | Test ID flag. Tells the result procedure to send the second ID result word. |
| 3 | Print halt flag. Tells the write procedure not to print the line if an invalid occurs. |
| 4 | Move 1st flag. Tells the write procedure to move paper first for a single line print. |
| 5 | Multiple line flag. Tells the write procedure that this is a multiple line print. |
| 6 | Terminate flag. Tells the write procedure to stop a multiple line print. |
| 7 | Back up flag. Tells the write procedure to perform an MLI back-up on one character. |

The register chip select is derived from signals ACC 8 and ACC 4 by means of decoder chips (not shown). A chip LO (not shown) provides "write enable" to the chips selected by the ACC 8 and ACC 4. Another chip KO (not shown) provides the "read enable" to the chips selected by the ACC 8 and ACC 4.

Locations within the 4×4 register file chips are addressed by signals ACC 1 and ACC 2 as seen in Table 18.

The input to the accumulators 212 is either the #CONST lines or the sum of the #CONST lines and the RAMAD lines (BC register), depending upon the state of the MPXSELAD control signal.

GENERAL PURPOSE REGISTER: The general purpose register 230 provides the only sink for the accumulators 212. The general purpose register has 8 input information lines and 16 output information lines, and the register is divided into four 4-bit portions, A, B, C and D. These 4-bit portions are grouped into two 8-bit portions: AD and BC. Information is loaded from the accumulators 212 into register portions AD or BC, or both depending upon the signals LDREGCAD (load register column address), LDREGRAD (load register RAM address), or both respectively.

The 8-bit BC register drives the address line for the RAM buffer on the CFE card $10_c$. The 8-bit AD register addresses the column "Column Done" RAM chip 214.

provide one of the four sources for the data multiplexor 224.

COLUMN DONE LOGIC: The purpose of this logic (214) is to determine if a column has been "printed" and hence is given the mnemonic COL-DONE. This output signal, when high, indicates that the column has already been printed or is not intended to be printed (for example: a blank is to be left in a column).

Referring to the block diagram of FIG. 4D (DLP connection logic) and the schematic in FIG. 5G which is a general purpose register: The column-done logic consists of one 1K RAM chip L4. The address inputs to this chip L4 are controlled by the AD registers of register 230 and the signal THRAMCLD (top half RAM column done), which is a high active micro-code output.

The signal THRAMCLD designates—"upper/lower column select" (1=upper). The signal WECOLDN (write enable column done) is a low active signal generated by the micro-code which supplies "write-enable" to the chip.

The signal DIRAMCOL (data input to column done RAM) is a high active signal generated by the microcode that supplies the input information to the RAM 22.

RAM CONTROL: The Random Access Memory Buffer 22 (RAM), as seen in FIGS. 5A, 5B and 5C, has a storage capacity of 1K × 17 bits (16 data bits with one odd parity bit) and is located on the CFE card $10_c$. All the input, output, address, write enable, and chip select lines are located on the peripheral dependent board 80. The above mentioned signals are connected to the PDB 80 through the top two foreplane connectors $80_a$ and $80_b$.

The RAMADn lines 53 are always driven by contents of the BC register in register 230. The signal WE/ (write enable/) is generated by a micro-code output which is gated with a clock (8 CLCK 1) for the proper timing. The signal CS/ (chip select/) is grounded on the PDB 80 thus continuously enabling the RAM 22.

When the signal WE/ is "high", the RAM 22 is placed in the "Read" mode. The information at the location addressed by the RAMADn lines 53 (RAM address) is placed on the RAMxn (RAM output) lines $22_a$ and is routed to the data multiplexor $83_m$ and thence to the 2-1 multiplexor of the data comparison logic 226.

When the signal WE/ is "low", the RAM 22 is placed in the "Write" mode. The lines DBUSxn are connected directly to the INRAMxn lines 100 on the peripheral dependent board 80. The information contained on the DBUSxn lines are written into the RAM 22 at the location addressed by the RAMADn lines 53.

The RAM buffer 22 is used to store the "train image" and also the print image, the OP codes, the descriptor links, the longitudinal parity word (LPW) and other information. This is shown in FIGS. 5B, 5C which show the mapping of the RAM buffer 22.

FIG. 5B shows the entire RAM mapped according to words 0 through 1023. The upper half of the RAM is not used (words 512-1023); thus RAMAD 9 (address bit 512) is grounded on the PDB 80.

The 512 locations of RAM buffer 22 that are used are referred to as the lower RAM (RAMAD 8=0) and the upper RAM (RAMAD 8=1) which is shown in FIGS. 5B and 5C.

FIG. 5B illustrates a map of the RAM buffer 22 where it can be seen that addresses 512 through 1023 are not used. The remainder of the buffer space is then divided into the bottom half of the RAM (RAMAD 8=0) which include addresses 0-255, and this space is used for the descriptors and control words (addresses 0-16) while addresses 190-255 are used for the print image buffer.

The top half of the RAM 22 (RAMAD 8=1) involves addresses 256-511, where addresses 256-367 are dedicated for control words, and addresses 368-511 are provided for the train image buffer.

The following Table 19 shows the layout of the lower and upper RAM buffer 22.

TABLE 19

| Decimal Address | Stored Information |
|---|---|
| | Lower RAM (RAMAD8 - 0) |
| 0 | Descriptor (temporary result descriptor) |
| 1 | Descriptor LPW |
| 2 | Descriptor link #1 |
| 3 | Descriptor link #2 |
| 4 | Descriptor link #3 (LPW) |
| 5 | Multiple line format |
| 7 | Train ID (from last load TIB operation) |
| 9 | Fetched ID |
| 16 | Back-up word (01) |
| 190 | PIB starting address for 132-column printer |
| — | |
| 196 | PIB starting address for 120-column printer |
| 216 | PIB starting address for 80-column printer |
| 255 | Buffer end |
| | Upper RAM (RAMAD8 - 1) |
| 0 | Descriptor during test/waits |
| 1 | Descriptor LPW during test/waits |
| 2 | Descriptor link #1 during test/waits |
| 3 | Descriptor link #2 during test/waits |
| 4 | Descriptor link #3 (LPW) during test/waits |
| 5 | Cancel OP code for compare (2800) |
| 111 | Blank/invalid address |
| 112 | TIB starting address |
| 255 | TIB ending address |

INVALID CHARACTER DETECTION: To provide a means of determining whether a character to be printed is invalid or not invalid a 1K-by-1 bit RAM chip is used (RWOO) and this is referred to as the invalid RAM which is located on element 216 of FIG. 5A. The address lines of the invalid RAM are driven by the contents of two chips which are used as two 4-bit latches 215.

The DI (data input) connection to the 1K-RAM 216 is DIRAMINV (data in the RAM is invalid) which signal is micro-code generated. The WE/ connection to the invalid RAM 216 is WERMINV (write enable to invalid RAM) which is also micro-code generated. The invalid character detection is performed entirely by the micro-code.

DATA PATH MULTIPLEXOR: As seen in FIG. 5A the data multiplexor 224 is used to select which of four possible "sources" is to drive the DBUS and the INRAM bus 100. The data multiplexor 224 is made of nine dual 4-1 data selector chips which provide an output of 18-bits of which only 17 bits are used. The nine data selector chips are always enabled by the grounding of the strobe inputs (ST1/ and ST2/). The SLA inputs to the nine data selector chips are common and are driven by a micro-code term MPXDATAA (multiplexor data A). The SLB inputs are also common and are driven by the micro-code term MPXDATAB (multiplexor data B).

The data selector chips of data multiplexor 224 are fed by four sources which are:
1. 16 bits from the general purpose register 230 (IRAMAD 7—IRAMAD 0 and also RAMAD 7—RAMAD 0) which are tied to the A-1 and A-2 inputs of the data selector chips.
2. 16 bits which make up the second word of the test/ID result descriptor (ID word). This comes from the ID jumpers 82 and the hard wired circuitry $82_w$.

As previously mentioned in the test/ID description heretofore, the 8 most significant bits are fixed. Bit B2, which is connected to the B2 input of chip D3, is pulled high via a 1100 ohm pull-up resistor while the remaining 7 bits are grounded producing a fixed byte of HEX 02. The least significant 8-bits are from the identification jumpers CID 8-DID 1. This is the second source of the data selector chips and this source connects to the B1, B2 inputs of the data selector chips.
3. 17-bits from the 1K by 17-bit RAM 22 (located on the CFE $10_c$) output lines on the RAMnn bus $22_a$ (RAMA8-RAMD1 and RAMPAR) which are connected to the C1 and C2 inputs of the data selector chips.
4. 16-bits from the LPW generator 218 on the lines LPWnn which provide input to the data multiplexor 224. These bits are designated LPWA8—LPWD1; they are connected to the D1 and D2 inputs of the data selector chips of multiplexor 224.

Vertical parity (odd) is generated for each of the 16-bit sources and connected to a chip H4 (in 217, vertical parity circuit) having inputs A2, B2, and D2. This is named PARGEN (parity generation). The RAM 22 output is the only source that supplies its own parity bit designated RAMPAR.

The Table 20 listed below illustrates the charting for the selection of the source of input to the data selector multiplexor 224.

TABLE 20

| Source Selection for Input to Data Selector Multiplexor | | |
|---|---|---|
| MPXdataB | MPXdataA | Data |
| 0 | 0 | General Purpose Register |
| 0 | 1 | ID word |
| 1 | 0 | RAM output |
| 1 | 1 | LPW |

The outputs of multiplexor 224 provide a path MPXnn to the DBUSnn. This is done via 3 tri-state chips. These devices are enabled when the micro-code generated signal ENMPX/ (enable multiplexor/) is "low".

LPW GENERATOR/CHECKER: The longitudinal parity word generator checker 218 is made up of 16 JK flip-flops. All of the clock inputs are driven by the micro-code terms CLKLPW RG (clock LPW register). All the preset inputs are driven by the micro-code term RESTLPW (re-set LPW) which is gated with a clock (8CLK2). The J and K inputs on each flip-flop are tied together by one of the 16-bits on the DBUS. The output lines of the LPW generator 218 are designated LPWA-8-LPWD1 and these provide one of the four inputs to the data multiplexor 224.

The LPW generator 218 is initially reset to all 1's by the micro-code signal RESTLPW. The "receive" or "transmit" data is applied to the DBUS as the input to the LPW generator. The micro-code then applies a clock pulse to the LPW generator 218 (CLKLPWRG). If an individual data bit is "high", the associated flip-flop toggles. If the data bit is "low", the associated flip-flop remains in its previous state. Each data word received or transmitted is placed on the DBUS and clocked by CLKLPWRG.

For transmission "from" the TP-DLP, this data is transmitted to the main host system 10 as it is clocked into the LPW generator 218. After all the data has been transmitted, the 16-bit word left in the LPW generator is the longitudinal parity word and it is the next word transmitted to the main host system.

For transmission "to" the TP-DLP, the LPW generator 218 is preset by the micro-code signal RESTLPW. As each word is received, it is presented onto the DBUSnn. The micro-code generates CLKLPWRG in order to clock the LPW generator with this received data. Just like the data transmission operation of the LPW generator 218, the LPW generator contains a DLP generated longitudinal parity word. The last word received by the Train Printer-Data Link Processor, on a data transfer, is the LPW from the host system 10. This LPW is gated onto the DBUS and is also clocked by the CLKLPWRG signal into the LPW generator 218. The data link processor generated LPW must equal the host system supplied LPW. The LPW will equal "0" if no LPW error occurs.

IDENTIFICATION JUMPERS: There are 8 identification jumpers 82 (FIG. 3) located on the peripheral-dependent board (PDB) 80 and these are named CID8-DID1. These signals are tied to 1100 ohm pull-up resistors, which provide a logic "high" in the absence of a jumper. Individual signals are forced "low" with the installation of a jumper. These signals are fed to the data multiplexor 224.

COMPARE LOGIC: The compare logic 226 (FIG. 5A) uses two 4-bit comparator chips. These chips are configured in a tandem mode to provide comparison between two 8-bit sources.

Source A for the compare logic is the 8-bit compare latch 215 which is made of two 4-bit counter chips.

Source B is the 8-bit output of the two quad 2-1 multiplexor chips $83_m$. The 16-bit input to these multiplexors comes from the outputs of the RAM buffer 22 on line $22_a$. These 16-bits are divided into "top" and "bottom" 8-bit portions, according to their selection from the top half (TH) or bottom-half (BH) of RAM 22.

The SL inputs to the multiplexor chips $83_m$ are tied together and controlled as to whether the "top" or the "bottom" 8-bit portion is selected. The SL inputs are tied to SELTHBH ("high" equals bottom half) which is a micro-code signal. The compare register has LD/ (load/) inputs which are tied to the low active term LATPRDAT (load the compare register with print data) which is micro-code generated.

Data from the multiplexor chips $83_m$ is located into a compare register on the leading edge of the clock (8CLK/3) when the term LATPRDAT is low. Data from this compare register is also the data path to format control. The output of the compare logic 226 is the term "TIB equals PIB" which is fed into an 8-1 multiplexor chip $221_p$. The micro-code may use the term TIB=PIB in order to generate the term A0 by bringing up the micro-code outputs #BRANCH 5 and #BRANCH 2. The term #BRANCH 5 effectively derives SEL2/ low which enables the 8-1 multiplexor chip 221$_p$ causing the signal A0 to reflect the state of TIB=PIB.

ERROR DETECTION: The major part of error detection in the TP-DLP is done in two 512 by 4 bit PROM chips. As seen in FIG. 5H these are designated PR 50$_a$ and PR 50$_b$.

The signal OP DECSEL (OP decode select) is applied to the A8 address line inputs to the PROM chips PR 50$_a$ and to PR 50$_b$. The OP decode select signal actually designates the function of the PROMS:
1. when OPDECSEL is "high", the PROM's 50$_a$ and 50$_b$ are used to decode the OP code and detect invalid OP codes.
2. when OPDECSEL is "low", the PROM's 50$_a$ and 50$_b$ are used for vertical parity generation/detection, LPW error detection, format error detection, and delimiter character detection. PROM 50$_a$ is used to monitor the digits A and B of the DBUS while the PROM 50$_b$ monitors the digits C and D of the DBUS. The information on the DBUS is used as addresses to the PROMS. The PROM 50$_a$ and 50$_b$ and the CS0/enable line inputs are always enabled, that is, grounded. The 8 PROM outputs produce a function that is determined by the 16 inputs in the DBUS. The Table 21 below shows the function of the 8 PROM outputs of 50$_a$ and 50$_b$.

TABLE 21

| | Error Detection PROMS | |
|---|---|---|
| PROM Output | OPDECSEL = 1 | OPDECSEL = 0 |
| (A0-D1) OPDEC1 | OP decode bit wt.1 | A digit bits 4, 2, and 1 = |
| (A0-D2) OPDEC2 | OP decode bit wt.2 | A-B digits = delimiter |
| (A0-D3) OPDEC4 | OP decode bit wt.4 | A-B digits = 0 |
| (A0-D4) OPDEC8 | OP decode bit wt.8 | A-B digits are odd |
| (B0-D1) Not used | | |
| (B0-D2) BOTCF/ | Not used | C-D digits = delimiter |
| (B0-D3) LPWCD | Not used | C-D digits = 0 |
| (B0-D4) CDPARGEN | Not used | C-D digits are odd |

VERTICAL PARITY GENERATION/DETECTION: As seen in Table 22, and FIG. 5H, the two output signals from the PROMs (at 50$_a$ and 50$_b$) are used for vertical parity generation and detection. These are OPDEC8 (ABPARGEN) and CDPARGEN. The OPDEC8 is "high" for odd parity on the A and B digits of DBUS, while CDPARGEN is "high" for odd parity on the C and D digits.

TABLE 22

| Vertical Parity Generation/Detection | | | | |
|---|---|---|---|---|
| CDPARGEN | ABPARGEN | PARGEN | DBUSPR | PARERROR |
| 0 | 0 | 1 | 0 | 1 |
| 0 | 0 | 1 | 1 | 0 |
| 0 | 1 | 0 | 0 | 0 |
| 0 | 1 | 0 | 1 | 1 |
| 1 | 0 | 0 | 0 | 0 |
| 1 | 0 | 0 | 1 | 1 |
| 1 | 1 | 1 | 0 | 1 |
| 1 | 1 | 1 | 1 | 0 |

For vertical parity generation it is necessary to generate a "high" level for even parity and a "low" level for odd parity. For vertical parity detection, it is necessary to generate a high level to indicate a parity error if either of the following two conditions exist:

1. The parity bit is high while the 16-bits of data have an odd number of bits "ON".
2. The parity bit is low while the 16-bits of data have an even number of bits "ON".

Figure 5F:
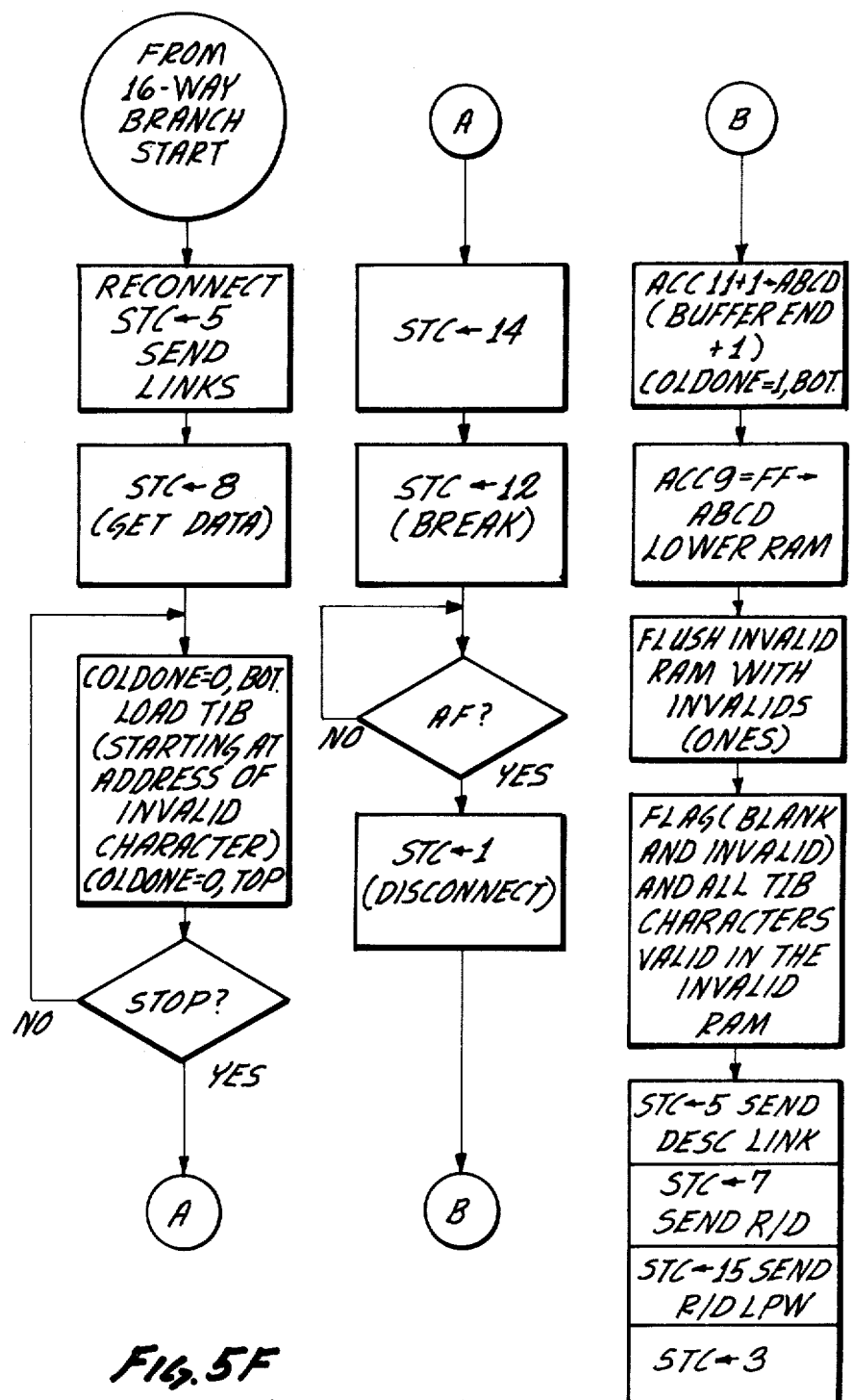
FIG. 5F is a flow chart illustrating use of the train image buffer memory area.
Figure 5I:
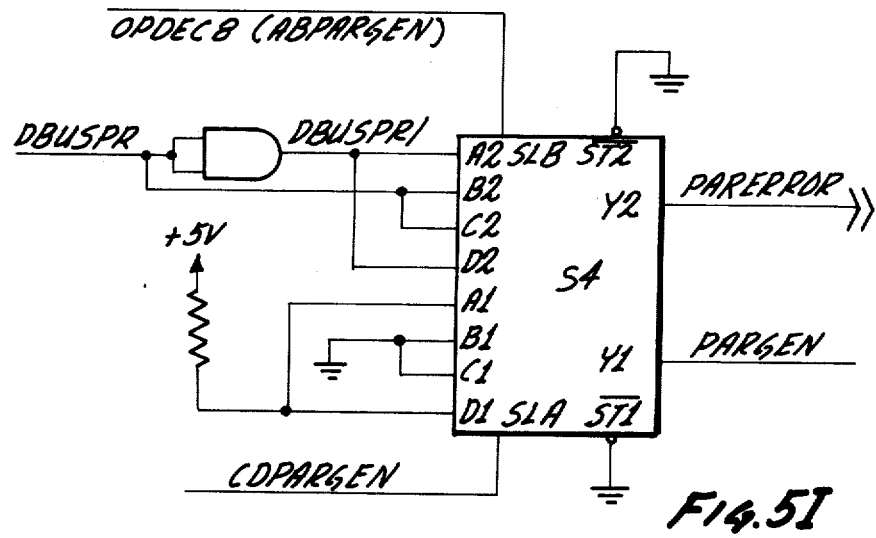
FIG. 5I is a diagram of the vertical parity generation check circuit.

As seen in FIG. 5I these functions are generated by a dual 4-1 data selector chip S4. SLA and SLB are the select inputs to the data selector chip S4.

The signal PARGEN is a parity bit input to the data path multiplexor 224. The micro-code selection of the multiplexor inputs determine when this PARGEN bit is used. The signal PARERROR (parity error) is sent to the CFE 10$_c$ as TEST 5 via the foreplane to be tested by the micro-code.

LPW ERROR DETECTION: Two output signals from the PROMs 50$_a$, 50$_b$, are used for LPW error detection as will be seen in Table 21, previously shown hereinbefore and in FIG. 5H.

These two output signals are named OPDEC4 (LPWAB) and LPWCD. OPDEC4 (LPWAB) is "high" if the A and B digits of DBUS equal 0. LPWCD is "high" if the C and D digits of DBUS equal 0.

As seen in FIG. 5H the PROM outputs OPDEC4 and LPWCD are fed into the NAND gate 50$_g$ thus developing the output signal LPWERROR (high equals error). This signal is sent to the CFE 10$_c$ as TEST 6 via the foreplane to be tested by the micro-code.

FORMAT ERROR DETECTION: The two output signals of FIG. 5H, with reference to Table 21, from the PROMs 50$_a$ and 50$_b$ are used in checking for valid format commands on multiple line operations. These signals are named OPDEC1 (digit A equals 8 or A equals 0) and LPWCD. The signal OPDEC1 is "high" if digit A of DBUS equals 8 or equals 0. LPWCD is "high" if C and D digits equal 0. The previous Table 12, under note 2 shows the composition of the format word.

Referring to FIG. 5H, the PROM outputs OPDEC1 (instead of OPDEC4) and LPWCD are fed into the NAND gate 50$_g$ developing the output signal FORERROR instead of LPWERROR (high equals error). This signal is sent to the CFE 10$_c$ as TEST 10 via the foreplane and to be tested by the micro-code.

DELIMITER CHARACTER DETECTION: The two output signals from the PROMs 50$_a$ and 50$_b$ are also used for delimiter character detection as seen in Table 21 and FIG. 5J. These signals are named: OPDEC2 (TOPCF/) and BOTCF/ (which refer to top and bottom).

Figure 5J:
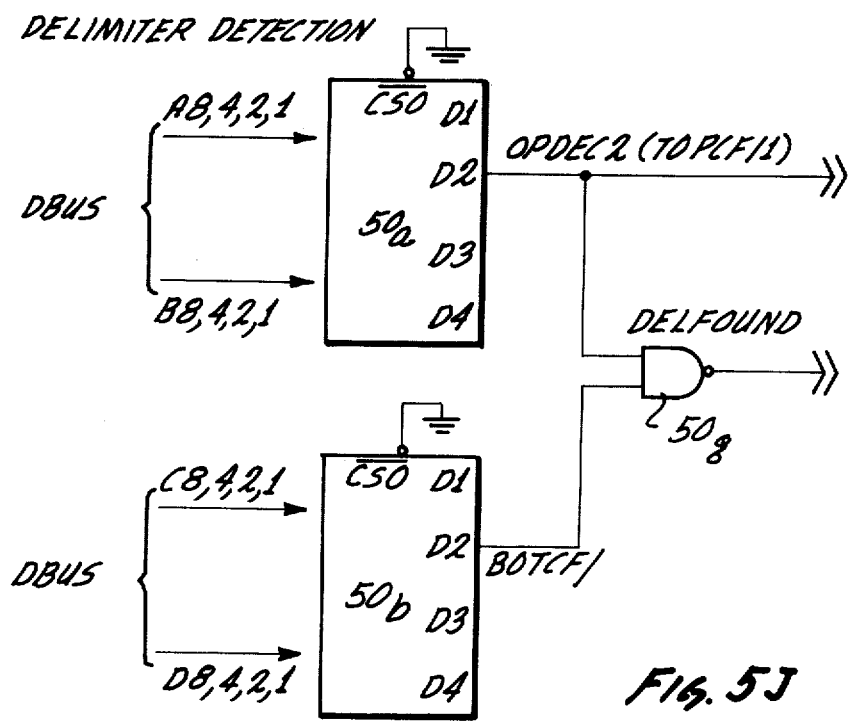
FIG. 5J shows the delimiter detection circuit.

The signal OPDEC2 (TOPCF/) is "low" if A and B digits of DBUS equal HEX CF (which is the delimiter character). The signal BOTCF/ is "low" if the C and D digits of DBUS equal HEX CF as seen in FIG. 5J.

PROM outputs OPDEC2 and BOTCF/ are fed into the NAND gate 50$_g$, thus developing the output signal DELFOUND (delimiter found). This signal is sent to the CFE 10$_c$ as TEST 8 via the foreplane to be tested by the micro-code ("high" equals delimiter found). After the micro-code detects a delimiter, it tests to see if the delimiter was detected in the A and B digits or, in the C and D digits, by testing the signal TEST 9 (top delimiter) which is also sent to the CFE 10c via the foreplane (low equals top delimiter).

OPERATION DECODE (OPDEC): As seen in FIG. 5H, the operation decoding is performed by PROM 50a when the address A8 input (OPDECSEL) is "high". This signal is controlled by micro-code and is forced "high" when OP decoding is desired. This PROM, while OPDECSEL is high, serves the function of monitoring A and B digits of DBUS and generates OPDEC lines corresponding to the operation to be performed, according to Table 23, which is shown below.

TABLE 23

| OP Decode | | |
|---|---|---|
| OPDEC Lines | Operation | DBUS AB digits |
| 0 | Test wait ready | 21 |
| 1 | Test wait not ready | 22 |
| 2 | Test | 20 |
| 3 | Test ID | 2C |
| 4 | Test skip | 24 |
| 5 | Echo | 10 |
| 6 | Load train image buffer | 48 |
| 7 | Invalid operation | XX* |
| 8 | Write | 40 |
| 9 | Write halt | 41 |
| A | Write line | 44 |
| B | Write line halt | 45 |
| C | Move write line | 46 |
| D | Move write line halt | 47 |
| E | Not used | |
| F | Not used | |

* = Undefined.

Any invalid (undefined) bit code in A and B digits produces an output of HEX 7 on the OPDECn lines. No bit code in the A and B digits will produce an output of HEX E or F on the OPDECn lines (when OPDECSEL is high, the PROM 50 is not programmed to output this bit pattern). These OPDECn lines are sent to the CFE 10c via the foreplane to be used as inputs to the address multiplexor 12. This enables the micro-code program to perform a 16-way branch on the OP code. FIG. 5A shows the four OPDECODE lines from 83d which feed over to address multiplexor 12.

STOP BIT GENERATION: As seen in FIG. 5K there is shown a PROM which provides the "stop bit" generation. This PROM 50s produces a "high" out of line output D4 which is named INTERFLG (which means STOP bit in the micro-code). This is done for any one of the following conditions:
1. a delimiter was detected.
2. the BC register reached the maximum count (BC=FF).
3. a vertical parity error occurred.
4. a "terminate" was received from the main host system.

The micro-code may use the "stop bit" (INTERFLG) in order to generate the term AO by bringing up the proper micro-code #BRANCH lines.

CONTROL LOGIC: Referring to FIG. 5A and control logic 222, a 3-8 decoder is enabled during 8CLK1 time. The micro-code output signals CONTRAD1, -2 and -3, are used to make the decoder produce a low output: from RSETPCSL (reset PCSL); from LDREGCAD (load register column address or load AD register); from WECOLDN (write enable to invalid RAM); from RSETTIB/ (reset train image buffer load/); from SETCSLF (set CSLF); or none at all. Another 3-8 decoder is constantly enabled, thus producing a low output depending on the binary weight of its output signals CONTRAD 4, -5 and -6, which are micro-code signals. The outputs that may be driven "low" are: MPXSELAD (high=select adder output as the input to the Accumulator); the DIRAMCOL (data input to column done RAM); to DIRAMINV (data input to invalid RAM); to LATPRDAT (latch print data into compare register); the load input to the 4-bit binary counter in the compare logic; or no outputs at all.

Another 4-bit binary counter in logic block 222 is used as a 4-bit latch; it has inputs #CONST 4 through 7 (micro-code outputs) which are latched by LOADCONT (load control register—which is a micro-code output) being low at the leading edge of the clock 8 CLK/1. Its outputs are OPDECSEL (OP decode select), DC1LCTR (DC1L, control register output), DC2LCTR (DC2L, control register output) and DT1LCTRL (DT1L control register output).

The 4-bit counter in the compare logic is used as a 4-bit latch. It has inputs #CONST 0 through 3 (micro-code outputs) which are latched by the Y7/ output of the secone 3-8 decoder during the leading edge of clock 8 CLK/1. The 4-bit counter has outputs at 220 which are RAMAD 8 (RAM buffer address line 8) and MOSTCTR (the motor start signal for the printer).

AO ADDRESS GENERATION: The micro-code within the CFE 10c does bit tests on desired conditions by gating these conditions onto the AO line which is seen in FIGS. 4A and 5A. This line AO is the least significant bit of the micro-code PROM address. The desired test condition (bit) is selected by the #BRANCH lines and the #I4 from the micro-code. The #BRANCH 4, 5, and BR6 (#I4) lines develop the SELn/ lines. The following Table 24 indicates all of the test conditions on the PDB 80 which are used for AO line generation and the terms needed to select them.

TABLE 24

| AO Selection (PDB Only) | | | | | |
|---|---|---|---|---|---|
| SEL5/ | SEL4/ | SEL3/ | SEL2/ | #BRANCH3 # | Term Gated |

TABLE 24-continued

| AO Selection (PDB Only) | | | | | | | |
|---|---|---|---|---|---|---|---|
| SEL5/ | SEL4/ | SEL3/ | SEL2/ | #BRANCH3 | #BRANCH2 | #BRANCH1 | Term Gated Onto A0 |
| 1 | 1 | 0 | 1 | 0 | 1 | 0 | PR1FLAG |
| 1 | 1 | 0 | 1 | 0 | 1 | 1 | PR2LFLAG |
| 1 | 1 | 0 | 1 | 1 | 0 | 0 | PRSLFLAG |
| 1 | 1 | 0 | 1 | 1 | 0 | 1 | (spare) |
| 1 | 1 | 0 | 1 | 1 | 1 | 0 | 120COLIP |
| 1 | 1 | 0 | 1 | 1 | 1 | 1 | 132COLIP |
| 1 | 0 | 1 | 1 | 0 | 0 | 0 | 1100LPMJ |
| 1 | 0 | 1 | 1 | 0 | 0 | 1 | MAXCOUNT |
| 1 | 0 | 1 | 1 | 0 | 1 | 0 | INTERFLG |
| 1 | 0 | 1 | 1 | 0 | 1 | 1 | SYNCFLAG |
| 1 | 0 | 1 | 1 | 1 | 0 | 0 | PCSLT |
| 1 | 0 | 1 | 1 | 1 | 0 | 1 | (not used) |
| 1 | 0 | 1 | 1 | 1 | 1 | 0 | (not used) |
| 1 | 0 | 1 | 1 | 1 | 1 | 1 | (not used) |
| 0 | 1 | 1 | 1 | 0 | 0 | 0 | RAMAD0 |
| 0 | 1 | 1 | 1 | 0 | 0 | 1 | RAMAD1 |
| 0 | 1 | 1 | 1 | 0 | 1 | 0 | RAMAD2 |
| 0 | 1 | 1 | 1 | 0 | 1 | 1 | RAMAD3 |
| 0 | 1 | 1 | 1 | 1 | 0 | 0 | RAMAD4 |
| 0 | 1 | 1 | 1 | 1 | 0 | 1 | RAMAD5 |
| 0 | 1 | 1 | 1 | 1 | 1 | 0 | RAMAD6 |
| 0 | 1 | 1 | 1 | 1 | 1 | 1 | RAMAD7 |

1 = high.
0 = low.

OPERATING MICROCODE- General Description: Referring to FIGS. 5A, 5E and 5F, the TP-DLP is controlled by the micro-code contained in the PROM 13 on the CFE card. Micro-code simply means object code or program code. The PROM outputs from the PROM micro-code registers 14 on the CFE card change to produce the new micro-code word on the leading edge of PROMCLK/.

Referring to Table 25, the TP-DLP is normally in idle status (status=3). In this state it can accept an I/O descriptor from the host system. The TP-DLP receives an I/O descriptor while at status=3, goes to status=11, and receives the I/O descriptor LPW. The TP-DLP then goes to status=6 to receive the two descriptor links and their LPW. The DLP then goes to status=1 and performs a 16-way branch dependent upon the OP code which it receives as part of the I/O descriptor at status=3 time.

On the loading of the train image buffer as seen in FIG. 5F, description of the train image buffer load operation, by status count is shown in Table 25 herein:

TABLE 25

Status = 03
1. Idle.
2. If AF/ is low, then set status = 11.
3. Go to step 1.
Status = 11
1. Write I/O descriptor at lower RAM buffer address 0.
2. Set status = 06.
Status = 06
1. Write descriptor LPW at lower RAM buffer address 1.
2. Write descriptor link #1 at lower RAM buffer address 2.
3. Write descriptor link #2 at lower RAM buffer address 3.
4. Write descriptor link LPW at lower RAM buffer address 4.
5. Set status = 01.
Status = 01
1. Read lower RAM buffer address 0 (location of I/O descriptor).
2. Perform a 16-way branch using the OPDECn lines.

TABLE 25-continued

3. Set status = 05.
Status = 05
1. Send descriptor links back to the host system (descriptor link #1, descriptor link #2, and descriptor link LPW, located in lower RAM buffer address 2, 3, and 4 respectively).
2. Set status = 08.
Status = 08
1. Store HEX 6F (decimal value of 111) in accumulator 11 (address of blank and invalid character storage).
2. Receive the first word from the host system, (the A and B digits contain the code for a blank character while the C and D digits contain the code for an invalid character) and write it in upper RAM buffer, as addressed by accumulator 11.
3. If a stop condition exists, set status = 14.
4. Increment accumulator 11.
5. Receive the next word from the host system and write in into upper RAM buffer, as addressed by accumulator 11.
6. Go to step #3.
Status = 14
1. Receive a dummy word from the host system.
2. Set status = 12.
Status = 12
1. Receive the LPW from the host system.
2. Set status = 01.
Status = 01
1. Flush invalid RAM with invalids (write ones in all addresses of the invalid RAM).
2. Store HEX 6F (decimal value of 111) in accumulator 11 (address of blank and invalid character storage).
3. Move accumulator 11 to register BC (RAM buffer address).
4. Latch top character of RAM buffer output into the compare register.
5. Write 0 in invalid RAM. The address of the invalid RAM is the character that is latched into the compare register. This operation marks this character as a valid character code.
6. Latch the bottom character of the RAM buffer output into the compare register.
7. Same as step #5.
8. Increment accumulator 11.
9. Move accumulator 11 to register BC (RAM buffer address).
10. If register BC = HEX FF (MAXCOUNT = 1). then reconnect to the host system and set stat-

TABLE 25-continued

```
        us = 05.
   11.  Go to step #4.
Status = 05
   1.   Send descriptor links back to the host system
        (descriptor link #1, descriptor link #2, and de-
        scriptor link LPW, located at lower RAM buf-
        fer address 2, 3, and 4 respectively).
   2.   Set status = 07.
Status = 07
   1.   Move accumulator 6 to AD register (A and D
        digits of the result descriptor).
   2.   Move accumulator 7 to BC register (B and C
        digits of the result descriptor).
   3.   Send this result descriptor to the host system.
   4.   Set status = 15.
Status = 15
   1.   Send result descriptor LPW to the host system.
   2.   Set status = 03. This step restarts at the begin-
        ning (idle).
```

TP-DLP STATUS DEFINITIONS: DLP status information is the means by which the TP-DLP communicates it's conditions and requirements to the host system 10. Status states are transmitted by the TP-DLP when it is connected to the host system. The use of status states is designed to allow the message transfers between the TP-DLP and the host system to be conducted in an orderly manner.

The following Table 26 defines each individual status state operation used specifically in the Train Printer-Data Link Processor:

TABLE 26

Status States - TP-DLP

Status = 0
Cleared. The DLP is in the cleared state. This status is asynchronously entered when the DLP is master cleared, local cleared, or selective cleared.
Status = 1
Disconnect. The DLP is busy and cannot accept a new I/O descriptor.
Status = 3
Idle. The DLP can accept an I/O descriptor at this time.
Status = 4
Read data. This is the read buffer portion of an echo operation.
Status = 5
Send descriptor link. The DLP is sending the descriptor links and their longitudinal parity word (LPW) to the host system.
Status = 6
Receive descriptor links. The DLP is receiving, or is ready to receive, the descriptor links and their LPW.
Status = 7
Result descriptor. The DLP sends the result descriptor to the host system with the next DLP strobe
Status = 8
Write data. The DLP can accept train image or print image buffer data from the host system.
Status = 9
Encoded status (back-up). Indicates to the host system that DLP address back-up information is present on the data lines.
Status = 11
Receive descriptor LPW. This status informs the host system that the DLP expects to receive the I/O descriptor LPW.
Status = 12
Break. The DLP requires no more data because it has reached an end condition. The host system sends the data LPW with the next strobe.
Status = 14
Character transfer. Used by the DLP to handle single character transfers from the host system or to receive the last character or word from the host

TABLE 26-continued

Status States - TP-DLP system. This status acts like a request to the host system in that it requests the host system to notify it of whether or not the last word sent to it from the host system was a single character (8-bits) or a full word. The host system responds with the next STIOL and a terminate, if the word sent was a single character, and responds with an STIOL and no terminate, if the last word was a full word.
Status = 15
Result descriptor LPW. The DLP is sending the result descriptor. The LPW will follow with the next DLP strobe.

PCTP GENERATION: This refers to the printer column timing pulse generator which generates the printer column timing pulse PCTP in FIG. 5D. The PCTP generator is made of a binary counter, a SJK flip-flop, 2 NOR gates and a tri-state inverter. In FIG. 5A, the PCTP generator is shown as the element 232. The binary counter is the heart of this timing network and the printer column timing pulse jumpers are installed in accordance with the speed rating of the printer. Maximum PCTP frequency is achieved when no jumpers are installed; then a slower PCTP frequency is produced as jumpers are installed. The binary counter increments on the leading edge of the clock (8CLK/). As the counter reaches the count of 16, a "carry output" is generated (125 nanoseconds positive pulse). This pulse is supplied to the J and K inputs to the flip-flop and causes it to toggle with the next trailing edge of the clock (8CLK). The carry output is also inverted by a NOR gate and fed to the LD/ (load/) input of the binary counter which causes the binary counter to be loaded with the value of the PCTP jumpers. The cycle is then repeated.

For 1100 lines-per-minute (LPM) operation, all the PCTP jumpers are installed, thus forcing the binary counter to count through all 16 steps before emitting a carry output. The signal (FIG. 5D) PCTP/ from the tri-state inverter is a 250-kilohertz square wave (2 micro-second pulse width). The signal PCTPFLAG is a 125 nanosecond positive pulse occurring at 4 microsecond intervals which flags the micro-code at the end of each PCTP pulse.

PERIPHERAL INTERFACE: The printer interface-control 220 is seen in FIG. 5A. The TP-DLP receives 9 signals from the printer 50$_p$ and feeds them into tri-state inverters. These asynchronous signals are converted to synchronous signals and then used as inputs for AO branching as seen in Table 24. The signal PRSL/, from the printer 50$_p$, is not fed through a chip because it is a level rather than a pulse and needs no synchronization.

The Train Printer-Data Link Processor sends out 8 signals to the printer 50$_p$. All these interface signals are driven by tri-state inverters, and all the tri-state interface drivers and receivers are (except the DTnL/ lines) enable when GPRIF (gate maintenance peripheral line signal) is "low". The interface signals between the printer interface 220 and the printer 50$_p$ are shown below in Table 27.

TABLE 27

Printer Interface to DLP

From Printer

Foreplane

TABLE 27-continued

Printer Interface to DLP

| Signal | Pin |
|---|---|
| PCSL/ | S87 |
| CSL/ | S86 |
| PFCL/ | S88 |
| PAML/ | S89 |
| EDPL/ | S90 |
| CIDL/ | S95 |
| PR1L/ | S85 |
| PR2L/ | S96 |
| PRSL/ | S91 |

To Printer

| Foreplane Signal | Pin |
|---|---|
| DC1L/ | S78 |
| DC2L/ | S79 |
| MOST/ | S84 |
| PCTP/ | S77 |
| DT8L/ | S83 |
| DT4L/ | S82 |
| DT2L/ | S81 |
| DT1L/ | S80 |

PRINT AND FORMAT CONTROL: The Train Printer-Data Link Processor commands the printer $50_p$ either to remain idle, to print data, or to advance paper by way of the DC1L and the DC2L signal lines which carry signals shown in FIG. 5D. Printer $50_p$ decodes and responds to the signals as shown in Table 28.

TABLE 28

| | Data Control Level Signals | | |
|---|---|---|---|
| Binary | DC2L | DC1L | Printer Response |
| 0 | 0 | 0 | No action |
| 1 | 0 | 1 | Print |
| 2 | 1 | 0 | Format |
| 3 | 1 | 1 | Invalid |

When DCnL=2, the DTnL lines, from interface 220, contain format information for the printer. However, while DCnL=1, then only DT1L of the DTnL lines is used and it is "high" for a data match.

The 3-8 line decoder in interface 220, FIG. 5A, is disabled only if a PROM parity error occurs. This 3-8 line decoder produces a low active signal at the output corresponding to the binary weight of the three input lines. The signal GPRIF originates on the maintenance card $20_{om}$ and is "high" to effectively disconnect the PDB peripheral cable lines and replace them with peripheral simulation lines.

The mentioned 3-8 decoder, in interface 220, operates in two modes, when is to say—"maintenance" and "normal" depending upon the signal state of GPRIF/, the third input to the 3-8 decoder chip. The normal mode of operation is with GPRIF/ high thus enabling ENDTX1/ (enable DT1L), ENFOR/ (enable format/) or neither. The signal ENDTX1/, when low, enables a tri-state inverter which supplies the format information to the printer $50_p$ from a 4-bit binary counter in interface 220. GPRIF, when low, also supplies the DCnL/ signals to the printer $50_p$.

PERIPHERAL LINES FOR MAINTENANCE: The lines designated PRIFnn/O are used by the maintenance card $20_{om}$ to verify and check the operation of the peripheral dependent board (PDB) of the Train Printer-Data Link Processor. These PRIFnn/O lines are enabled by tri-state chips located in the TP-DLP. These peripheral maintenance lines are enabled when the signal GPRIF/ is "low". The signal GPRIF originates at the maintenance card MC $20_{om}$. These lines permit simulation of the Train Printer by means of the maintenance card $20_{om}$. The following Table 29 shows a listing of these simulated peripheral lines, PRIFnn/O, and also shows the corresponding inputs and outputs to the aforementioned tri-state chips.

TABLE 29

| Maintenance Card Lines to/from PDB | | |
|---|---|---|
| PRIF Lines | Outputs | Inputs |
| PRIF01/0 | MPCTP/ | |
| PRIF02/0 | MDC1L/ | |
| PRIF03/0 | MDC2L/ | |
| PRIF04/0 | MT8L/ | |
| PRIF05/0 | MT4L/ | |
| PRIF06/0 | MT2L/ | |
| PRIF07/0 | MT1L/ | |
| PRIF08/0 | | MPRSL/ |
| PRIF09/0 | | MPCSL/ |
| PRIF10/0 | | MCSL/ |
| PRIF11/0 | | MPFCL/ |
| PRIF12/0 | | MPAML/ |
| PRIF13/0 | | MEDPL/ |
| PRIF14/0 | | MC1DL/ |
| PRIF15/0 | | MPR1L/ |
| PRIF16/0 | | MPR2L/ |
| PRIF17/0 | MOST/ | |

MAINTENANCE DISPLAY LINES: The Train Printer-Data Link Processor contains three 8-1 multiplexor chips that are used to enable the PDB 80 at its maintenance display lines (DPLY11/0-DPLY13/0, as can be referred to in Table 21). These lines are used by the maintenance card $20_{om}$ to verify and check the operation of the peripheral dependent board (PDB) of the Train Printer-Data Link Processor. The DSELn/ lines are used to select the internal signals that are enabled onto the backplane maintenance bus. The DSELn/ lines are sent to the PDB 80 from the Common Front End, CFE $10_c$ and are enabled when the data link processor is "maintenance card" addressed.

DATA LINK PROCESSOR INTERFACE TO TRAIN PRINTER: Referring to FIG. 5A there is shown the printer interface control 220 having connections to the Train Printer $50_p$; also referring to FIG. 5D which shows a timing diagram for the interface control signals to the Train Printer, the following discussion will describe this interface with respect to a typical Train Printer such as the 1100 line per minute Train Printer.

The printer column timing pulse (PCTP) is a 2.0 micro-second pulse operating at a frequency of 250 kilohertz. It is during the "information transfer cycle", that the PCTP is used to gate bit information into column storage and also to advance the printer column counter. The printer column timing pulse signals are always transmitted when power is "on" in the printer. All of the interface signals start with the trailing edge of the PCTP, except the signals MOST (motor start) and the signal EDPL (end of page level).

There are two data control level signals designated as DC1L and DC2L (Table 28). The data control levels when "true" indicate that either print information or format control information is present on the data transfer lines (DTXL). The control levels will change state only on the trailing edge of the PCTP. A "print cycle" starts with the receipt of DC1L and DC2L being equal to binary 1 and terminates only upon the receipt of signals DC1L and DC2L being=to binary 2. The paper motion cycle starts with the receipt of signals DC1L and DC2L being=to binary 2 and terminates on the trailing edge of the signal PAML (paper motion level) going "false" at the same time that PCSL (printer column strobe level) is "false".

The binary 1 state will go "true" at the trailing edge of the first PCTP after PCSL if there is bit information to be transferred into the printer column storage. Data is transferred into column storage, and the column counter is advanced at the rate of PCTP. Print columns are counted starting with column 1. A space suppress code (format=0) must be transmitted if a particular column is to be printed again on the same line. A binary 1 state must be followed by a binary 2 state if the printer is to be made "not ready".

The binary 2 state may be transmitted any time the PAML level is "false", and must be present a minimum of 1 PCTP period. Response to the binary 2 state will not occur until PCSL goes "false". The binary 2 state will be transmitted at least once for each line printed.

DATA TRANSFER LINES: The data transfer lines are designated DT1L, DT2L, DT4L, DT8L. When the control levels DC1L and DC2L are=to binary 1, the data transfer line DT1L is used to transfer print information into the printer column storage. Data is always transferred from the data transfer lines to the printer at the trailing edge of the printer column timing pulse.

When the control levels DC1L and DC2L are=to binary 2, the data transfer lines (DT1L, DT2L, DT4L, DT8L) are used to transfer format information to the printer.

The data transfer lines are shown on the following Table.

TABLE 30

| | Data Transfer Lines to Printer |
|---|---|
| DT1L, DT2L DT4L, DT8L | DATA TRANSFER LINES |
| DURING TRANSFER OF FORMAT INFORMATION, THE BINARY SUM, DTXL, OF THE DATA TRANSFER LINES RESULT IN THE FOLLOWING: | |
| DTXL = 0 | NO ADVANCE (SPACE SUPPRESS). |
| DTXL = 1 | ADVANCE TO HEADING POSITION. |
| DTXL = 2-11 | ADVANCE TO DESIGNATED FIELD POSITION. |
| DTXL = 12 | ADVANCE TO END OF PAGE POSITION. |
| DTXL = 13 | INVALID CODE. CAUSES A ONE SECOND PAPER SLEW AND A PAPER SLEW INDICATION ON THE FUNCTION INDICATOR PANEL. |
| DTXL = 14 | ADVANCE SINGLE SPACE |
| DTXL = 15 | ADVANCE DOUBLE SPACE |

The motor start level (MOST) when "true", is used to start the train drive motor from a remote location whenever PR1L is "true" which indicates that the printer is in a "ready" state, and when PR2L is "false" indicating the train drive motor is off.

The data transfer lines involve the signals to the Train Printer from an external device such as the data link processor. This is also true of the motor start level signal MOST.

There are signals which the printer provides to the data link processor which are called the "printer ready levels" and which are designated PR1L and PR2L.

The printer ready level PR1L when "true" indicates that: the power is on; the paper is loaded; there is no slew alarm; the train is installed and locked in the print position; the ready switch is depressed.

The depression of the single print switch will override the paper-out switch and allow PR1L to go "true".

When the signal PR2L is also "true", the train drive motor is "on".

After the signal PR2L goes "true", with also PR1L being true, the first signal DC1L or DC2L which is received from the interface control 220 initiates a print or paper motion cycle.

If the ready switch is depressed when the printer is in a print operation, the PR1L and the PR2L levels will be inhibited from changing state until a minimum of one PCTP clock period after the following PAML (paper motion level signal) has been initiated. The indicated paper motion operation is completed even though the printer is not ready. The printer cannot be made "not ready" if the last command was a print command (DC1L and DC2L being=to binary 1). The ready levels will change state only on the trailing edge of the PCTP and when the PCSL (printer column strobe level) is "false".

TABLE 31

| (Printer Ready Level Signals to DLP) | | |
|---|---|---|
| PR2L | PR1L | |
| 0 | 0 | Not Ready (Binary 0) |
| 0 | 1 | Ready & Train Motor Off (Binary 1) |
| 1 | 0 | Invalid Code (Binary 2) |
| 1 | 1 | Ready & Train Motor On (Binary 3) |

Referring again to the timing diagram of FIG. 5D, the "scan cycle" within the printer is monitored by the printer column strobe level or PCSL. The signal PCSL, when "true", in conjunction with PR1L and PR2L being "true", indicates the printer is prepared to accept information into column storage. The PCSL signal changes state only on the trailing edge of the PCTT (printer column timing pulse).

As seen in FIG. 5D, one "scan set" consists of four PCSL pulses. In the case of 1100 LPM printer, the minimum pulse length for the PCSL is 144 microseconds. Data for columns 1, 5, 9 and 13 is transferred during the first PCSL of a scan set. Then data for columns 2, 6, 10 and 14 is transferred during the second PCSL of the scan set. Then data for columns 3, 7, 11 and 15 is transferred during the third PCSL of a scan set. Then data for columns 4, 8, 12 and 16 is transferred during the fourth PCSL of a scan set. A minimum of four PCSL's (or one "scan set") are required to transfer a full line of print. The second graphic on each train is the graphic in print position 1 during the first PCSL of a scan set following the chain sync level (CSL), also called the train sync level.

The train sync level is designated CSL (chain sync level) and is a signal which occurs once per train revolution. It defines the beginning of the train set. The signal CSL changes state only on the trailing edge of PCTP. The CSL is "true" for 6 PCTP's and it goes "true" one pulse before the end of the fourth PCSL of a scan set.

TRAIN IDENTIFICATION LEVEL: The train identification level designated CIDL is a six bit code transmitted serially (most significant bit coming first) and each bit is six pulses (PCTP's) wide. Each identification bit originates one pulse before the end of every sixth PCSL following a chain sync level (CSL) sync signal. The identification bits change state only on the trailing edge of PCTP. This identification will only appear once per train revolution.

PRINTER FINAL COLUMN LEVEL: This signal is designated PFCL and this level goes "true" at the trailing edge of the PCTP prior to the information transfer for the last character of the sub-scan. The printer will accept one additional informational bit after PFCL goes "true". The signal PFCL changes state on the trailing edge of the PCTP. At the end of each sub-scan, the printer final column level PFCL goes "false" when the signal PCSL goes "false".

PAPER MOTION LEVEL: This signal, designated PAML goes "true" in response to format information on the data transfer lines DTXL, and when data control levels DC1L and DC2L=binary 2. The paper motion signal PAML remains "true" until the defined paper advance is complete. PAML changes state only on trailing edge of the pulse (PCTP) when PCSL is false.

If the signals DC1L and DC2L are=to binary 2 during a sub-scan (PCSL) then the signal PAML will not change state until PCSL goes false. If the printer receives a space suppress code (format=0), the printer will issue a PAML level with a time duration that will approximate a single line advance, unless PR1L and PR2L are to change state, in which case the printer will issue a PAML level with a minimum time duration of one PCTP clock period on the interface before the printer changes to a "not ready" state, as in Table 31.

Whenever the PAML line is "true", the control device 220 must wait until the printer has completed the operation which caused PAML to become true before issuing any following command to the printer. The signal PAML becoming false indicates the operation has been completed.

END OF PAGE LEVEL: This signal is designated EDPL and this level, when "true", indicates that the "end of page" was sensed during a paper advance in a single or double space mode (DTXL=binary 14 or binary 15). The signal EDPL is reset when paper motion information is transmitted for the next line (except when DTXL=0). The EDPL signal is not synchronized with the printer column timing pulses PCTP.

PRINT CYCLE: The printing of characters is controlled by scanning the message to be printed and comparing it with the TIB train image buffer. The character position in the print buffer corresponds to the hammer position in the train printer. The address of the train image buffer (TIB) corresponds to the character positioned over the hammer. If the 8-bit entry in the train image buffer (TIB) is "equal" to the 8-bit code in the print buffer, a "set" level signal is sent to the printer and that particular hammer is fired on the next print cycle of the printer.

A pointer (accumulator 212 and register 230) into the train image buffer (TIB) is kept synchronized with the movement of the train characters. During print scans, the print message is scanned and the address of the train image buffer is changed in order to correspond with the character-hammer positions. This continues until all the characters in the print buffer have been printed.

In FIG. 5D, there was described the accumulator 212 working in conjunction with register 230 and the column done logic 214. The accumulators 212 together with registers 230, are the elements which act as the pointers heretofore mentioned in FIGS. 5A and 5D. Table 18 indicates the usage at the accumulators 212.

COMPARE LOGIC CIRCUITRY FOR THE DATA LINK PROCESSOR:

With reference to FIG. 5A, the compare logic circuitry combines the use of compare logic 226 (as receipt for signals from source A and B) with latch circuit 215 and multiplexor $83_m$. FIG. 5L shows, in schematic form, the compare logic circuit relationships.

The compare logic consists of two 4-bit comparator chips F1 and G1. These chips are configured in a tandem mode to provide comparison between two 8-bit sources designated source A and source B.

Source A is the compare logic for the 8-bit compare latch (215) comprised of two 4-bit counter chips D1 and E1. Source B is the 8-bit output of the two quad 2-1 multiplexor ($83_m$) chips $D_o$ and $E_o$.

The 16-bit input to the multiplexor chips $D_o$ and $E_o$ comes from the RAM buffer output from RAM 22. These 16 bits are divided into "top" and "bottom" 8-bit portions. The SL inputs to the multiplexor chips ($D_o$ and $E_o$) ($83_m$) are tied together and are used to control whether the "top" or the "bottom" 8-bit portion is selected. The SL inputs are tied to SELTHBH (high signal="bottom half") which is a micro-code signal.

The chips for the compare latch register $D_1$ and $E_1$ have LD/ (load)/) inputs which are tied to the low active term LATPRDAT (load the compare register with printed data). The term LATPRDAT is micro-code generated. Data from the multiplexor chips ($D_o$, $E_o$) is loaded onto the compare register ($D_1$, $E_1$) on the leading edge of 8 CLK/3 when the term LATPRDAT is "low".

Data from the compare register ($D_1$, $E_1$) also forms a data path to format control.

The output of the compare logic ($F_1$, $G_1$) is the term TIB=PIB, which signal is fed to the 8-1 multiplexor chip $P_4$.

The micro-code may use the term TIB=PIB in order to generate the term AO by bringing up the micro-code outputs #BRANCH5 and #BRANCH2. The term #BRANCH5 will effectively drive the line SEL 2/ "low" which will enable the 8-1 multiplexor chip $P_4$ causing the signal AO to reflect the state of TIB=PIB. The signal AO is shown on FIG. 5A as address line generation $221_p$ which connects to PROM 13 and stack register 11.

LINE TURN AROUND LOGIC CIRCUIT: In regard to the line turn logic shown in FIG. 5M, this circuitry controls the direction of data flow between the distribution card $20_{od}$ (via the backplane) and the Train Printer-Data Link Processor, as seen in FIG. 5A.

(a) In one direction flow, the Drivers 228 take data from the DBUS and supply it to the distribution control card $20_{od}$ through the backplane connections $20_{OB}$.

(b) In the other direction with the line turned around by line turn logic, the Receivers 110 receive data from the distribution card and feed it on the DBUS where it transmits: to the vertical parity check generator 217; to the longitudinal parity word generator 218; to the OP decoder $83_d$ and to the INRAM bus which goes on line 100 to RAM 22.

In the direction (a);—the data multiplexor 224 provides data to the DBUSnn which feeds Drivers 228 so as to convey data to the distribution control card $20_{od}$ via the backplane $20_{OB}$.

However, in direction (b), the multiplexor 224 can "shut off" so that the distribution control card transmits data to the Receivers 110 which provides data to the DBUS of the Train Printer-Data Link Processor where the data is conveyed to elements 217, 218, $83_d$ and 22 of FIG. 5A.

Figure 5M:
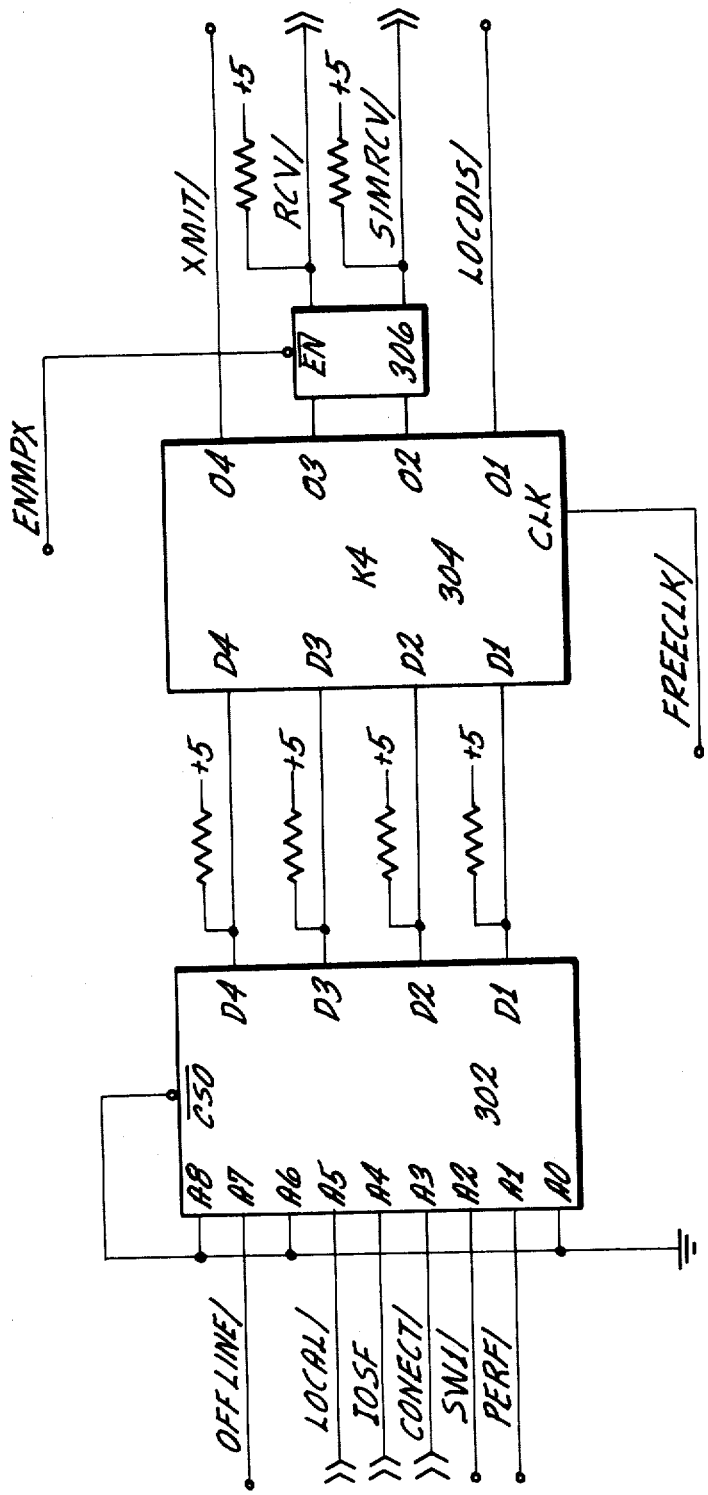
FIG. 5M is a diagram of the line-turn logic circuitry.

Thus, the line turn logic shown in FIG. 5M controls the flow of data:

(a) from the distribution (DC) 20$_{od}$ Card to the Data Link Processor:

(b) from the Train Printer-Data Link Processor (via the multiplexor 224) to the Drivers 228 and thence to the distribution control card 20$_{od}$.

Referring to FIG. 5M, the line turn logic constitutes a PROM 302 having six input signals described below:

(1) OFFLINE/: this signal, when low, signifies that the DLP is in "local" mode for maintenance and check out purposes.

(2) LOCAL/: this signal, when low, indicates the maintenance card has access to the Train Printer-DLP.

(3) IOSF: this is a signal from the I/O send flip-flop to the PDB 80.

(4) CONECT/: this signal, when "low", indicates a DLP is connected to the main host system via the distribution card 20$_{od}$.

(5) SW1/: switch signal from maintenance card.

(6) PERF/: this signal is from the Parity Error flip-flop on the CFE card 10$_c$ and used to kill the signal to the Train Printer.

The four outputs of PROM 302 are fed to a hex-register 304. Two of its outputs are fed to a tri-state buffer 306 which has outputs as follows:

(a) RCV/: this "receive" signal, when "low" turns "on" the Receivers 110 (DATAnn lines) to receive data from distribution card 20$_{od}$.

(b) SIMRCV/: this signal, generated by the line turn logic in PDB 80, is used during maintenance testing to simulate the DATAn lines to Receivers 110.

The hex-register 304 has two outputs (c) and (d) defined as follows:

(c) XMIT/: this "transmit" signal, when "low" enables Drivers 228 in order to send data to the distribution card 20$_{od}$.

(d) LOCDIS/: this is the "local display" signal which activates the data simulate (DXIMxn) lines to the maintenance card.

Thus, the four outputs (a), (b), (c) and (d) will depend on the input states as follows:

| | |
|---|---|
| 1. | XMIT/is low when all of the following conditions are met: |
| | a. CONECT/ is low. |
| | b. SW1/ is high. |
| | c. IOSF is high. |
| | d. PERF/ is high. |
| | e. OFFLINE/ is high. |
| 2. | RCV/ is low when all of the following conditions are met: |
| | a. CONECT/ is low. |
| | b. SW1/ is high. |
| | c. IOSF is low. |
| | d. PERF/ is high. |
| | e. OFFLINE/ is high. |
| 3. | LOCDIS/ is low when one of the following conditions is met: |
| | a. All of the following conditions are met: |
| | (1) SW1/ is high. |
| | (2) IOSF is high. |
| | (3) OFFLINE/ is low. |
| | (4) LOCAL/ is low. |
| | b. All of the following conditions are met: |
| | (1) SW1/ is high. |
| | (2) OFFLINE/ is high. |
| | (3) LOCAL/ is low. |
| 4. | SIMRCV/ is low when one of the following conditions is met: |
| | a. All of the following conditions are met: |
| | (1) SW1/ is high. |
| | (2) IOSF is low. |

-continued

| |
|---|
| (3) OFFLINE/ is low. |
| (4) LOCAL/ is low. |
| b. SW1/ is low. |

It will be understood that the preferred embodiments described herein are only exemplary and that they are susceptible of many modifications and variations in construction, arrangement and use, without departing from the spirit of the invention as defined by the appended claims.

What is claimed is:

1. In a high speed data printer system wherein a host computer provides I/O descriptor command words and data link task-identifier words to a peripheral-controller which operates a train-printer mechanism, and said peripheral-controller provides result/descriptor words to inform said host computer as to the completion/incompletion of each commanded task, a buffer memory circuit system in said peripheral-controller comprising:

(A) a RAM buffer memory which includes:

(a1) a first dedicated memory area (print image buffer) having a plurality of addressable locations which are numerically equal to the number of columns printable by said train printer mechanism, each of said locations storing character data to be printed and which had been received from said main host computer;

(a2) a second dedicated memory area (train image buffer) having a plurality of addressable locations for storing coded data representing each of a plurality of graphic characters that match the characters on the train of said train-printer mechanism;

(B) pointer address means for pointing to addresses in said second memory area (train image buffer) in synchronism with the movement of characters in said train wherein each address pointed-to represents a character positioned over a print hammer;

(C) means to scan the character data in said first memory area (print image buffer) wherein each of said character data corresponds to a specific hammer position in said print mechanism;

(D) comparison means for comparing the addressed code in said second memory area (train image buffer) with said addressed code in said first memory area (print image buffer) wherein a match in coding will initiate the firing of a print hammer during a print cycle.

2. The buffer memory circuit system of claim 1, wherein said pointer address means includes:

(b1) accumulator means for providing addresses which change in synchronization with the movement and position of train characters;

(b2) general purpose register means for receiving information from said accumulator means and segregating said information into four characters symbolized as A, B, C, D;

(b3) first register means to store the BC character signal data;

(b4) second register means to store the character signal data AD;

and wherein the said BC character signal address data and the said AD character signal address data are compared in said comparison means for occurrence of a match at which time a selected print hammer will be set for firing on the next print cycle.

3. The memory circuit system of claim 2 wherein said first register character address signal data BC drives the address lines for said RAM buffer memory, and wherein said second register character address signal data AD provides addresses to a Column Done RAM, and wherein said circuit system further includes:
- a Column Done RAM which provides output signals to said peripheral-controller to indicate that a print-out or a blank action has been completed for each column addressed.

4. The buffer memory circuit system of claim 1, wherein:
- (a) said first dedicated memory area (print image buffer) occupies N addressable locations and each addressable location stores two characters, one in the two-half (TH) and one in the bottom-half (BH) of that location;
- (b) said second dedicated memory area (train image buffer) occupies L addressable locations and each addressable location stores two characters, one in the top-half (TH) and one in the bottom-half (BH) of that location;
- (c) means to select either the top-half or the bottom-half of data at each addressed location of said first or said second memory area.

5. The buffer memory circuit system of claim 4, where said means to select includes:
- (a) multiplexor means for receiving a word of four characters ABCD from said RAM buffer memory and for selecting the top-half characters AB or the bottom-half characters CD for transmission to said comparision means;
- (b) wherein said multiplexor means receives instructions from said peripheral-controller for selecting either said top-half AB or said bottom-half CD character.

6. The memory circuit system of claim 4, wherein the data in each top-half and each bottom-half of said N addressable locations in said first memory area can be compared to the data in each top-half and each bottom-half of said L addressable locations in said second memory area.

7. The buffer memory circuit system of claim 1, wherein said RAM buffer memory further includes:
- (a) addressable locations, not coincident with said first and second dedicated areas, for temporarily storing:
  - (i) result-descriptor words for signalling the result of each task;
  - (ii) descriptor-link words for identifying each task undertaken, and
  - (iii) code to identify the train-module being used.

8. The buffer memory of claim 7, wherein said addressable locations includes:
- (a) an addressable storage location for holding line-format data which can be used to control the print format in a connected train-printer mechanism.

9. The buffer memory of claim 7, wherein said addressable locations includes:
- (a) an addressable storage location for storage of data from said main host system to represent a blank code which code, when loaded into said second dedicated area, will prevent printing of the graphic character associated with that position on the print train.

10. The system of claim 7, wherein said peripheral-control includes:
- (a) means to receive, from said host computer, a delimiter character into said first memory area (print image buffer) for storage;
- (b) means to detect said delimiter character, and when detected, to terminate data transfers from said host computer to said RAM buffer memory and to terminate print operations by said printer.

* * * * *

UNITED STATES PATENT AND TRADEMARK OFFICE
CERTIFICATE OF CORRECTION

PATENT NO. : 4,370,730

DATED : January 25, 1983

INVENTOR(S) : David P. Chadra

It is certified that error appears in the above—identified patent and that said Letters Patent is hereby corrected as shown below:

```
Col. 3 , line 35, change "processor" to --processors--.
Col. 4 , line 28, change "plurlity" to --plurality--.
Col. 7 , line  4, change "for" to --of--.
       , line  8, change "signal" to --single--;
       , line 22, change "situation" to --situations--.
Col. 8,  line  1, change "remins" to --remains--.
Col. 10, line 24, change "stimulate" to --simulate--.
Col. 33, line 15, change "mane." to --name.--.
Col. 37, line 27, change "CONFECT/." to --CONECT/.--;
         line 28, change "CONFECT/" to --CONECT/--.
Col. 41, line 47, change "German" to --Common--.
Col. 42, line  4, change "cation" to --action--.
Col. 48, line 21, change "dis" to --distribution card--.
Col. 68, line 41, change "secone" to --second--.
Col. 81, line 16, change "two-half" to --top-half--.
```

Signed and Sealed this

Twelfth Day of April 1983

[SEAL]

Attest:

GERALD J. MOSSINGHOFF

Attesting Officer

Commissioner of Patents and Trademarks